US007046385B2

(12) United States Patent
Mori et al.

(10) Patent No.: US 7,046,385 B2
(45) Date of Patent: May 16, 2006

(54) PRINT CONTROL METHOD, APPARATUS, COMPUTER-READABLE STORAGE MEDIUM, AND PROGRAM EMBODIED IN A COMPUTER-READABLE MEDIUM FOR MANAGING DOCUMENT INFORMATION ON A PAGE BASIS

(75) Inventors: Yasuo Mori, Kanagawa (JP); Koji Nakagiri, Kanagawa (JP); Satoshi Nishikawa, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 957 days.

(21) Appl. No.: 09/983,880

(22) Filed: Oct. 26, 2001

(65) Prior Publication Data

US 2002/0069228 A1 Jun. 6, 2002

(30) Foreign Application Priority Data

Oct. 31, 2000 (JP) ............................. 2000/333337
Sep. 14, 2001 (JP) ............................. 2001/280042

(51) Int. Cl.
*G06F 3/12* (2006.01)
*G06K 15/00* (2006.01)

(52) U.S. Cl. .................. 358/1.15; 358/1.15; 358/1.18; 358/1.12

(58) Field of Classification Search ............... 358/1.15, 358/1.18, 1.12
See application file for complete search history.

(56) References Cited

U.S. PATENT DOCUMENTS

| 5,732,197 | A | * | 3/1998 | Nakagiri ..................... 358/1.11 |
| 5,768,488 | A | * | 6/1998 | Stone et al. ................ 358/1.18 |
| 5,839,033 | A | * | 11/1998 | Takahashi et al. .......... 399/187 |
| 5,995,721 | A | * | 11/1999 | Rourke et al. ............. 358/1.15 |
| 6,417,931 | B1 | * | 7/2002 | Mori et al. ................. 358/1.15 |
| 6,509,977 | B1 | * | 1/2003 | Kujirai et al. ............. 358/1.18 |

OTHER PUBLICATIONS

U.S. Appl. No. 09/123,365, Yasuo Mori, et al., Jul. 28, 1998.

* cited by examiner

*Primary Examiner*—Douglas Q. Tran
*Assistant Examiner*—Andrew Lam
(74) *Attorney, Agent, or Firm*—Fitzpatrick, Cella, Harper & Scinto

(57) ABSTRACT

In printing a plurality of pages of print data on one paper sheet upon combining the pages, a print control apparatus inputs layout data for determining a layout of the respective pages, extracts a page data portion to be printed as a single page from the print data in accordance with the input layout data, holds the page data portion, and outputs print data generated from the held page data. In this apparatus, when paper sheets are folded to form printed matter with an appearance of a book, a plurality of print page data can be printed in each print area. The apparatus includes a designation unit for making designation with respect to layout data to combine and lay out a plurality of print data pages on one page of bound paper sheets on which printing is performed, and a generating unit for generating print data print data having a plurality of page data laid out on one page of the bound paper sheets in accordance with the layout data.

30 Claims, 57 Drawing Sheets

FIG. 11

| |
|---|
| TOTAL NUMBER OF PHYSICAL PAGES ~1101 |
| TOTAL NUMBER OF LOGIC PAGES ~1102 |
| NUMBER OF COPIES ~1103 |
| PRINTING ON SET BASIS ~1104 |
| FINISHING INFORMATION ~1105 |
| ADDITIONAL PRINT INFORMATION ~1106 |

FIG. 13

| | |
|---|---|
| LAYOUT ORDER OF LOGIC PAGES ON PHYSICAL PAGE | ~1301 |
| UPPER OR LOWER SURFACE IN TWO-SIDED PRINTING | ~1302 |
| COLOR OR MONOCHROME PAGE | ~1303 |
| ADDITIONAL PRINT INFORMATION | ~1304 |

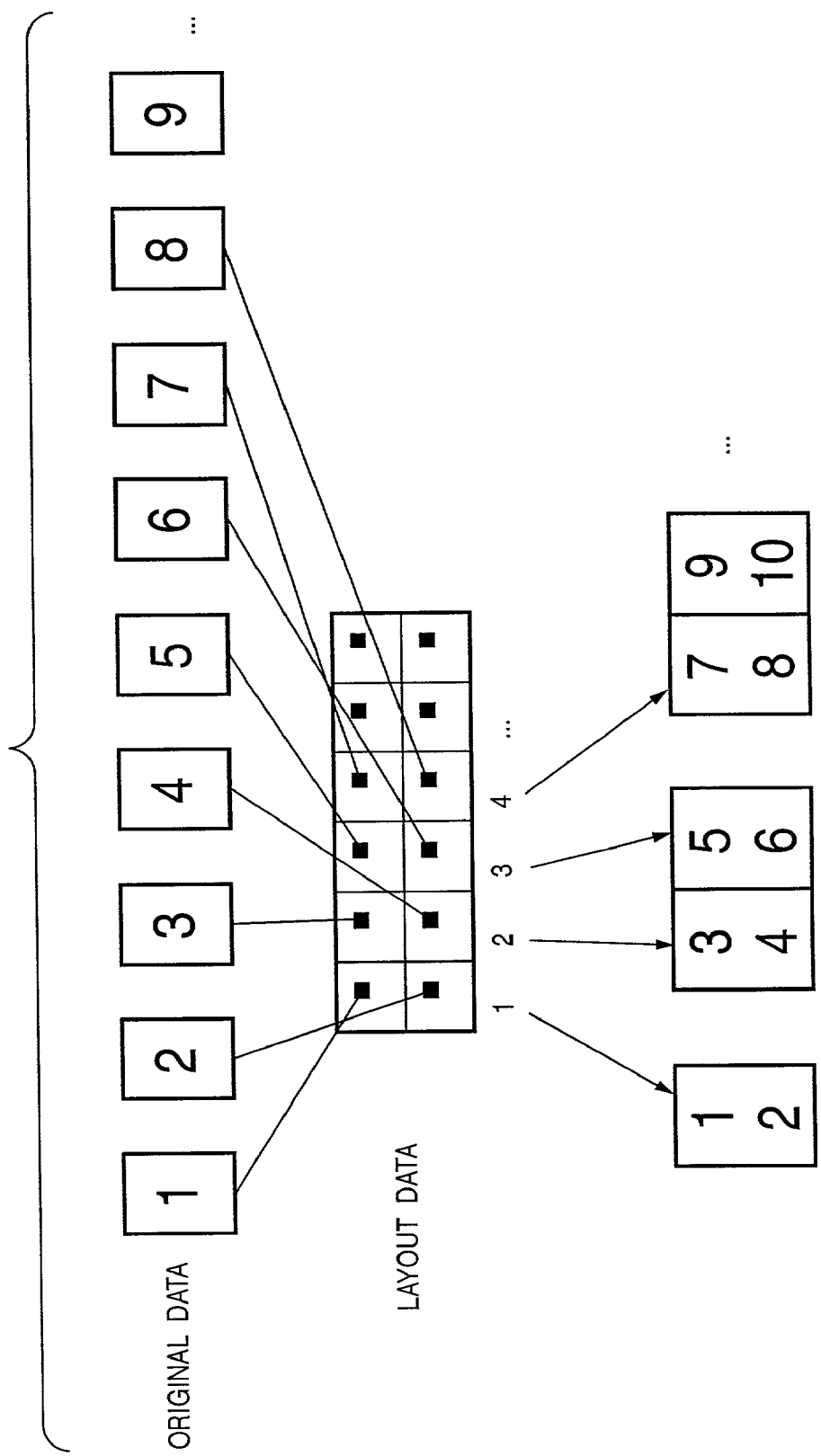

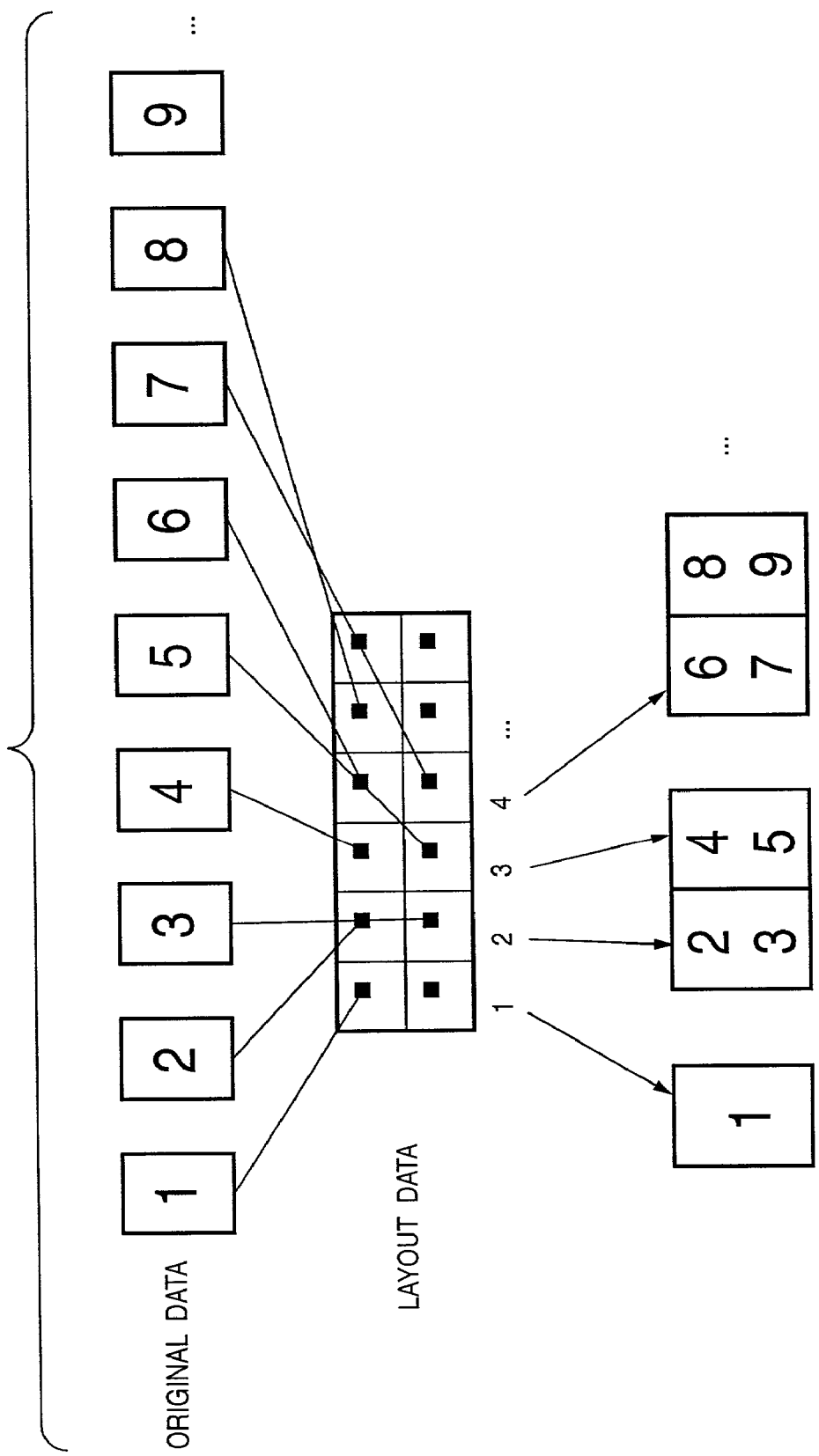

F I G. 33A
F I G. 33B
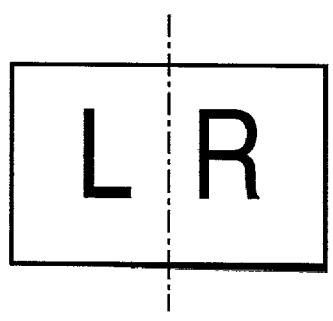
A3 Landscape
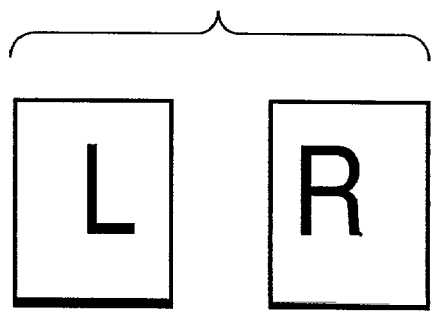
A4 Portait    A4 Portait F I G. 34
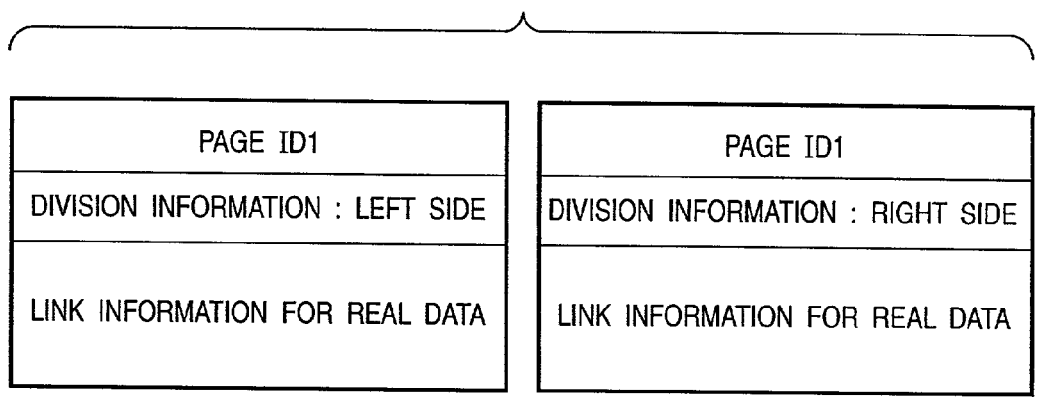

FIG. 37
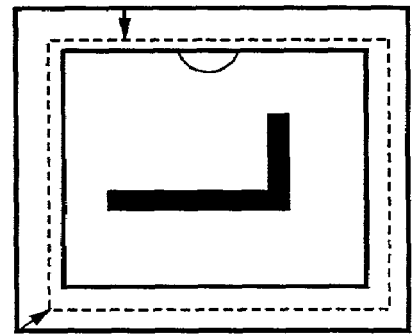
(3) REDUCTION + MOVEMENT
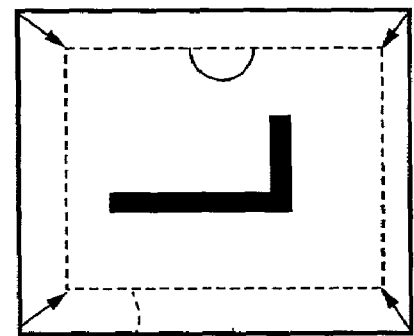
(2) REDUCTION
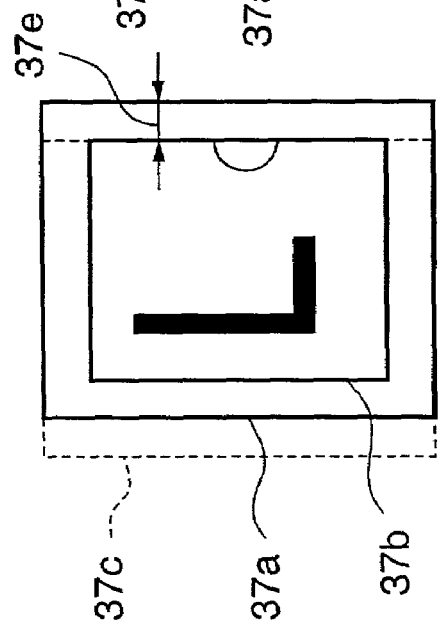
(1) MOVEMENT

BACK COVER  COVER

FIG. 47

| NO | ATTRIBUTE INFORMATION | | REMARKS |
|---|---|---|---|
| 1 | PRINT METHOD | ONE-SIDED PRINTING / TWO-SIDED PRINTING / BOOKLET PRINTING | |
| 2 | PAPER SIZE | ORIGINAL SIZE / FIXED SIZE | • Z-FOLDING IS DESIGNATED WHEN "A4 + A3", "B4 + B3", OR "LETTER + LEDGER (11 × 17)" IS DESIGNATED<br>• WHEN BOOKLET PRINTING OR N-up PRINTING IS DESIGNATED, ORIGINAL-SIZE OF FIRST CHAPTER / FIRST PAGE IS AUTOMATICALLY SELECTED |
| 3 | PAPER DIRECTION | PORTRAIT / LANDSCAPE | • DIRECTION CAN BE SELECTED ONLY WITH FIXED SIZE |
| 4 | BINDING MARGIN / BINDING DIRECTION | | • SHIFT / ENLARGEMENT / REDUCTION CAN BE DESIGNATED |
| 5 | N-up PRINTING | PAGE COUNT / LAYOUT ORDER / BOUNDARY LINE / LAYOUT POSITION / AND THE LIKE | • THERE ARE NINE LAYOUT POSITION PATTERNS<br>• ONE-TO-ONE PRINTING CAN BE DESIGNATED |
| 6 | ENLARGEMENT / REDUCTION | ON / OFF | WHEN FIXED SIZE IS SELECTED AS PAPER SIZE OR N-up PRINTING IS SELECTED, ON / OFF CAN BE AUTOMATICALLY DESIGNATED |
| 7 | WATERMARK | | • DESIGNATION CAN BE MADE ON LOGIC PAGE BASIS OR PHYSICAL PAGE BASIS<br>• ALL CHAPTER / ALL PAGES ARE TARGETS |
| 8 | HEAD / HOOTER | | • DESIGNATION CAN BE MADE ON LOGIC PAGE BASIS OR PHYSICAL PAGE BASIS<br>• ALL CHAPTERS / ALL PAGES ARE TARGETS |
| 9 | PAPER DISCHARGE METHOD | STAPLING / PUNCHING | • STAPLING / PUNCHING CAN BE DESIGNATED ONLY IN ONE-SIDED PRINTING / TWO-SIDED PRINTING<br>• STAPLING CAN BE DONE AT ONE POSITION / TWO POSITIONS |
| 10 | BOOKBINDING DETAILS | OPENING DIRECTION / SADDLE STITCHING / ENLARGE OR REDUCTION DESIGNATION / BINDING MARGIN / BOOKLET PRINTING DESIGNATION | • ONLY IN BOOKLET PRINTING |
| 11 | COVER / BACK COVER | | • PRINT DESIGNATION FOR COVER 1/2 AND BACK COVER 1/2<br>• PAPER FEED PORTION (INCLUDING INSERTER) IS DESIGNATED |
| 12 | INDEX SHEET | | • PRINTING OF CHARACTER STRING ON INDEX PORTION AND ANNOTATION ON INDEX SHEET CAN BE SET<br>• BOOKLET PRINTING CANNOT BE DESIGNATED |
| 13 | SLIP SHEET | | • PAPER FEED PORT (INCLUDING INSERTER) IS DESIGNATED<br>• ORIGINAL DATA CAN BE PRINTED ON INSERTED SHEET<br>• BOOKLET PRINTING CANNOT BE DESIGNATED |
| 14 | CHAPTER BREAK | NO / PAGE BREAK / SHEET CHANGE | • "SHEET CHANGE" IS FIXED WHEN INDEX SHEET OR SPLIT SHEET IS DESIGNATED<br>• "SHEET CHANGE" FOR ONE-SIDED PRINTING |

FIG. 48

| NO | ATTRIBUTE INFORMATION | | REMARKS |
|---|---|---|---|
| 1 | PAPER SIZE | ORIGINAL SIZE / FIXED SIZE | • WHEN FIXED SIZE IS SELECTED, "SHEET CHANGE" IS AUTOMATICALLY DESIGNATED<br>• WHEN PLURAL PAPER SHEETS ARE SELECTED IN "BOOK", PAPER SIZE CAN BE CHANGED ONLY WITH DESIGNATED PAPER SHEET, PAPER SIZE CAN ALSO BE CHANGED WITH DESIGNATION CORRESPONDING TO "BOOK" |
| 2 | PAPER DIRECTION | PORTRAIT / LANDSCAPE | • CAN BE SELECTED ONLY WITH FIXED SIZE |
| 3 | N-up PRINTING | PAGE COUNT / LAYOUT ORDER / BOUNDARY LINE / LAYOUT POSITION AND THE LIKE | • THERE ARE NINE LAYOUT POSITION PATTERNS<br>• ONE-TO-ONE PRINTING CAN BE DESIGNATED |
| 4 | ENLARGEMENT / REDUCTION | ON / OFF | • WHEN FIXED SIZE IS SELECTED AS PAPER SIZE OR N-up PRINTING IS SELECTED, ON / OFF CAN BE AUTOMATICALLY DESIGNATED |
| 5 | WATERMARK | DISPLAY / NON-DISPLAY | • WHETHER TO DISPLAY ALL WATERMARKS DESIGNATED IN "BOOK" IS DESIGNATED |
| 6 | HEAD / HOOTER | DISPLAY / NON-DISPLAY | • WHETHER TO DISPLAY ALL HEADERS / FOOTERS DESIGNATED IN "BOOK" IS DESIGNATED |
| 7 | PAPER DISCHARGE METHOD | STAPLING | • WHEN STAPLING IS DESIGNATED IN "BOOK", "OFF" CAN BE DESIGNATED, DEFAULT IS "ON" |

FIG. 49

| NO | ATTRIBUTE INFORMATION | | REMARKS |
|---|---|---|---|
| 1 | PAGE ROTATION DESIGNATION | | • 0 / 90 / 180 / 270° CAN BE DESIGNATED |
| 2 | WATERMARK | DISPLAY / NON-DISPLAY | • WHETHER TO DISPLAY ALL WATERMARKS DESIGNATED IN "BOOK" IS DESIGNATED |
| 3 | HEADER / FOOTER | DISPLAY / NON-DISPLAY | • WHETHER TO DISPLAY ALL HEADERS / FOOTERS DESIGNATED IN "BOOK" IS DESIGNATED |
| 4 | ZOOM | 50% - 200% | • RELATIVE MAGNIFICATION IS DESIGNATED WITH SIZE FITTED IN VIRTUAL LOGIC PAGE AREA BEING ASSUMED TO BE 100% |
| 5 | LAYOUT POSITION | | • NINE FIXED PATERNS AND ARBITRARY POSITION ARE DESIGNATED |
| 6 | ANNOTATION | | |
| 7 | Variable ITEM | | |
| 8 | PAGE DIVISION | | |

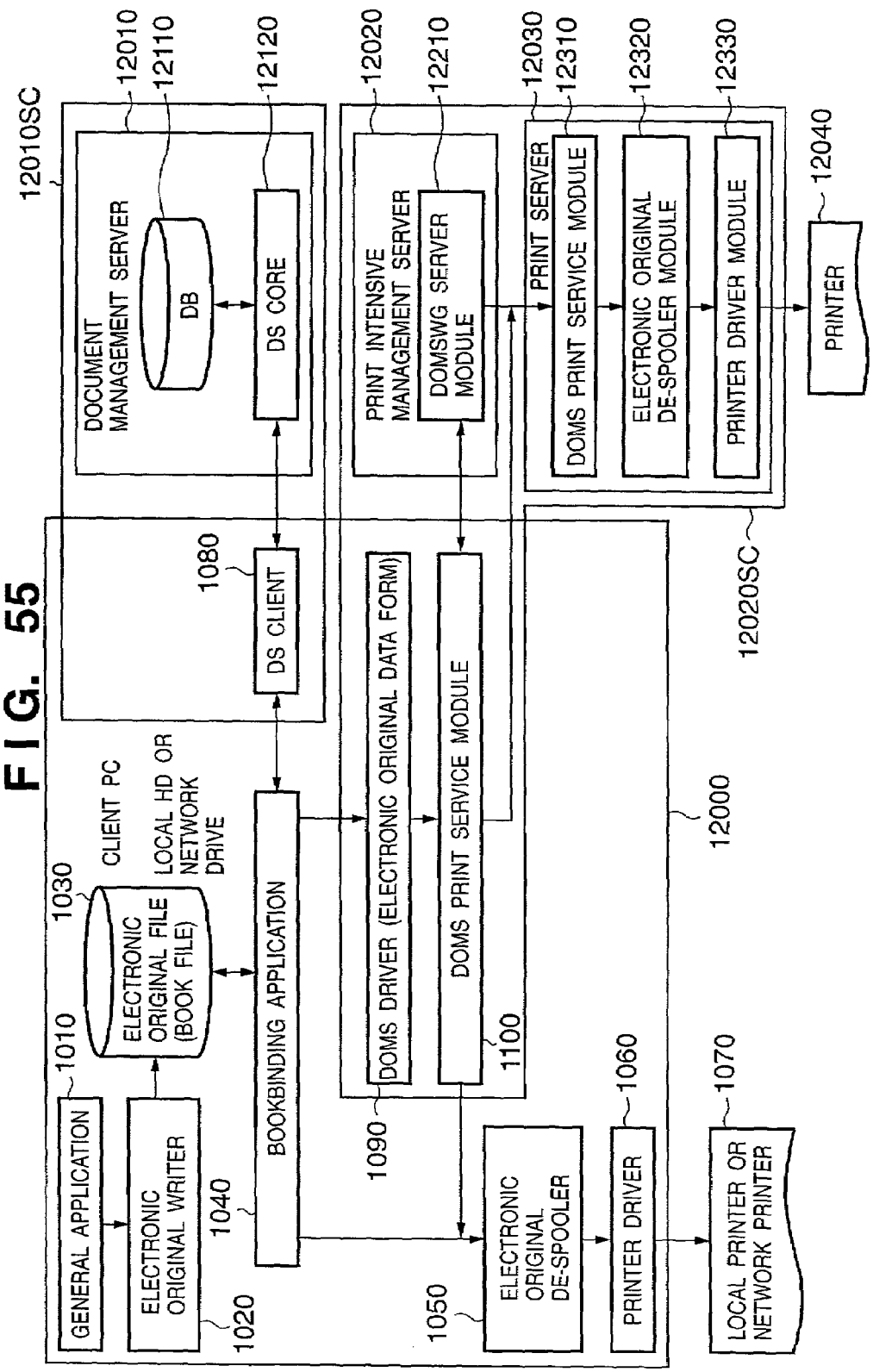

PRINT CONTROL METHOD, APPARATUS, COMPUTER-READABLE STORAGE MEDIUM, AND PROGRAM EMBODIED IN A COMPUTER-READABLE MEDIUM FOR MANAGING DOCUMENT INFORMATION ON A PAGE BASIS

FIELD OF THE INVENTION

The present invention relates to a print control method and apparatus, a medium, and the like in a document processing system for providing an edit function for document data generated by, for example, a document processing program.

BACKGROUND OF THE INVENTION

For different types of data, e.g., character data, table data, and image data, different structures for defining data and different edit operations for data are required. For this reason, various application programs corresponding the types of data are provided. A user selectively uses applications depending the types of data. For example, the user uses a character processing program to edit characters, a spreadsheet program to edit tables, and an image edit program to edit images.

As described above, in general, the user selectively uses application programs depending on the types of data. However, the user generally creates documents constituted by different types of data, e.g., character and table data and character and image data, more than documents constituted by one type of data, e.g., only character data, table data, or image data. To create a target document including different types of data, the user must print data for each application by using its print function and combine printed sheets in a desired order.

Some programs called office suites designed to form an integrated application by using various applications offer the function of creating one document by combining data generated by various applications. By using this integrated application, the user can integrate data generated by various applications into one target document by using a specific application included in the integrated application.

A printer driver or the like is used to lay out data on a page basis. For example, a function called N-page printing is available, which serves to print a plurality of original page data on one page as well as outputting one original page data. In this N-page printing, a plurality of pages are reduced and laid out on one surface of a paper sheet. Like two-sided printing, this technique is used for paper saving and the like.

An output apparatus having a two-sided printing function is equipped with a function called booklet printing which is used to print pages upon changing the page order such that when output paper sheets are folded in half, the pages are arranged in a correct page order. When one paper sheet is folded in half, a total of four print areas are formed on the upper and lower surfaces of the sheet. Four pages are therefore laid out and printed on the respective areas.

In some more complicated methods, each paper sheet is folded twice or more, and three sides are cut to lay out and print existing pages on the resultant surfaces so as to obtain an appearance of a book.

In contrast to the N-page layout method, a layout method of enlarging 1-page data and continuously printing the resultant data on a plurality of paper sheets is also available. This method is called poster printing or enlarged continuous printing, by which an enlarged print result of one original page can be obtained by pasting printed paper sheets together.

A printer driver or the like is used to lay out print information on a page basis. A typical example is a layout method called "N-page printing". In this method, a plurality of pages are reduced and laid out on one surface of a paper sheet. This method is used to save paper sheets in addition to two-sided printing.

In contrast to N-page printing, a layout method of enlarging 1-page data and continuously printing the enlarged data on a plurality of paper sheets is available. This method is called "poster printing" or "enlarged continuous printing", by which an enlarged print result of one original page can be obtained by pasting printed paper sheets together.

Assume that the user is to generate one target document by combining printed sheets obtained by various applications. In this case, for example, in order to assign page numbers to the respective pages, all necessary data are printed out first, and then page numbers must be determined after the print results are combined into a document. The determined page numbers are then written, by using the respective applications, on the respective pages of the originals (to be referred to as logic pages or original pages hereinafter) generated by the applications. Even if an application program has the function of assigning page numbers, the user must designate page numbers with respect discontinuous portions. In addition, if the pages of a target document are rearranged, page numbers must be assigned again accordingly. When the format of a document is simply changed instead of the contents of data, for example, a plurality of original pages are combined into one page (to be referred to as a physical page or print page) as printed matter or single-sided printing is changed to two-sided printing, the document must be edited and printed again by using applications.

Since different types of data are managed by different applications, the user himself/herself must manually provide an interface between the applications. This imposes a heavy load on the user, resulting in a deterioration in productivity. In addition, errors tend to occur because of many manual operations.

When a target document is to be generated by using an integrated application, various data can be laid out in the form of data without printing out. In this case, a target document can be generated with less labor than in a case wherein a target document is generated by combining printed sheets. However, applications that can be used to edit/generate various data are limited to those included in the integrated application, and the user cannot always use a desired application. In addition, a target document generated by the integrated application is one document file, and management such as edition and output operation is performed on a file basis. For this reason, many limitations based on the functions of the application are imposed on setting of a format for part of a document file. For example, format settings must be changed for each portion whose format is changed, and printing must be redone. This requires a great deal of labor, and the productivity deteriorates as in the above method.

According to the prior art, one page of original data can be laid out in one print area in printing paper sheets with an appearance of a book, but a plurality of pages cannot be printed in one print area. When bookbinding is performed by folding paper sheets, the paper sheet size is limited to some extent due to physical folding operation, and hence the size of one print area is limited accordingly. Although the user wants to output a large amount of information by using such limited print areas effectively, only one page can be output for one print area.

In some catalogues or the like, one large page is expressed by a spread of a bookbinding result. In order to realize such a layout, small original pages to be laid out on the respective pages of the spread, i.e., so-called split original pages, must be prepared before printing, and special processing, e.g., adjustment of the respective pages to spread positions, is required. The conventional layout schemes cannot properly handle such processing. In order to realize such a complicated, special layout, a document must be generated by using a system operated by an expert operator.

SUMMARY OF THE INVENTION

The present invention has been made in consideration of the above problems, and has as its object to provide a print control method and apparatus which can generate printed matter having a plurality of print page data laid out on each print area in generating printed matter with an appearance of a book by folding paper sheets.

It is another object of the present invention to provide a print control method and apparatus which generate print data for generating printed matter having different layouts on, e.g., a cover and pages other than the cover on a page basis in generating printed matter with an appearance of a book.

It is still another object to provide a print control method and apparatus which can generate printed matter which allows an original to be easily laid out at a spread position by simply preparing a large-page original located on a spread in generating printed matter with an appearance of a book.

It is still another object of the present invention to easily execute layout control with respect to a cover, back cover, and spread size in controlling print information in booklet printing.

In order to achieve the above objects, a print control method and apparatus according to the present invention are characterized by mainly having the following arrangements.

There is provided a print control apparatus for, in printing a plurality of pages of print data on one paper sheet upon combining the pages, inputting layout data for determining a layout of the respective pages, extracting a page data portion to be printed as a single page from the print data in accordance with the input layout data, holding the page data portion, and outputting print data generated from the held page data, comprising:

designation means for designating the layout data to lay out a combination of a plurality of print data pages on one page of bound paper sheets on which printing is performed; and generating means for generating print data having a plurality of page data laid out on one page of bound paper sheets in accordance with the layout data.

There is provided a print control method of, in printing a plurality of pages of print data on one paper sheet upon combining the pages, inputting layout data for determining a layout of the respective pages, extracting a page data portion to be printed as a single page from the print data in accordance with the input layout data, holding the page data portion, and outputting print data generated from the held page data, comprising:

the designation step of designating the layout data to lay out a combination of a plurality of print data pages on one page of bound paper sheets on which printing is performed; and the generating step of generating print data having a plurality of page data laid out on one page of bound paper sheets in accordance with the layout data.

There is provided a storage medium storing a program module for causing a computer to execute a print control method of, in printing a plurality of pages of print data on one paper sheet upon combining the pages, inputting layout data for determining a layout of the respective pages, extracting a page data portion to be printed as a single page from the print data in accordance with the input layout data, holding the page data portion, and outputting print data generated from the held page data, the program module comprising:

a designation module for designating the layout data to lay out a combination of a plurality of print data pages on one page of bound paper sheets on which printing is performed; and a generating module for generating print data having a plurality of page data laid out on one page of bound paper sheets in accordance with the layout data.

There is provided a print control apparatus for managing document information on a page basis and performing control to lay out the document information on a page basis in a designated layout area, comprising:

data management means for managing the document data as a set of data on a page basis;

division management means for, when the document data is managed upon being divided into a plurality of unit pages in order to cause the data management means to manage the document data on a page basis, giving management information on a page basis division information for identifying the divided data as divided pages and specifying a relationship between the divided pages; and control means for determining a layout area in which data managed on a page basis is laid out on the basis of the management information given by the division management means, and laying out the data in the determined layout area.

There is provided a print control method of managing document information on a page basis and performing control to lay out the document information on a page basis in a designated layout area, comprising:

the data management step of managing the document data as a set of data on a page basis;

the division management step of, when the document data is managed upon being divided into a plurality of unit pages in order to cause the data management step to manage the document data on a page basis, giving management information on a page basis division information for identifying the divided data as divided pages and specifying a relationship between the divided pages; and the control step of determining a layout area in which data managed on a page basis is laid out on the basis of the management information given in the division management step, and laying out the data in the determined layout area.

In addition, there is provided a storage medium storing a program module for executing print control to manage document information on a page basis and perform control to lay out the document information on a page basis in a designated layout area, the program module comprising:

a data management module for managing the document data as a set of data on a page basis;

a division management module for, when the document data is managed upon being divided into a plurality of unit pages in order to cause the data management module to manage the document data on a page basis, giving management information on a page basis division information for identifying the divided data as divided pages and specifying a relationship between the divided pages; and a control module for determining a layout area in which data managed on a page basis is laid out on the basis of the management information given by the division management module, and laying out the data in the determined layout area.

Furthermore, there is provided a program for managing document information on a page basis and performing control to lay out the document information on a page basis in a designated layout area, the program causing a computer to function as data management means for managing the document data as a set of data on a page basis;

division management means for, when the document data is managed upon being divided into a plurality of unit pages in order to cause the data management means to manage the document data on a page basis, giving management information on a page basis division information for identifying the divided data as divided pages and specifying a relationship between the divided pages; and control means for determining a layout area in which data managed on a page basis is laid out on the basis of the management information given by the division management means, and laying out the data in the determined layout area.

Moreover, there is provided a program for, in printing a plurality of pages of print data on one paper sheet upon combining the pages, inputting layout data for determining a layout of the respective pages, extracting a page data portion to be printed as a single page from the print data in accordance with the input layout data, holding the page data portion, and outputting print data generated from the held page data, the program causing a computer to function as:

designation means for designating the layout data to lay out a combination of a plurality of print data pages on one page of bound paper sheets on which printing is performed; and generating means for generating print data having a plurality of page data laid out on one page of bound paper sheets in accordance with the layout data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 11 is a view showing an example of the job setting information shown in a field 1002 of FIG. 10;

FIG. 13 is a view showing an example of the physical page setting information in a field 1202 of FIG. 12;

FIG. 21 is a view showing a method of obtaining a page layout according to the first embodiment;

FIG. 22 is a view showing a method of obtaining a page layout according to the second embodiment;

FIG. 33A is a view for explaining the concept of page division, showing an original page before the page is divided;

FIG. 33B is a view showing how the original page in FIG. 33A is equally divided into left and right pages to be laid out on a spread;

FIG. 34 is a view showing an example of page information expressing division data;

FIG. 37 is a view for explaining examples of a layout for preventing a data omission in the present invention;

FIG. 47 is a view showing a list of book attributes;

FIG. 48 is a view showing a list of chapter attributes;

FIG. 49 is a view showing a list of page attributes;

FIG. 55 is a block diagram showing a client-server type document processing system.

DETAILED DESCRIPTION OF THE PREFERRED EMBODIMENTS

Preferred embodiments of the present invention will now be described in detail in accordance with the accompanying drawings.

<Outline of System>

An outline of a document processing system according to an embodiment of the present invention will be described below with reference to FIGS. 44 to 55. In this document processing system, a data file created by a general application is converted into an electronic original file by an electronic original writer. A bookbinding application has the function of editing the electronic original file. This function will be described in detail below.

<System Configuration and Operation>

Figure 44:
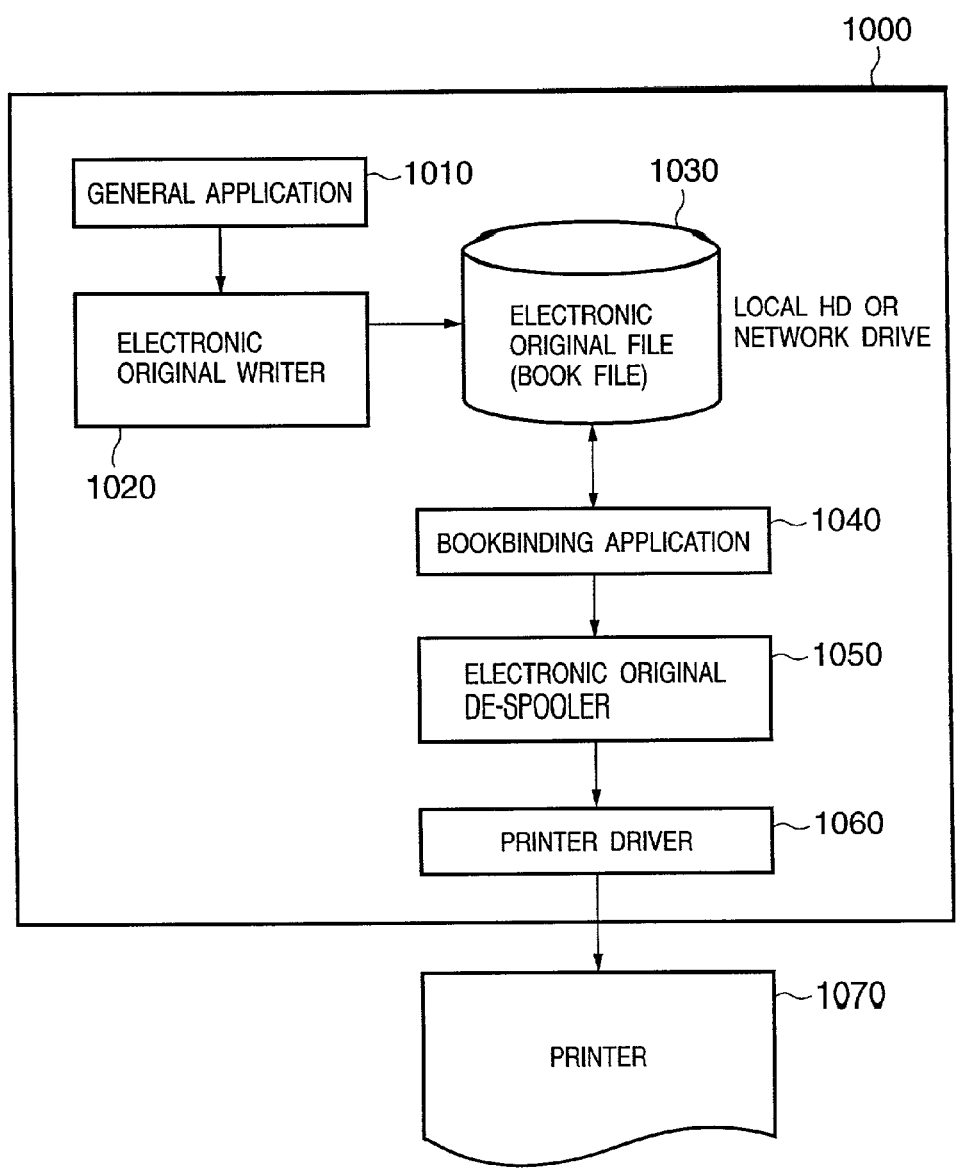
FIG. 44 is a block diagram of a standalone document processing system.

FIG. 44 is a view showing the software arrangement of the document processing system according to this embodiment. The document processing system is implemented by a digital computer 1000. The general application 1010 is an application program for providing a word-processing function, spreadsheet function, photo-retouch function, draw function, paint function, presentation function, text edit function, and the like, and has a print function. These applications use a predetermined interface provided by an operating system (OS) in printing application data such as created document data and image data. More specifically, in printing the created data, the application 1010 transmits an output command in a predetermined form dependent on the OS to the output module of the OS for providing the above interface. Upon reception of the output command, the output module converts the command into a form that allows an output device such as a printer to process, and outputs it. Since the form that allows an output device to process varies depending on the type of device, the maker, the model, and the like, a device driver is provided for each device. The OS converts a command by using the device driver. When Microsoft Windows is to be used as an OS, the above output module corresponds to a module called GDI.

An electronic original writer 1020 is a software module provided as one of the above device drivers to implement this document processing system. Note that the electronic original writer 1020 is not aimed for a specific output device, and hence an output command is converted into a format that allows processing by using a bookbinding application 1040 or printer driver 1060. The form after conversion by the electronic original writer 1020 (to be referred to as an electronic original form hereinafter) is not specifically limited as long as an original can be expressed in a detailed format on a page basis. Of substantially standard forms, for example, the PDF form developed by Adobe Systems, the SGML form, and the like can be used as electronic original forms. When the electronic original writer 1020 is to be used with the application 1010, the electronic original writer 1020 is designated first as a device driver to be used for output operation, and then printing is executed. However, the electronic original file created by the electronic original writer 1020 does not have a perfect form for an electronic original file without any change. For this reason, the application data is converted into an electronic original file under the control of the bookbinding application 1040 which designates the electronic original writer 1020 as a device driver. The bookbinding application 1040 completes the new imperfect electronic original created by the electronic original writer 1020 into an electronic original file having the form to be described later. When such files must be clearly identified, the file created by the electronic original writer 1020 will be referred to as an electronic original file, and the electronic original file structured by the bookbinding application 1040 will be referred to as a book file.

By designating the electronic original writer 1020 as a device driver and making the general application 1010 print the created data in this manner, the application data is converted into an electronic original form for each page (to be referred to as a logic page or original page hereinafter)

defined by the application 1010 and stored as an electronic original file 1030 in a storage medium such as a hard disk. Note that the hard disk may be a local drive which the computer for implementing the document processing system of this embodiment has or a drive provided on a network if the computer is connected to the network.

The bookbinding application 1040 provides the user with the function of loading an electronic original file or the book file 1030 and editing the file. However, the bookbinding application 1040 does not provide the function of loading the contents of each page but provides the function of editing the structure of a chapter or book (to be described later) constituted by pages as minimum units.

When the electronic original file 1030 edited by the bookbinding application 1040 is to be printed, an electronic original de-spooler 1050 is activated by the bookbinding application 1040. The electronic original de-spooler 1050 reads out the designated book file from the hard disk and generates an output command suited for the output module of the above OS to print each page in the form described in the book file. The electronic original de-spooler 1050 then outputs the command to the output module (not shown). At this time, the printer driver 1060 of a printer 1070 to be used as an output device is designated as a device driver. The output module converts the output command received by using the printer driver 1060 of the designated printer 1070 into a device command that can be interpreted by the printer 1070. The device command is then transmitted to the printer 1070. The printer 1070 prints an image corresponding to the command.

Figure 45:
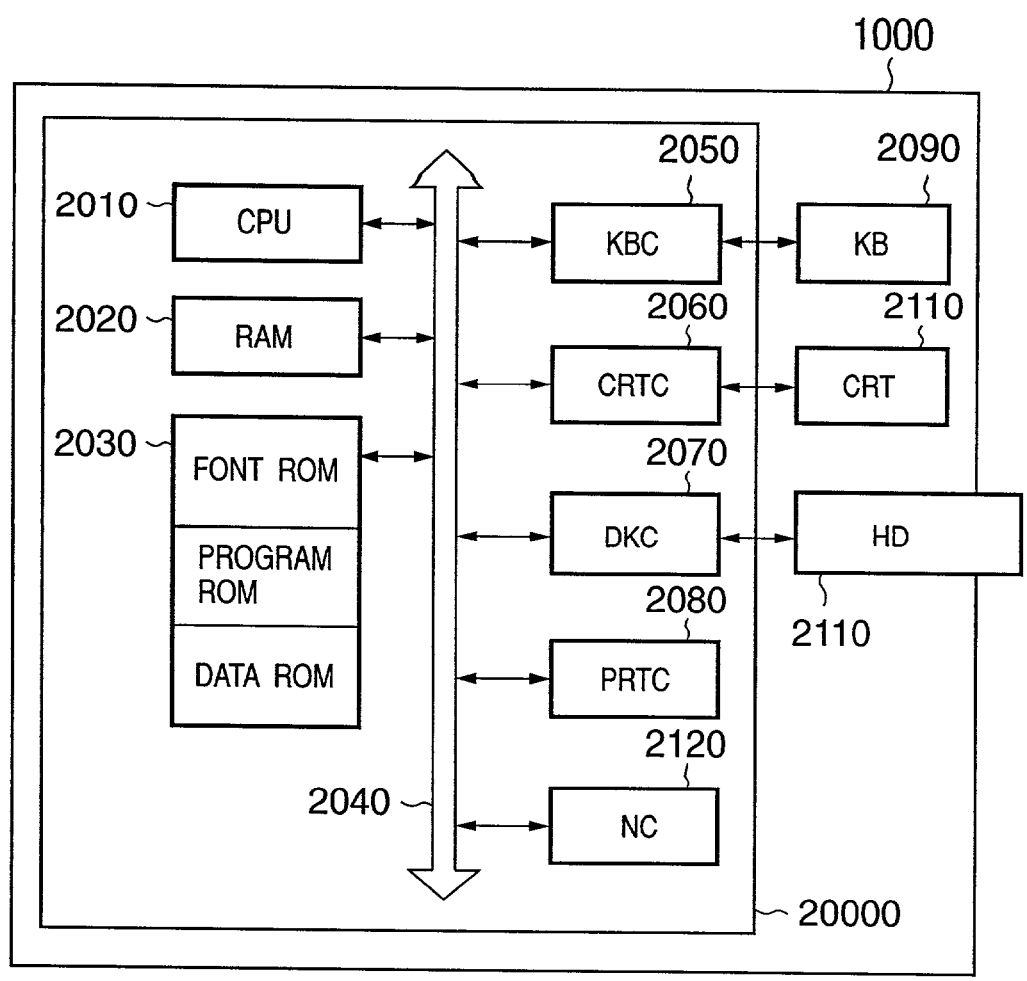
FIG. 45 is a block diagram showing a computer for implementing the document processing system.

FIG. 45 is a block diagram showing the hardware arrangement of the computer 1000. Referring to FIG. 45, a CPU 2010 executes programs such as the OS, general application, and bookbinding application stored in the program ROM of a ROM 2030 or loaded from a hard disk 2110 into a RAM 2020, thus implementing the software arrangement shown in FIG. 44 and the procedures in the flow charts to be described later. The RAM 2020 serves as the main memory, work area, and the like of the CPU 2010. A keyboard controller (KBC) 2050 controls key input operation using a keyboard 2090 and a pointing device (not shown). A CRT controller (CRTC) 2060 controls the display operation of a CRT display 2100. A disk controller (DKC) 2070 controls access to the hard disk (HD) 2110, floppy disk (FD), and the like storing a boot program, various applications, font data, user files, edited files (to be described later), and the like. A PRTC 2080 controls exchange of signals with the connected printer 1070. An NC 2120 is connected to a network to execute communication control processing with respect to other devices connected to the network.

<Form of Electronic Original Data>

The data form of a book file will be described prior to a detailed description of the bookbinding application 1040. A book file has a three-layer structure imitating a book as a paper medium. The upper level is called "book" imitating one paper book and defines attributes associated with the overall book. The intermediate layer is called "chapter" corresponding to "chapter" of a paper book. Attributes for each chapter can be defined. The lower layer is "page" corresponding to each page defined by an application program. Attributes for each page can be defined. One book can include a plurality of chapters, and each chapter can include a plurality of pages.

Figure 46A:
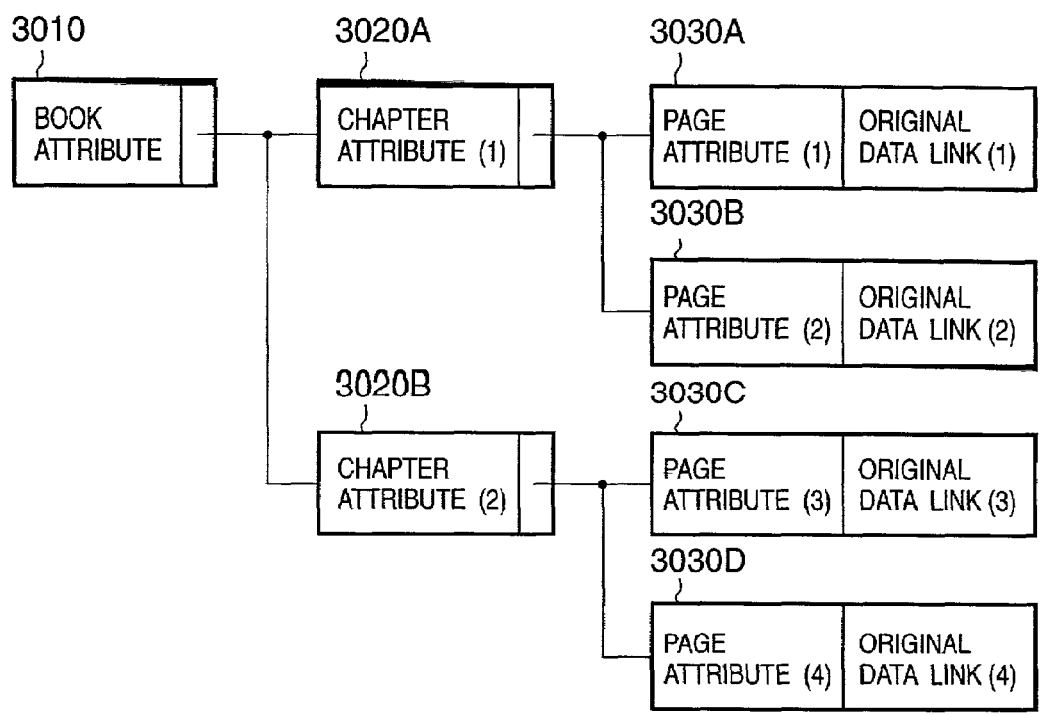
FIGS. 46A and 46B are views showing an example of the structure of a book file.
Figure 46B:
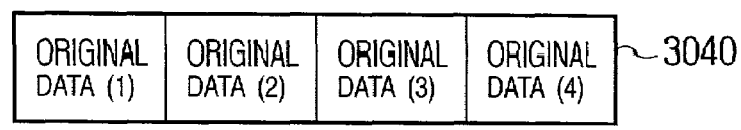

FIG. 46A is a schematic view showing an example of the form of a book file. In this book file, the book, chapters, and pages are indicated by the corresponding nodes. One book file contains one book. The "book" and "chapters" are concepts for defining the structure of the book, and hence contain defined attribute values and links to subordinate layers as entities. Each "page" includes the data of each page output by the application program as an entity. For this reason, each "page" contains the entity (original page data) of an original page and a link to each original page data as well as the attribute values. Note that a print page may include a plurality of original pages when the page is output to a paper medium or the like. This structure is not displayed by a link but is displayed as attributes on the book, chapter, and page layers.

Referring to FIG. 46A, in a book 3010, book attributes are defined, and two chapters 3020A and 3020B are linked to the book 3010. These links display that the chapters 3020A and 3020B are contained in the book 3010. Pages 3030A and 3030B are linked to the chapter 3020A. This indicates that these pages are contained in the chapter 3020A. In the pages 3030A and 3030B, attribute values are defined, and links to original page data (1) and (2) as entities. These links indicate data (1) and (2) of original page data 3040 shown in FIG. 46B, and also indicate that the entities of the pages 3030A and 3030B are original page data (1) and (2).

FIG. 47 shows a list of book attributes. With regard to items that can be defined on both the upper and lower layers, the attribute values on the lower layer are preferentially adopted. For this reason, with regard to items included in only book attributes, the values defined in the book attributes become valid values throughout the book. However, with regard to items defined on both the upper and lower layers, the values defined on the upper layer serve as defaults when the items are not defined on the lower layer. Note that each item in FIG. 46 does not correspond to specific one item alone but includes a plurality of associated items.

FIG. 48 shows a list of chapter attributes. FIG. 49 shows a list of page attributes. The relationship between the chapter attributes and the page attributes is equivalent to the relationship between the book attributes and the attributes on the lower layer.

The items unique to book attributes are the following six items: print method, bookbinding details, cover/back cover, index sheet, slip sheet, and chapter break. These are items to be defined throughout a book. As print method attributes, three values associated with one-sided printing, two-sided printing, and booklet printing can be designated. Booklet printing is a method of printing in the form that allows bookbinding by folding a bundle of paper sheets, the number of which is separately designated, and binding them together. As bookbinding details attributes, a spreading direction, the number of paper sheets to be bundled, and the like can be designated when booklet printing is designated.

Cover/back cover attributes include the designation of addition of paper sheets serving as a cover and back cover and the designation of the contents of printing on added paper sheets when an electronic original file to be formed into a book is printed. Index attributes include the designation of insertion of an index sheet with trimmings that is separately prepared for the printer as a chapter break and the designation of contents to be printed on the index (trimming) portions. These attributes become effective when the printer in use has an inserter having an insert function of inserting a paper sheet prepared independently of print paper sheets at a desired position or a plurality of paper feed cassettes can be used. This also applies to slip sheet attributes.

Slip sheet attributes include the designation of insertion of a paper sheet fed from the inserter or paper feed cassette, the designation of a paper source when a slip sheet is to be inserted.

Chapter break attributes include the designation of use of a new paper sheet, a new print page, or no specific operation. In one-sided printing, the use of a new paper sheet and the use of a new print page have the same meaning. In two-sided printing, if "use of a new paper sheet" is designated, consecutive chapters are not printed on one paper sheet. If, however, "use of a new print page" is designated, consecutive chapters may be printed on the upper and lower surfaces of one paper sheet.

With regard to chapter attributes, there is no item unique to "chapter", and all items overlap between chapter attributes and book attributes. If, therefore, a definition in chapter attributes differs from that in book attributes, a higher priority is given to the value defined in the chapter attributes. Items common only to book attributes and chapter attributes are five items, namely "paper size", "paper direction", "N-up printing designation", "enlargement/reduction", and "paper discharge method". Of these attributes, an N-up printing designation is an item for designating the number of original pages contained in one print page. Examples of the layouts that can be designated are 1×1, 1×2, 2×2, 3×3, and 4×4. A paper discharge method attribute is an item for designating whether to staple discharged paper sheets or not. The validity of this attribute depends on whether the printer in use has a stapling function.

Items unique to page attributes include "page rotation attribute", "zoom", "layout designation", "annotation", "page splitting", and the like. A page rotation attribute is an item for designating a rotational angle in laying out original pages on a print page. A zoom attribute is an item for designating a magnification for an original page. A magnification is designated with the size of a virtual logic page area being regarded as 100%. The virtual logic page area is the area occupied by one original page when pages are laid out in accordance with the designation of N-up printing or the like. If, for example, 1×1 is designated, the virtual logic page area corresponds to one print page. If 1×2 is designated, the virtual logic page area corresponds to the area obtained by reducing each side of one print page to about 70%.

Attributes common to "book", "chapter", and "page" are a watermark attribute and header/footer attribute. A watermark is an image, character string, or the like which is separately designated and superimposed/printed on data created by an application. A header and footer are watermarks respectively printed on the upper and lower margins of each page. For a header and footer, items, e.g., a page number and date, which can be designated by variables are prepared. Note that the contents that can be designated in watermark attributes and header/footer attributes are common to "chapter" and "page", but differ from those in "book". In "book", the contents of a watermark and head/footer can be set, and the manner in which a watermark and header/footer are printed can be designated throughout the book. In "chapter" and "page", whether to print the watermark and heater/footer designated in "book" can be designated.

<Procedure for Creating Book File>

Figure 50:
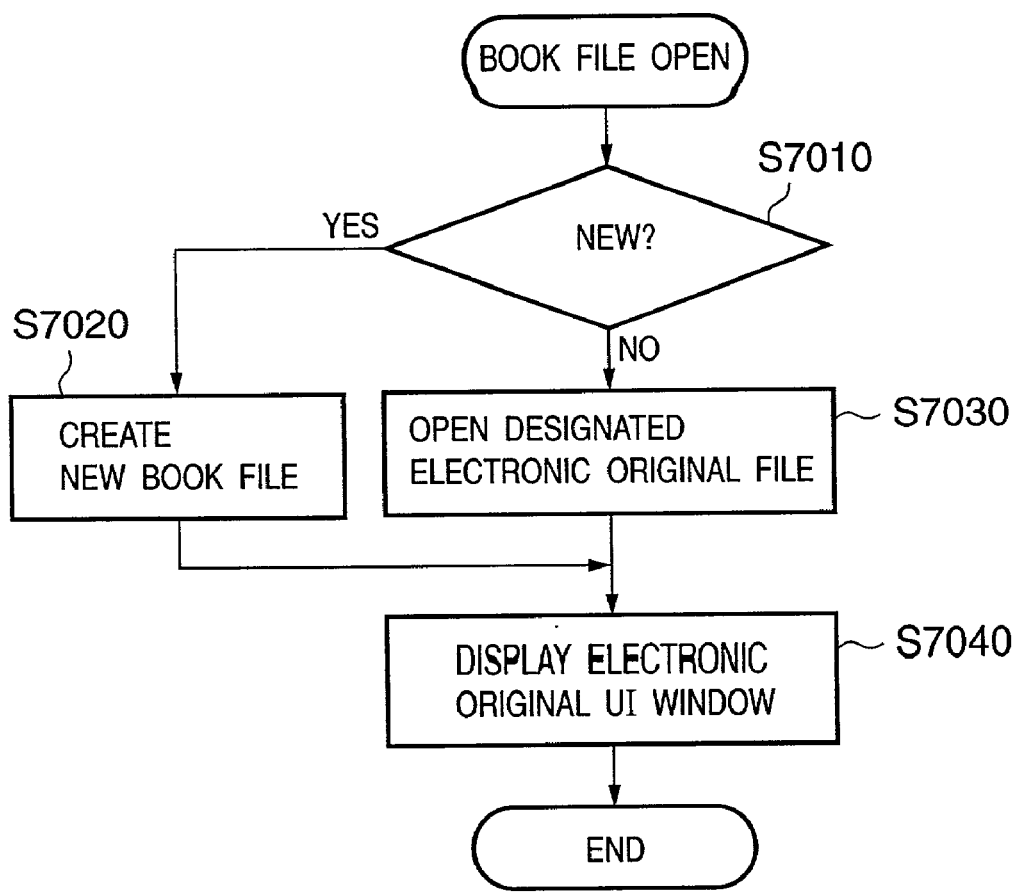
FIG. 50 is a flow chart showing a procedure for opening a book file.

A book file has the above structure and contents. A procedure for creating a book file by using the bookbinding application 1040 and electronic original writer 1020 will be described next. Creation of a book file is implemented as part of book file edit operation by the bookbinding application 1040. FIG. 50 shows a procedure by which the bookbinding application 1040 opens a book file.

Figure 54:
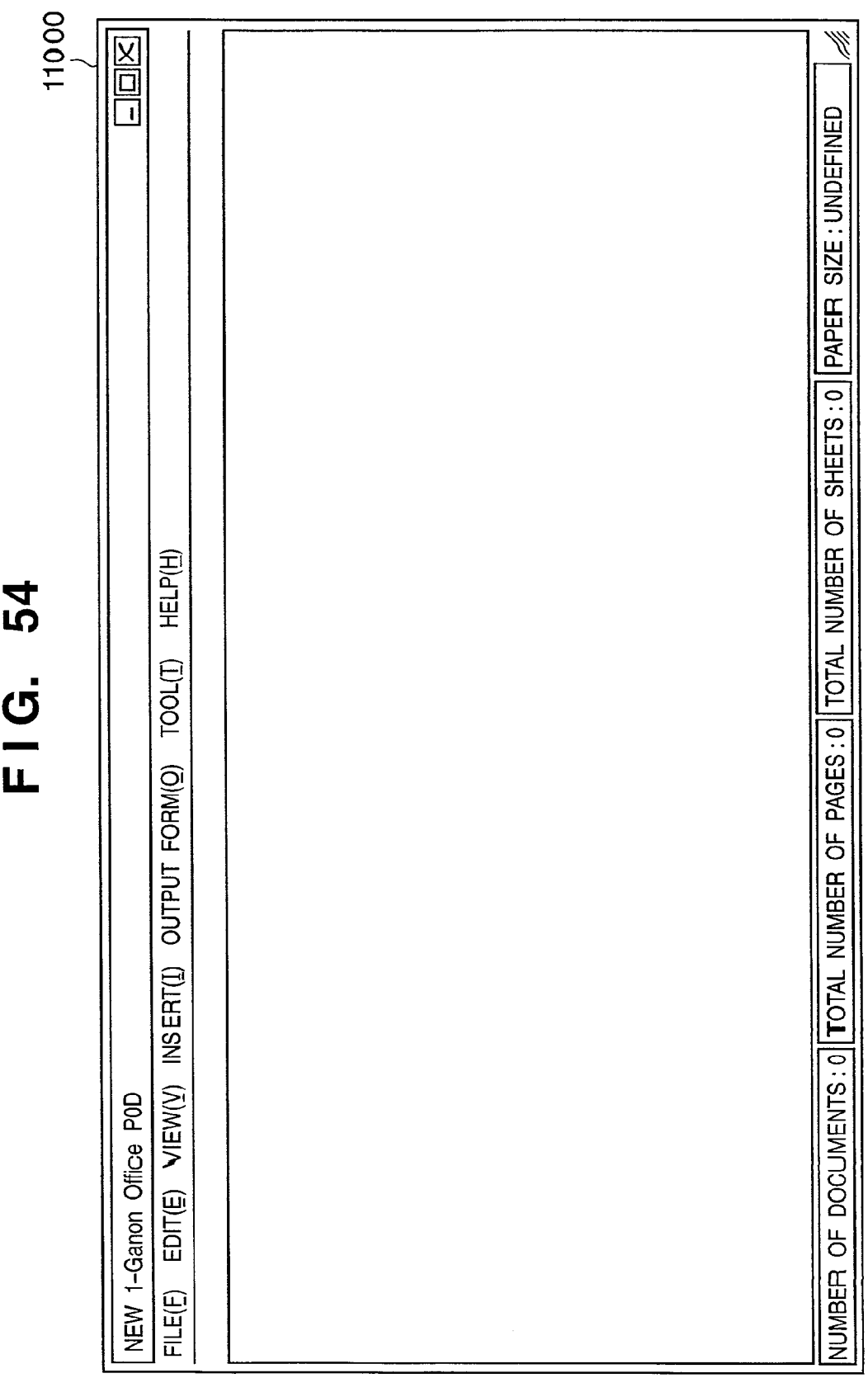
FIG. 54 is a view showing an example of a user interface window which appears when a new book file is opened.

It is checked whether the book file to be opened is a file to be newly created or an existing file (step S7010). When a file is to be newly created, a book file containing no chapter is newly created (step S7020). In the case shown in FIG. 46A, the book file to be newly created has only the book node 3010, which has no link to chapter nodes. As book attributes, a set of attributes prepared for the creation of a new file are used. A user interface (UI) window for editing a new book file is displayed (step S7040). FIG. 54 shows an example of the UI window displayed when a book file is newly created. In this case, since the book file has no substantial contents, nothing is displayed on an UI window 11000.

Figure 53:
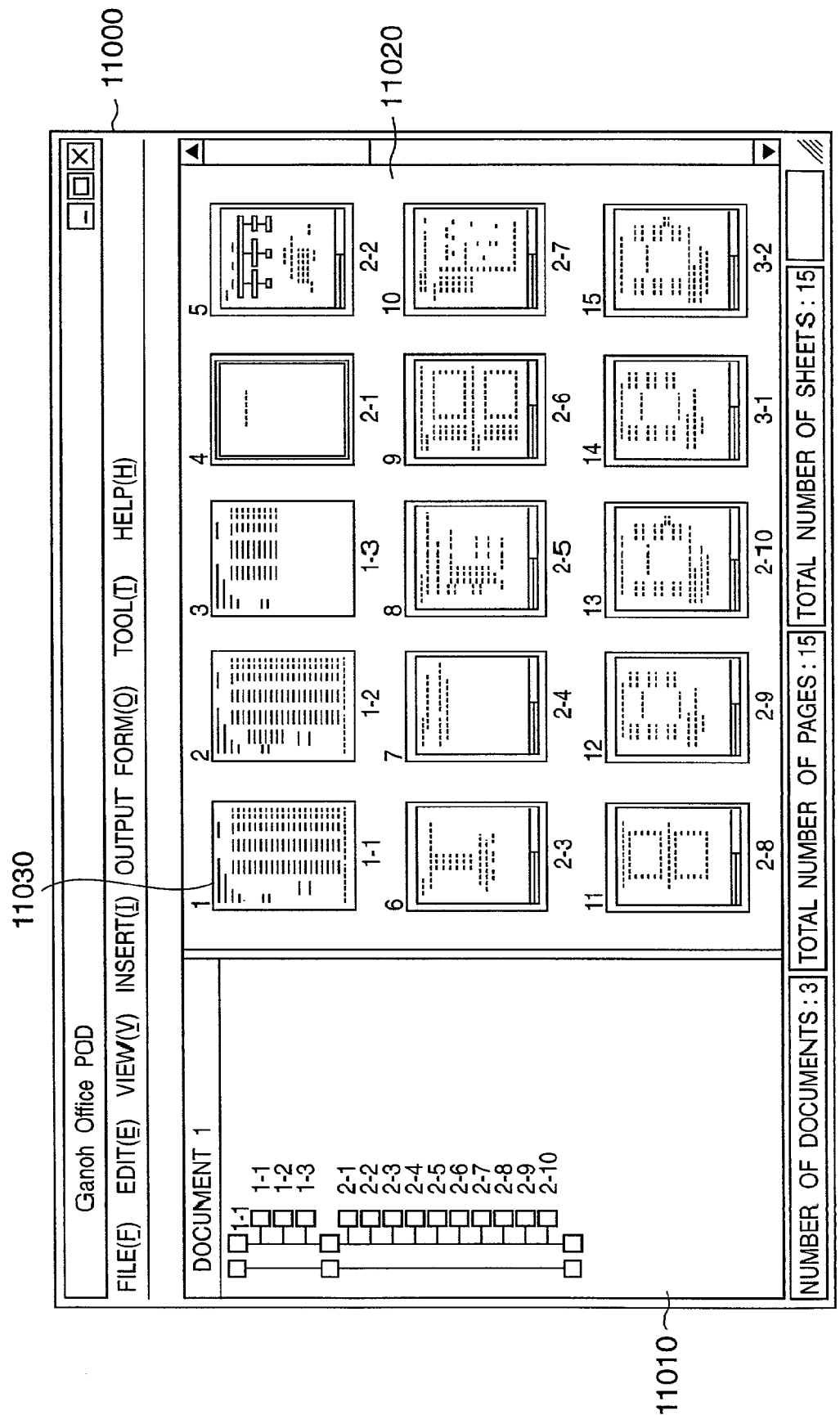
FIG. 53 is a view showing an example of a user interface window which appears when an existing book file is opened.

If the book file is an existing file, the designated book file is opened (step S7030), and the user interface (UI) window is displayed in accordance with the structure, attributes, and contents of the book file. FIG. 53 shows an example of this UI window. The UI window 11000 includes a tree portion 11010 indicating the structure of the book and a preview portion 11020 for displaying printed states. The tree portion 11010 displays the chapters included in the book and the pages included in each chapter in a tree structure like the one shown in FIG. 46A. The pages displayed in the tree portion 11010 are original pages. In the preview portion 11020, the contents of the print pages are reduced and displayed. This display order reflects the structure of the book.

Figure 51:
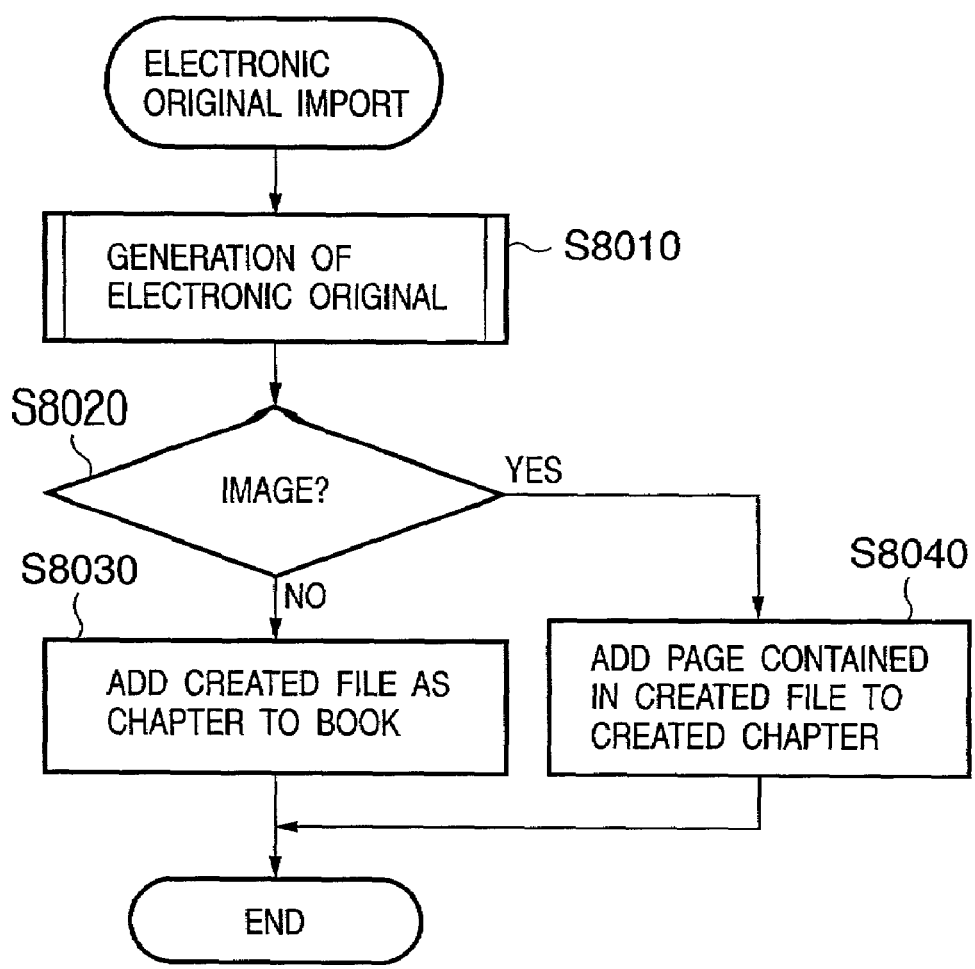
FIG. 51 is a flow chart showing a procedure for importing an electronic original file in a book file.

Application data converted into an electronic original file by the electronic original writer can be added as a new chapter to the open book file. This function is called an electronic original import function. By importing an electronic original file to the book file newly created by the procedure in FIG. 50, entities are given to the book file. This function is activated by dragging and dropping the application data onto the window in FIG. 53. FIG. 51 shows a procedure for electronic original importing.

First of all, the application program that has created the designated application data is activated, and the electronic original writer 1020 is designated as a device driver to print out the application data, thereby converting it into electronic original data (step S8010). After the conversion, it is checked whether the converted data is image data (step S8020). This determination can be made on the basis of the file extension of the application data if this system operates on a Windows OS. If, for example, the extension is "bmp", the data is Windows bitmap data. If the extension is "jpg", the data can be determined as JPEG-compressed image data. If the extension is "tiff", the data can be determined as image data in the TIFF form.

If the data is not image data, the electronic original file created in step S8010 is added as a new chapter to the book of the currently open book file (step S8030). As chapter attributes which common to book attributes, the corresponding values of book attribute are copied, and the remaining attributes are set to defaults prepared in advance.

If the data is image data, no new chapter is added basically, and each electronic original page contained in the electronic original file created in step S8010 is added to the designated chapter (step S8040). If, however, the book file is a newly created file, a new chapter is created, and each page of the electronic original file is added as a page belonging to the chapter. As for page attributes common to attributes on the upper layer, the corresponding attribute values are given. As for attributes defined in the application data and passed onto the electronic original file, the corresponding values are given. If, for example, N-up printing or the like is designated in the application data, the corresponding attribute value is passed on. In this manner, a new book file is created or a new chapter is added.

Figure 52:
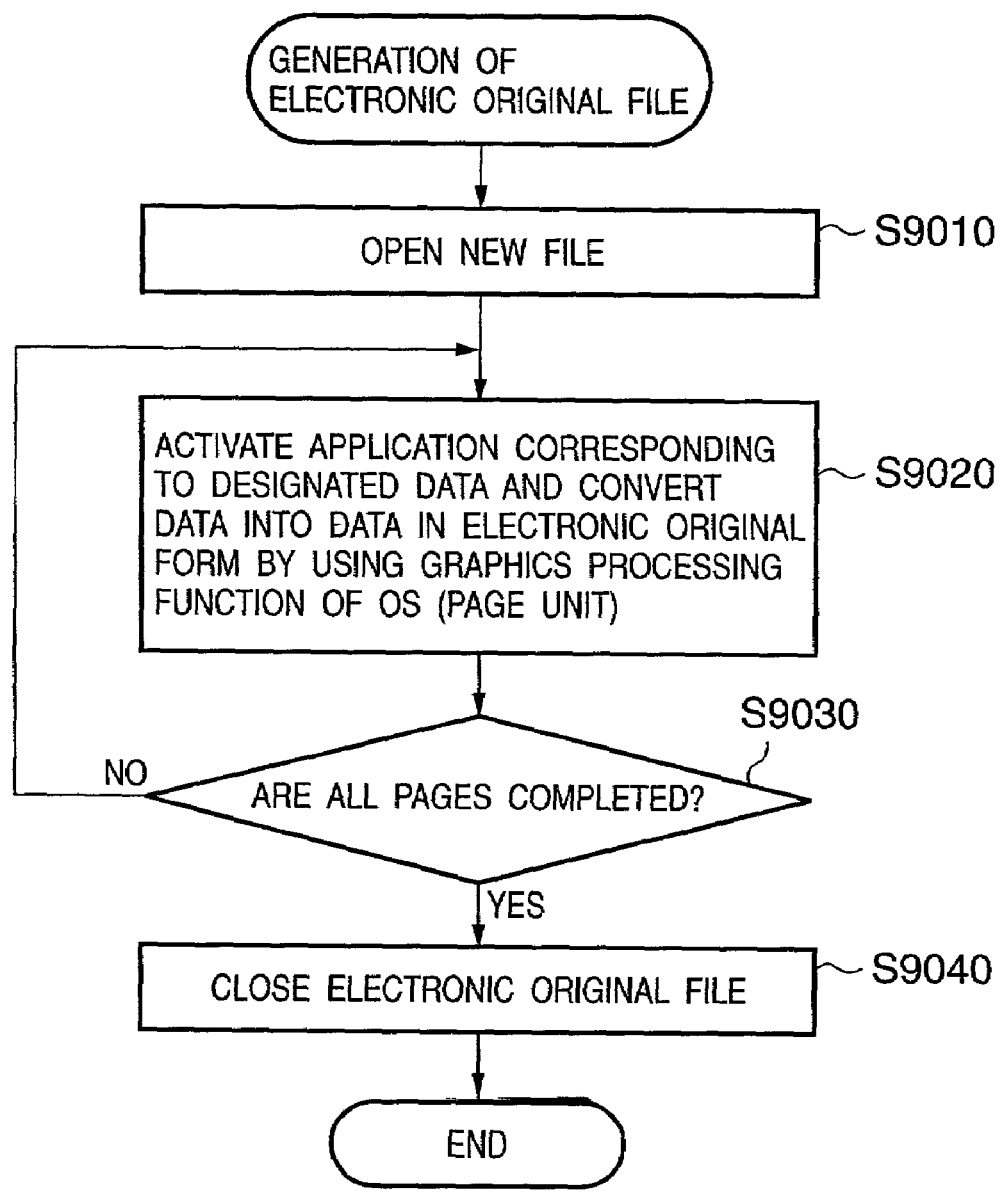
FIG. 52 is a flow chart showing a procedure for converting application data into an electronic original file.

FIG. 52 is a flow chart showing a procedure by which the electronic original writer 1020 creates an electronic original file in step S8010 in FIG. 51. First of all, a new electronic original file is created and opened (step S9010). An application corresponding to designated application data is activated, and the electronic original writer is used as a device driver so as to transmit an output command to the output module of the OS. The output module causes the electronic original writer to convert the received output command into data in the electronic original form and output it (step S9020). The output destination is the electronic original file opened in step S9010 (step S9030). It is checked whether conversion of all the designated data is completed (step S9030). If the conversion is completed, the electronic original file is closed (step S9040). The electronic original file created by the electronic original writer 1020 is a file containing the entity of original page data shown in FIG. 46B.

<Edition of Book File>

In the above manner, a book file can be created from application data. For the creased book file, the following edit operations can be performed for chapters and pages:

(1) newly add
(2) delete
(3) copy
(4) cut
(5) paste
(6) move
(7) rename chapter
(8) insert cover
(10) insert slit sheet
(11) insert index sheet
(12) page layout for each original page Other edit operations are canceling edit operation that has been done and redoing canceled operation. These edit functions allow the system to perform edit operations, e.g., merging a plurality of book files, rearranging chapters and pages in a book file, deleting a chapter or page in a book file, changing the layout of original pages, and inserting a slip sheet or index sheet. When such operation is performed, the operation result is reflected in the attributes shown in FIG. 47 or 5 or in the structure of a book file. If, for example, a blank page is newly added, the blank page is inserted in a designated portion. This blank page is handled as an original page. If the layout of an original page is changed, the changed contents are reflected in attributes such as "print method", "N-up printing", "cover/back cover", "index sheet", "slip sheet", and "chapter break".

<Output of Book File>

The final object of the book file created/edited in the above manner is to be printed out. If the user selects a file menu from the UI window 11000 of the bookbinding application shown in FIG. 53, and selects "print", the file is printed out by the designated output device. In this case, first of all, the bookbinding application 1040 creates a job ticket from the currently open book file and hands it to the electronic original de-spooler 1050. The electronic original de-spooler 1050 converts the job ticket into an OS output command, e.g., a GDI command of Windows, and transmits it to an output module, e.g., a GDI. The output module makes the designated printer driver 1060 to create a command suited for the device, and transmits it to the device.

A job ticket is data having a structure in which an original page is the minimum unit. The structure of the job ticket defines the layout of original pages on a paper sheet. One job ticket is issued for one job. Therefore, there is a node called "document" on the uppermost layer, in which the attributes of an overall document, e.g., two-sided printing/one-sided printing, are defined. A paper sheet node belongs to the subordinate layer, including attributes such as the identifier of a paper sheet to be used and the designation of a paper feed port in the printer. The node of a sheet printed on the corresponding paper sheet belongs to each paper sheet node. One sheet corresponding to one paper sheet. Print pages (physical pages) belong to each sheet. In one-sided printing, one physical page belongs to one sheet. In two-sided printing, two physical pages belong to one sheet. Original pages belong to each physical page. These original pages are laid out on each physical page. In addition, the attributes of each physical page include the layout of original pages.

The electronic original de-spooler 1050 converts the above job ticket into an output command to the output module.

<Other System Configurations>

The above description is about an outline of the document processing system according to this embodiment. This system is a standalone type system. In a server-client system as an expanded system, a book file is created and edited with almost the same arrangement and procedures. Note that book files and print processing are managed by the server.

FIG. 55 is a block diagram showing the arrangement of a server-client type document processing system. A client document processing system is obtained by adding a DOMS (Document Output Management Service) driver 1090 serving as a client module, a DOMS print service module 1100, and a DS (Document Service) client module 1080 to a standalone type system. A document management server 12010, print intensive management server 12020, and print server 12030 are connected to this client document processing system 12000. These servers are always connected to the client document processing system through a network. When the servers are to simultaneously function as clients, they are connected to the system by inter-process communication that simulates communication between networks. Referring to FIG. 55, the two serves, i.e., the document management server 12010 and the print intensive management server 12020, are connected to the client. However, only one of the servers may exist on the network. If the connected server is the document management server, a document management server client system 12010SC including the client module of the server is added to the standalone type document management system. If the connected server is the print intensive management server 12020, a print management server-client system 12020SC including the client module of the server is added to the stand-along type document management system.

The document management server 12010 is a server for storing the book file created and edited by the bookbinding application 1040. When the book file is to be managed by the document management server 12010, the book file is stored in a database 12110 of the document management server 12010 in place of the local HD of the client PC or in addition thereto. Storage and read of book files between the bookbinding application 1040 and the document management server 12010 are performed through the DS client 1080 and a DS core 12120.

The print intensive management server 12020 is a server for managing printing of the book file stored in the client document processing system 12000 or document management server 12010. A print request from a client is transmitted to a DOMSWG server module 12210 of the print intensive management server 12020 through the DOMS print service driver 1090 and DOMS print service module 1100. The print intensive management server 12020 transfers electronic original data to the electronic original despooler 1050 through the DOMS print service module 1100 of the client when printing is performed by the printer of the client. When printing is performed by the print server 12030, the print intensive management server 12020 transfers the electronic original data to the DOMS print service module 1100 of the print server 12030. The print intensive management server 12020 issues a print request for a stored book file, makes a security check on the qualification of a user or the like, and stores a log of print processing. As described above, the document processing system can be implemented both as a standalone system and a client-server system.

<Contents of Preview Display>

As has already been described above, when a book file is opened by a bookbinding application, the UI window 11000 shown in FIG. 53 is displayed. In the tree portion 11010, a tree indicting the structure of the open book (to be referred to as a book of interest hereinafter) is displayed. In the preview portion, three display methods are prepared in accordance with the designation made by the user. The first is a mode called an original view mode, in which original pages are displayed without any change. In the original view mode, the contents of the original pages belonging to the book of interest are reduced and displayed. The layout of pages is not reflected in the display in the preview portion. The second is a print view mode. In the print view mode, the original pages are displayed in the preview portion 1102 with the layout of the original pages being reflected. The third is a simple print view mode. In the simple print view mode, the contents of each original page are not reflected in the display in the previous portion and only the layout is displayed.

Embodiments associated with the bookbinding application 1040 will be described below.

<First Embodiment>

Figure 1:
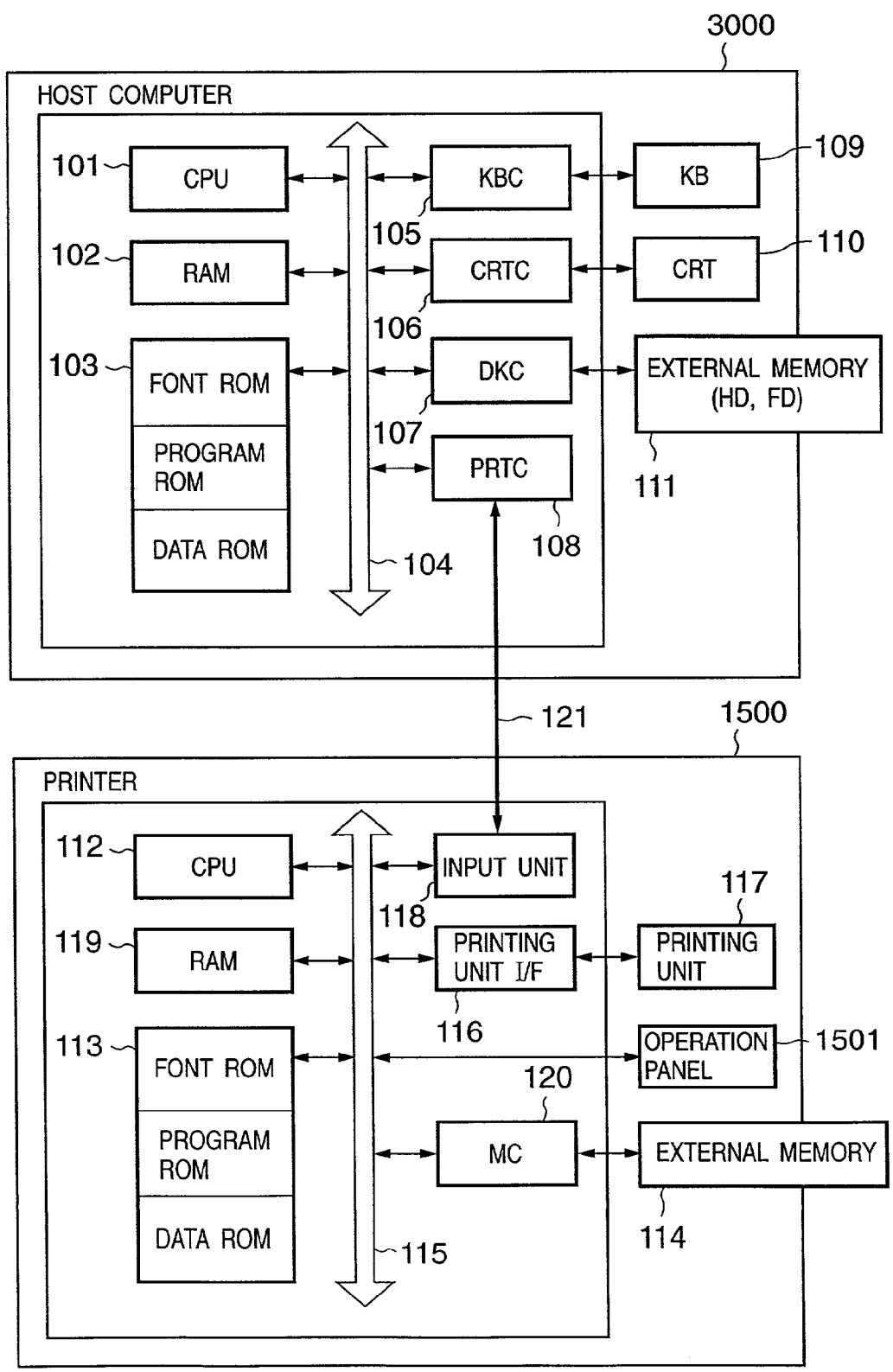
FIG. 1 is a block diagram for explaining the arrangement of a print control apparatus according to an embodiment of the present invention.

A preferred embodiment to which the present invention is applied will be described below. FIG. 1 is a block diagram for explaining the arrangement of a printer control system according to the first embodiment of the present invention. Note that the present invention can be applied to a single device, a system constituted by a plurality of devices, and a system designed to be connected through a network such as a LAN or WAN and perform processing as long as the functions of the present invention can be executed.

Referring to FIG. 1, a host computer 3000 includes a CPU 101 for processing documents containing graphic patterns, images, characters, tables (including spreadsheets and the like), and the like on the basis of the document processing program or the like stored in the program ROM of a ROM 103 or an external memory 111. The CPU 101 systematically controls the devices connected to a system bus 4. An operating system program (to be referred to as an OS hereinafter) or the like serving as a control program for the CPU 101 is also stored in the program ROM of the ROM 103 or the external memory 111. Font data and the like used for the above document processing are stored in the font ROM of the ROM 103 or the external memory 111. Various data used for the above document processing are stored in the data ROM of the ROM 103 or the external memory 111. The RAM 102 functions as the main memory, work area, and the like of the CPU 101.

A keyboard controller (KB) 105 controls key input operation using a keyboard 109 or pointing device (not shown). A CRT controller (CRTC) 106 controls the display operation of a CRT display (CRT) 110. A disk controller (DKC) 107 controls access to the external memory 111 such as a hard disk (HD) or floppy disk (FD) storing a boot program, various applications, font data, user files, edited files, print control command generation program (to be referred to as a printer driver hereinafter), and the like. A printer controller (PRTC) 108 is connected to the printer 1500 through a bidirectional interface (interface) 121 and executes communication control processing for the printer 1500.

Note that the CPU 101 performing rasterization processing of an outline font in the display information RAM set in the RAM 102 to realize WYSIWYG on the CRT display 110. In addition, the CPU 101 opens various registered windows on the basis of commands designated with a mouse cursor (not shown) on the CRT display 110 and executes various types of data processing. In executing printing, the user can open the window for print settings and set a print processing method for a printer driver, including setting for the printer and selection of a print mode.

A printer 1500 is controlled by a CPU 112. The CPU 112 outputs an image signal as output information to a printing unit (printer engine) 117 connected to a system bus 115 on the basis of a control program stored in the program ROM of a ROM 113 or a control program stored in an external memory 114. A control program or the like for the CPU 112 is also stored in the program ROM of the ROM 113. Font data or the like used to create the above output information is stored in the font ROM of the ROM 113. In a printer which does not have the external memory 114 such as a hard disk, information or the like used on a host computer is stored in the data ROM of the ROM 113.

The CPU 112 can communicate with a host computer through an input unit 118 and hence can notify the host computer 3000 of information or the like in the printer. A RAM 119 is a RAM functioning as the main memory, work area, and the like of the CPU 112. The memory capacity can be increased by an optional RAM connected to an expansion port (not shown). Note that the RAM 119 is used as an output information expansion area, environmental data storage area, NVRAM, or the like. A memory controller (MC) 120 controls access to the above external memory 114 such as a hard disk (HD) or IC card. The external memory 114 is connected as an option to store font data, an emulation program, form data, and the like. The input unit 118 has switches, LED display units, and the like which are operated by the above operation panel.

The number of external memories 114 to be used is not limited to one but a plurality of memories can be used. In addition to built-in fonts, a plurality of optional cards and external memories storing programs for interpreting printer control languages in different language systems can be connected. Furthermore, an NVRAM (not shown) may be used to store printer mode setting information from an operation panel 1501.

Figure 2:
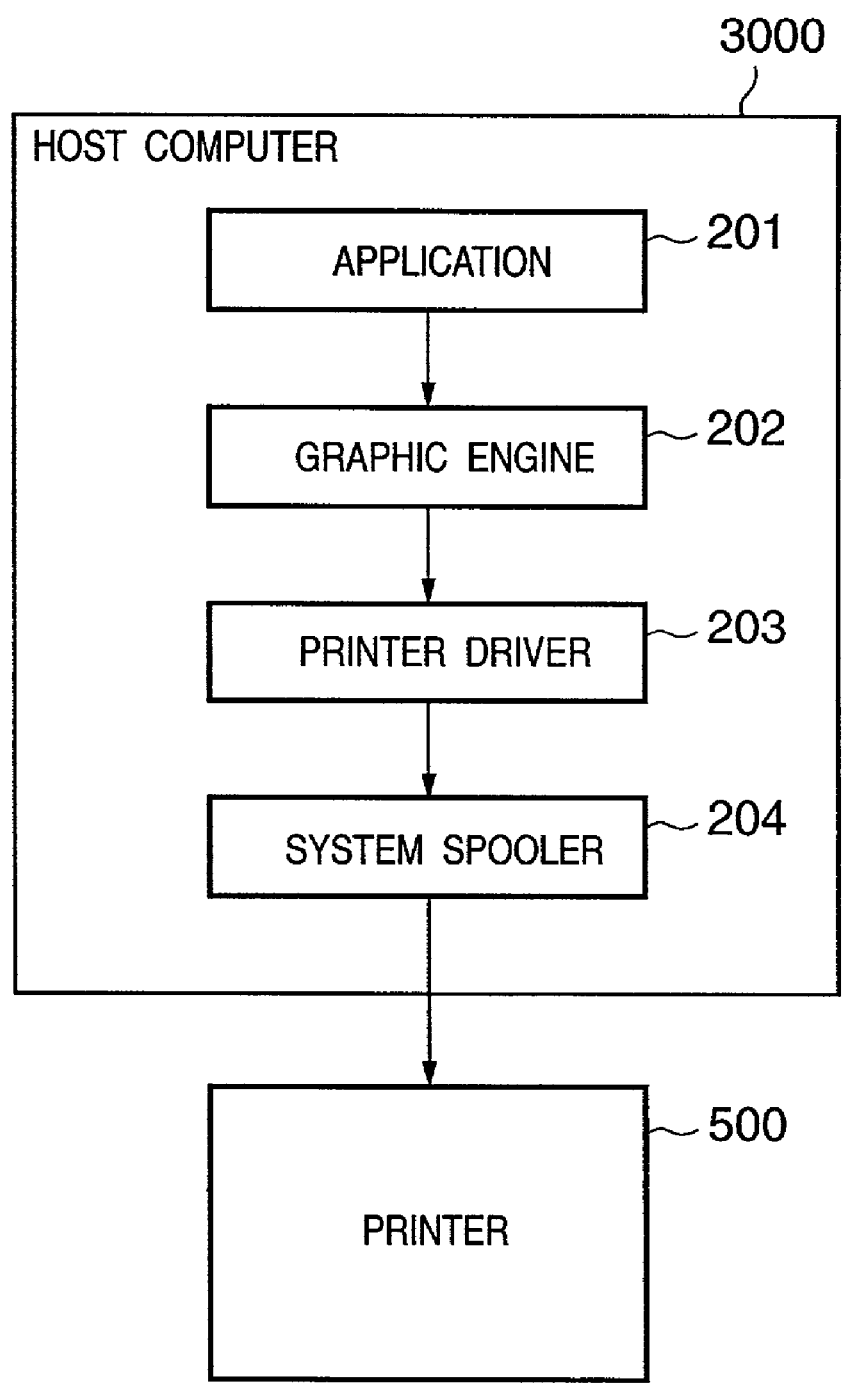
FIG. 2 is a block diagram showing the arrangement of a typical print system of a host computer to which a printer is connected.

FIG. 2 is a view showing an arrangement for typical print processing in a host computer to which a printing apparatus such as a printer is connected directly or through a network. Referring to FIG. 2, an application 201, graphic engine 202, printer driver 203, and system spooler 204 exist as files stored in the external memory 111, and serve as program modules loaded into the RAM 102 and executed by the OS or a module using a module of the OS. In addition, the application 201 and printer driver 203 can be added to the HD of an external disk 11 through the FD of the external memory 111, a CD-ROM (not shown), or a network (not shown). The application 201 stored in the external memory 111 is loaded into the RAM 102 and executed. When the application 201 causes the printer 1500 to perform printing, output (rendering) operation is done by using the graphic engine 202 that has been loaded into the RAM 102 and can be executed.

The graphic engine 202 loads the printer driver 203 prepared for each printing apparatus from the external memory 111 into the RAM 102, and sets an output from the application 201 in the printer driver 203. The graphic engine 202 then converts a GDI (Graphic Device Interface) function received from the application 201 into a DDI (Device Driver Interface) function, and outputs the DDI function to the printer driver 203. The printer driver 203 converts the DDI function received from the graphic engine 202 into a control command that can be recognized by the printer, e.g., a PDL (Page Description Language) command. The converted printer control command is output as print data to the printer 1500 through the system spooler 204 loaded into the RAM 102 by the OS and through the bidirectional interface 121.

Figure 3:
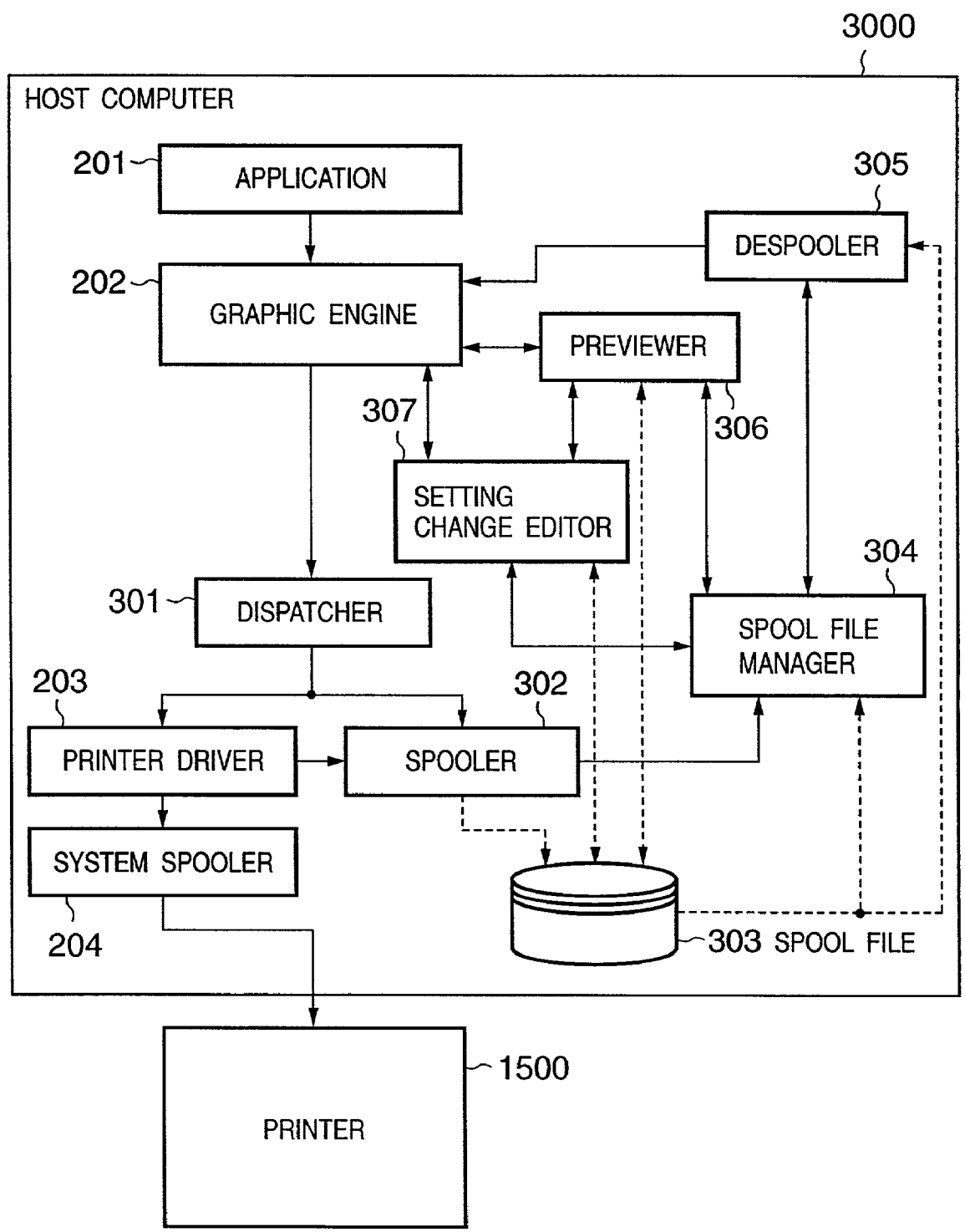
FIG. 3 is a bock diagram showing the print system designed to temporarily spool an intermediate code before converting a print instruction from an application into a printer control command.

The print system according to this embodiment includes the printer and host computer shown in FIG. 2 and is also designed to temporarily spool print data from an application as intermediate code data, as shown in FIG. 3.

FIG. 3 shows a system obtained by extending the system in FIG. 2. This system is designed to temporarily create a spool file 303 constituted by an intermediate code in transmitting a print instruction from the graphic engine 202 to the printer driver 203. In the system shown in FIG. 2, the application 201 is released from print processing when the printer driver 203 completely converts all print instructions from the graphic engine 202 into control commands for the printer. In contrast to this, in the system shown in FIG. 3, the application 201 is released when a spooler 302 converts all print instructions into intermediate code data and outputs them to the spool file 303. In general, the latter operation can be performed in a shorter period of time.

In addition, the system shown in FIG. 3 can process the contents of the spool file 303. This makes it possible to implement functions which the application does not have, e.g., the function of enlarging/reducing print data from the application and the function of printing a plurality of pages upon reducing them into one page.

For these purposes, the system shown in FIG. 2 is extended into the system in FIG. 3 which is designed to spool print instructions as intermediate code data. Note that in processing print data, settings are generally made on the window provided by the printer driver 203, and the printer driver 203 stores the contents of the settings in the RAM 102 or external memory 111.

The operation shown in FIG. 3 will be described in detail below. As shown in FIG. 3, in this extended processing scheme, a dispatcher 301 receives a DDI function as a print instruction from the graphic engine 202. If the print instruction (DDI function) received by the dispatcher 301 from the graphic engine 202 is based on a print instruction (GDI function) issued from the application 201 to the graphic engine 202, the dispatcher 301 loads the spooler 302 stored in the external memory 111 into the RAM 102, and sends the print instruction (DDI function) to the spooler 302 instead of the printer driver 203.

The spooler 302 analyzes the received print instruction, converts it into an intermediate code for each page, and outputs it to the spool file 303. The spool file of an intermediate code stored for each page will be referred to as a PDF (Page Description File). In addition, the spooler 302 acquires process settings (N-up printing, two-sided printing, stapling, color/monochrome designation, and the like) associated print data set for the printer driver 203 from the printer driver 203 and stores them in the spool file 303 as a file on a job basis. This setting file stored on a job basis will be referred to as a job setting file (to be sometimes referred to as a spool description file abbreviated as SDF).

This job setting file will be described later. Although the spool file 303 is created as a file in the external memory 111. However, this may be created in the RAM 102. The spooler 302 also loads a spool file manager 304 stored in the external memory 111 into the RAM 102 and notifies the spool file manager 304 of the generated state of the spool file 303. Thereafter, the spool file manager 304 checks whether printing can be performed in accordance with the contents of process settings associated with print data and stored in the spool file 303.

Upon determining that printing can be performed by using the graphic engine 202, the spool file manager 304 loads a de-spooler 305 stored in the external memory 111 into the RAM 102, and instructs the de-spooler 305 to perform print processing for the page description file of an intermediate code described in the spool file 303. The de-spooler 305 processes the page description file of the intermediate code contained in the spool file 303 in accordance with a job setting file containing process setting information contained in the spool file 303 to regenerate a GDI function, and outputs the GDI function again through the graphic engine 202.

If the print instruction (DDI function) which the dispatcher 301 has received from the graphic engine 202 is based on the print instruction (GDI function) issued from the de-spooler 305 to the graphic engine 202, the dispatcher 301 sends the print instruction to the printer driver 203 instead of the spooler 302. The printer driver 203 generates a printer control command constituted by a page description language or the like on the basis of the DDI function acquired from the graphic engine 202, and outputs it to the printer 1500 through the system spooler 204.

FIG. 3 shows an example of how a previewer 306 and setting change editor 307 are added to the extended system described above to allow preview display, changing of print settings, and merging of a plurality of jobs. To perform print preview display, change print settings, and merge a plurality of jobs, first of all, the user must designate "store" on a pull-down menu as a means for "designation of output destination". Note that if the user wants to see only a preview image, he/she may select "preview" in designating an output destination.

Figure 16:
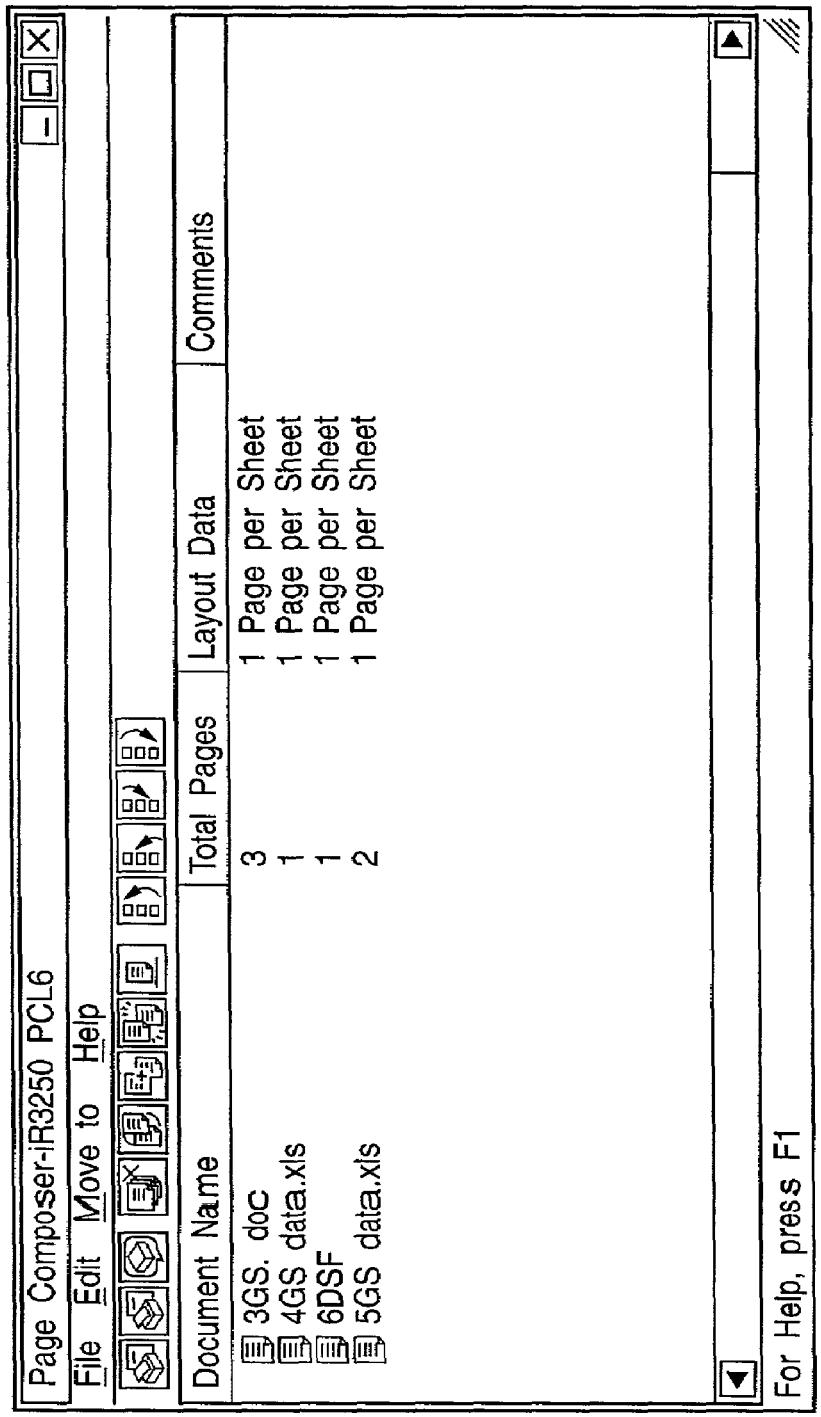
FIG. 16 is a view showing an example of a window for displaying a list of print jobs spooled in the spool file manager 304.

As described above, the contents set by the property of the printer driver are stored as a setting file in a structure provided by the OS (which is called DEVMODE according to a Windows OS). In this structure, for example, the process settings contained in the spool file 303 includes a setting that designates whether to store data in the spool file manager 304. When the spool file manager 304 reads process settings through the printer driver and "store" is designated, a page description file and job setting file are created and stored in the spool file 303, as described above, and a window of the spool file manager pops up as shown in FIG. 16, thereby displaying a list of jobs spooled in the spool file 303. FIG. 16 shows a case wherein four jobs are spooled. Each job can be operated by pressing a menu bar or a menu icon located immediately below the menu bar.

The number of operations with the menu bar is equal to that with the menu icon. In a job selected state, the types of operations include the following 11 operations: "print", "save and print" for saving a spool file of an intermediate code and printing it, "preview" for seeing an output preview image of a job in consideration of print settings, "delete" for deleting a spool file of an intermediate code, "copy" for generating a copy of a spool file of an intermediate code, "merge" for merging a plurality of jobs for spool files of intermediate codes into one job, "divide" for dividing a merged job into a plurality of original jobs, "job edition" for changing print settings (layout setting, finishing setting, and the like) for a single job or merged job, "move to top" for moving a given job to the top of the print order, "move upward by one place" for moving a given job toward the top of a print order by one place, "move downward by one place" for moving a given job to the bottom of a print order by one place, and "move to bottom" for moving a given to the bottom of a print order. If preview display of a single job or merged job is designated on the window (FIG. 16) of the spool file manager, the previewer 306 stored in the external memory 111 is loaded into the RAM 102, and an instruction is given to the previewer 306 to perform preview processing for the jobs of the intermediate codes described in the spool file 303.

The previewer 306 sequentially reads the page description files (PDFs) of intermediate codes contained in the spool file 303, and processes them in accordance with the contents of process setting information contained in the job setting file (SDF) stored in the spool file 303. The previewer 306 then outputs a GDI function to the graphic engine 202. The graphic engine 202 outputs rendering data to the self-client area, thus allowing the data output on the screen.

The graphic engine 202 can perform appropriate rendering in accordance with the designated output destination. Like the de-spooler 305, the previewer 306 can be implemented by processing the intermediate codes contained in the spool file 303 in accordance with the contents of process settings contained in the spool file 303, and outputting the resultant data by using the graphic engine 202. In this manner, the process settings set by the printer driver are stored in the spool file 303 as a job setting file, the data of a page description file is processed on the basis of this job setting file, and the processed data is output. This makes it possible to provide the user with a preview image indicating how the rendering data is actually printed or a print preview image similar to an image actually printed out by the printer in accordance with a case wherein N-up printing (printing N logic pages upon reducing them into one physical page) is designated, a case wherein two-sided printing is designated, a case wherein booklet printing is designated, or a case wherein stamping is designated. Note that the preview function of conventional application software such as a document creation application performs rendering on the basis of page settings in the application, and hence print settings in the printer driver are not reflected. Therefore, it is impossible to make the user recognize a preview image similar to an actual image printed out by the printer.

Figure 17:
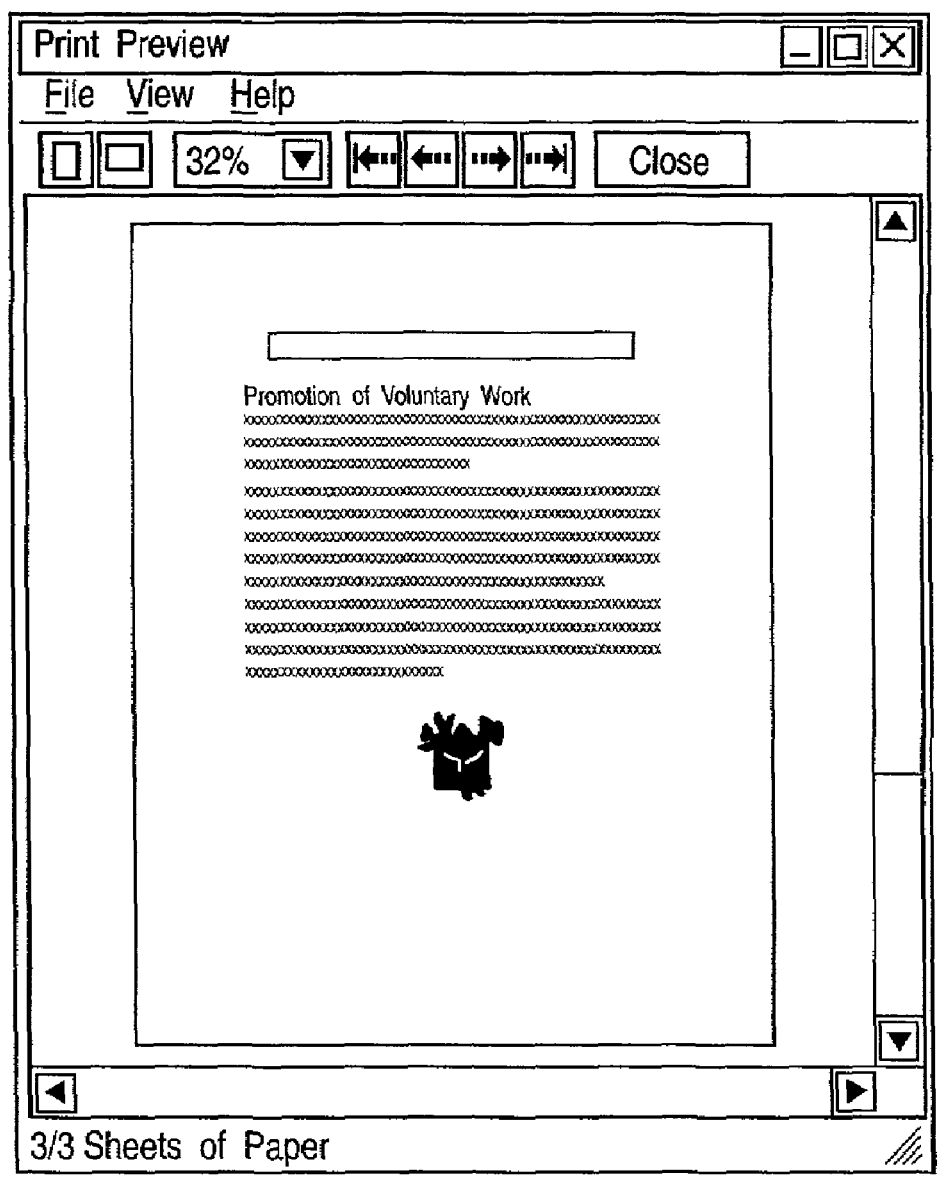
FIG. 17 is a view showing an example of a window on a previewer 306.

By performing the preview processing in the above manner, a large preview image based on the print process settings contained in the spool file 303 is displayed on the screen by the previewer 306, as shown in FIG. 17. When the user closes the previewer 306 by issuing an instruction to stop display afterward, control shifts to the window (FIG. 16) of the spool file manager.

When the user is to perform printing in accordance with the contents displayed by the previewer 306, he/she issues a print request by designating "print" or "save and print" on the spool file manager 304. As described above, when the print request is issued, the de-spooler 305 generates a GDI function by processing the page description file on the basis of a job setting file, and sends the GDI function to the graphic engine 202. A print instruction is then sent to the printer driver 203 through the dispatcher 301, thus executing printing.

Setting change operation using the setting change editor 307 will be described next. According to a method of implementing this operation, as in the case of the preview function, settings can be made with respect to a job for which "store" is designated in FIG. 9. In accordance with the same flow of processing as described above, the spool file manager 304 is popped up to display a list of spooled jobs. If "job edition" is designated on the window (FIG. 16) of the spool file manager and a setting change instruction is generated, the setting change editor 307 stored in the external memory 111 is loaded into the RAM 102, and an instruction is given to the setting change editor 307 to display the current or default process settings. A job setting window like the one shown in FIG. 18 is then displayed.

Figure 18:
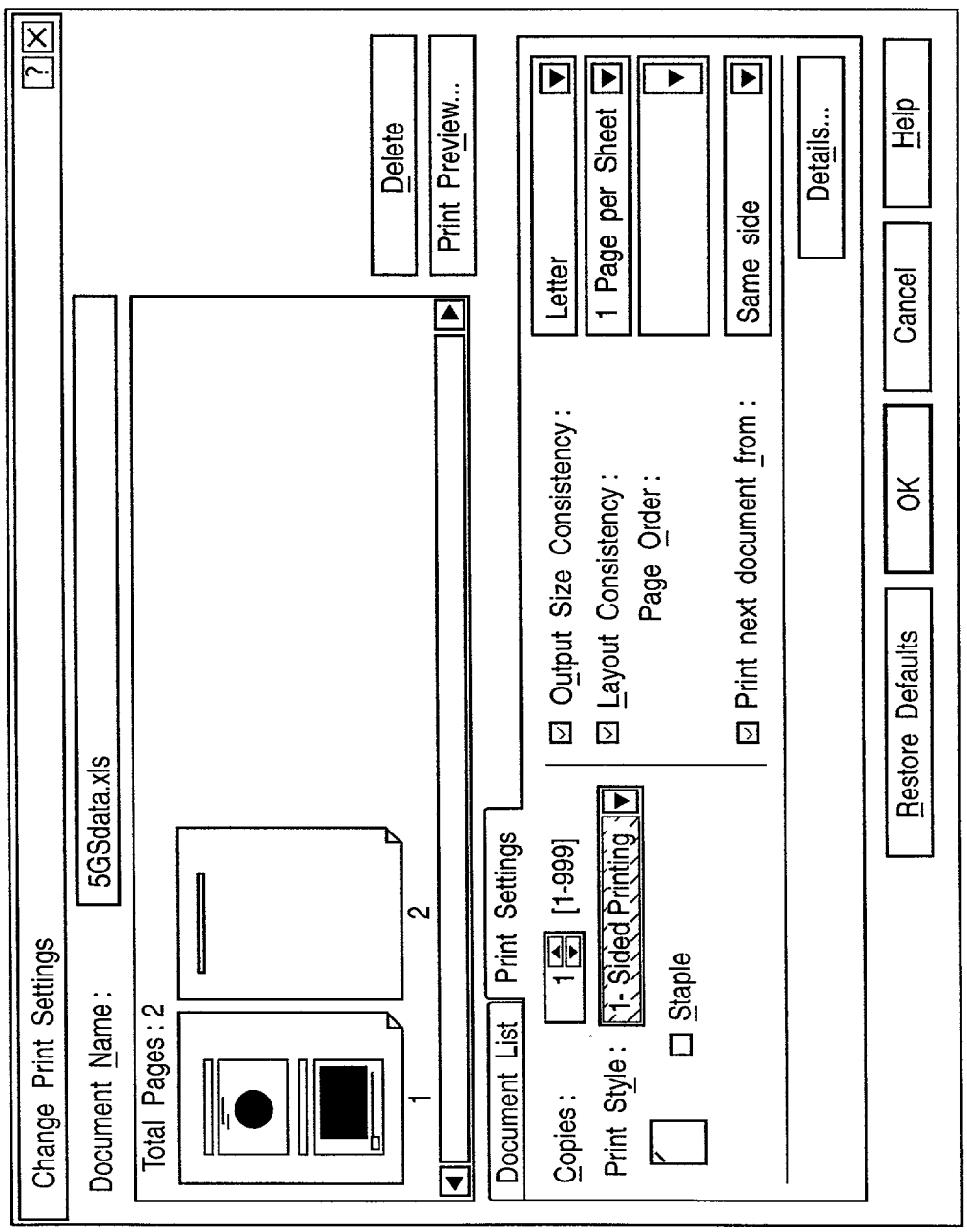
FIG. 18 is a view showing an example of a window on the setting change editor 307.

The setting change editor 307 acquires the job setting file of the job for which "job edition" is designated from the spool file 303, and changes default values on the job setting window in FIG. 18 on the basis of the setting items designated in the job setting file. In the case shown in FIG. 18, in the job setting file for which "job edition" is designated, the following are designated: copies: 1, print style: one-sided printing, staple: no, layout consistency: one page per sheet, and the like.

The setting change editor 307 also processes the page description file of the intermediate code contained in the spool file 303 in accordance with the contents of the process settings contained in the job setting file stored in the spool file 303, and outputs the resultant data to a self-client area by using the graphic engine 202, thereby outputting a small preview image on the window in FIG. 18.

In addition, the contents of the process settings contained in the job setting file stored in the spool file 303 can be changed and modified. In this case, the items in the printer driver 203 which can be set may be held in the user interface on the setting change editor 307 or the user interface of the printer driver 203 itself may be invoked. As shown in FIG. 18, the number of copies, a print method (one-sided printing, two-sided printing, or booklet printing), staple (Saddle Finisher or the like), a page layout, a page order, and the like can be designated, and most of the items that can be designated by the printer driver can be changed by pressing "customize settings". Note, however, that changing of settings associated with print quality such as the resolution and graphic mode is inhibited.

The items changed in this case are approved in accordance with an approval request on the setting change editor 307, and control shifts to the spool file manager 304. With regard to the approved items, the changes in print settings are stored. They are not stored in the original job setting file but are stored in a newly created job output setting file used for job edition. The details of the job output setting file will be described later with reference to FIG. 10 and subsequent drawings.

When the user is to perform printing in accordance with the contents of changed settings as in the case of a check on the previewer 306, he/she issues a print request on the spool file manager 304. The print request is sent to the graphic engine 202 and transmitted to the printer driver 203 through the dispatcher 301, thereby executing printing.

In addition, on the window (FIG. 16) of the spool file manager, the operation of merging a plurality of print jobs and printing them as one print job can be designated. As in the case of preview operation and setting change operation, this operation is also based on jobs for which "store" is designated as an output destination in the property of the printer driver in FIG. 9.

Figure 9:
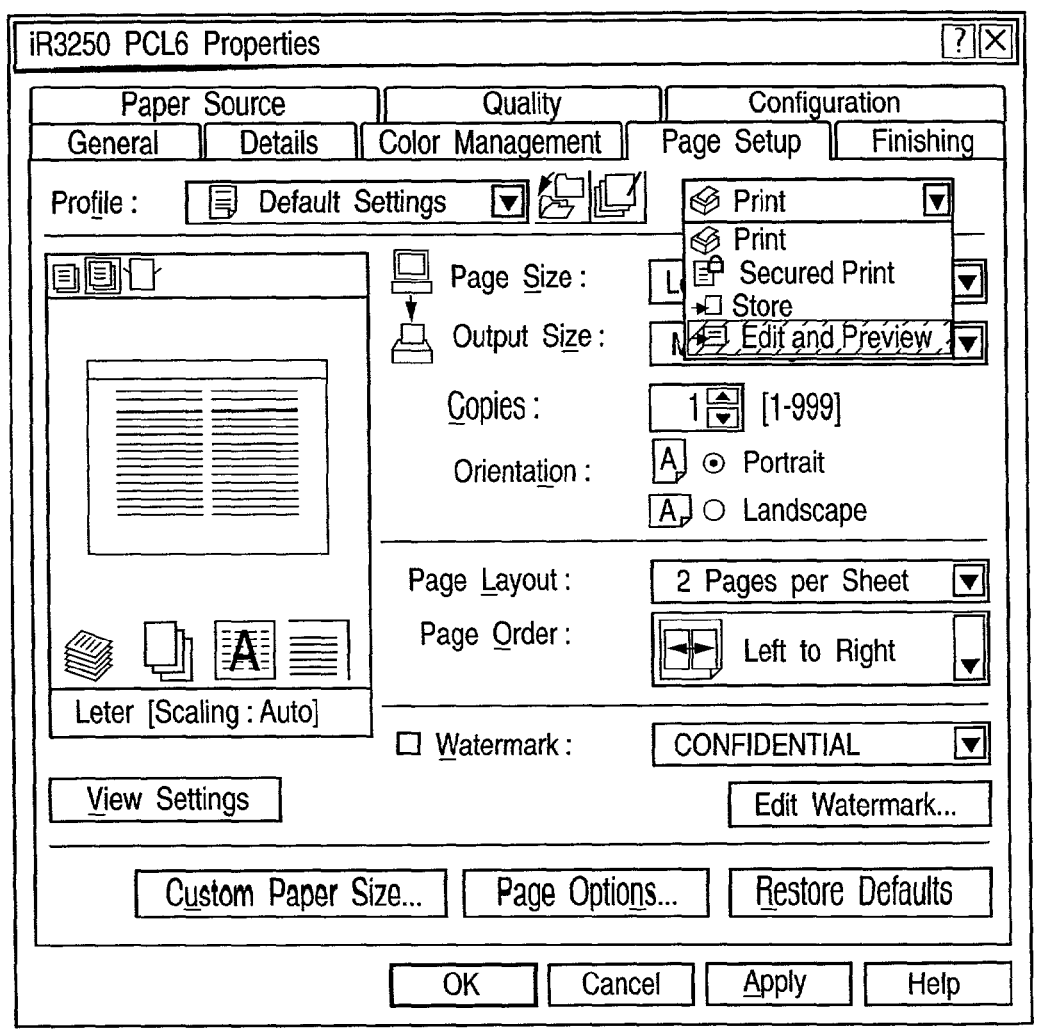
FIG. 9 is a view showing an example of a print spool setting window.

When the user is to merge print jobs, he/she invokes first the printer driver 203 from the application 201 and then selects "store" on a user interface like the one shown in FIG. 9. As in the above case, when "store" is selected, the spool file 303 is stored and the window (FIG. 16) of the spool file manager pops up, as shown in FIG. 16. A list of spooled jobs is displayed on the window of the spool file manager. By performing the same operation on the application 201, a list of a plurality of jobs is displayed on the spool file manager 304.

When a plurality of jobs are selected and "merge" is designated, the setting change editor 307 stored in the external memory 111 is loaded into the RAM 102, and the setting change editor 307 is instructed to display the first job of the list or default process settings. As a consequence, a merge setting window like the one shown in FIG. 18 is displayed. In this case, the setting change editor 307 is used as the merge setting window. However, another module may be used.

The setting change editor 307 processes page description files of intermediate codes contained in the spool file 303 in accordance with the contents of process settings contained in job setting information stored in the spool file 303, and outputs all the jobs designated as merge jobs to the self-client area by using the graphic engine 202, thereby outputting the jobs onto the window. In this case, a thumbnail preview of all the selected jobs can be made in the preview area shown in FIG. 18. When a merged job is to be generated, a job output setting file is created by expanding a job setting file of each single job. This job output setting file is also created in performing job edition; one file is created per job. Such a file is also created for one merged job.

In this case, the respective jobs can be displayed in accordance with process settings before merging, or can be displayed as a merged job in accordance with changed/modified process settings for all the jobs. In this case, items that can be set by the printer driver 203 may be held in the user interface on the setting change editor 307, or the user interface of the printer driver 203 itself may be invoked.

In this case, the merged job and changed items are approved in accordance with an approval request on the setting change editor 307, and control shifts to the spool file manager 304. With these operations, the selected jobs are displayed as one merged job on the window of the spool file manager. When the user is to perform printing in accordance with the contents of changed settings as in the case where the user makes a check on the previewer 306, a print request is issued on the spool file manager 304. The print request is sent to the graphic engine 202 and transmitted to the printer driver 203 through the dispatcher 301, thus executing printing.

Figure 4:
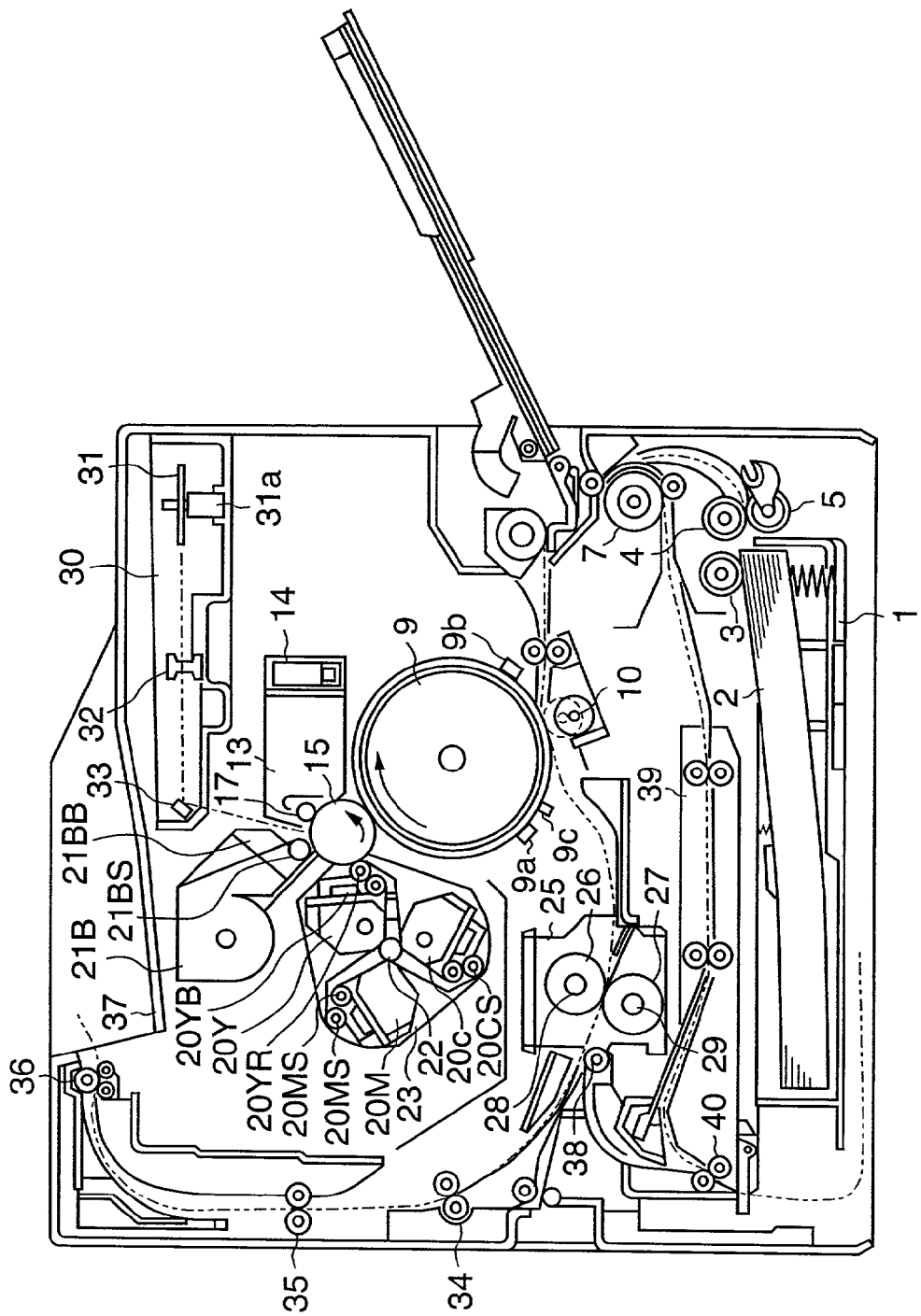
FIG. 4 is a sectional view for explaining the printer in the present invention.

FIG. 4 is a sectional view of a color laser printer as an example of the printer 1500, which has a two-sided printing function. This printer scans a photosensitive drum 15, by using a polygon mirror 31, with a laser beam modulated by image data of each color obtained on the basis of print data input from the host computer 3000 and forms an electrostatic latent image. Each electrostatic latent image is developed with toner to obtain a visible image. These visible images of all the colors are superimposed/transferred onto an intermediate transfer member 9 to form a visible color image. This visible color image is transferred onto a transfer material 2 and fixed thereon. An image forming unit for performing the above control is comprised of a drum unit 13 having the photosensitive drum 15, a primary charging unit having a contact charge roller 17, a cleaning unit, a developing unit, the intermediate transfer member 9, a paper feed unit including a paper cassette 1 and various rollers 3, 4, 5, and 7, a transfer unit including a transfer roller 10, and a fixing unit 25.

The drum unit 13 is formed by integrating the photosensitive drum (photosensitive member) 15 and a cleaner container 14 also serving as a holder for the photosensitive drum 15 and having a cleaning function. The drum unit 13 is detachably supported on the printer main body and is designed to be easily replaced with a new unit in accordance with the service life of the photosensitive drum 15. The photosensitive drum 15 is formed by coating the outer surface of an aluminum cylinder with an organic photoconductive layer and rotatably supported by the cleaner container 14. The driving force of a driving motor (not shown) is transmitted to the photosensitive drum 15 to rotate the drum. The driving motor rotates the photosensitive drum 15 counterclockwise in accordance with image forming operation. An electrostatic latent image is formed by selectively exposing the surface of the photosensitive drum 15. A scanner unit 30 reflects a modulated laser beam by using a polygon mirror that is rotated by a motor 31a in synchronism with a horizontal sync signal of an image signal, and irradiates the photosensitive drum with the laser beam through a lens 32 and reflecting mirror 33.

The developing unit includes three color developing devices 20Y, 20M, and 20C for developing yellow (Y), magenta (M), and cyan (C) images and one black developing device 21B. The color developing devices 20Y, 20M, and 20C and black developing device 21B respectively have sleeves 20YS, 20MS, 20CS, and 21BS and coating blades 20YB, 20MB, 20CB, and 21BB which are respectively pressed against the outer surfaces of the sleeves 20YS, 20MS, 20CS, and 21BS. The three color developing devices 20Y, 20M, and 20C respectively have coating rollers 20YR, 20MR, and 20CR.

The black developing device 21B is detachably mounted on the printer main body, and the color developing devices 20Y, 20M, and 20C are detachably mounted on a developing rotary unit 23 that rotates about a rotating shaft 22.

The sleeve 21BS of the black developing device 21B is placed at a short distance of about 300 μm from the photosensitive drum 15. The black developing device 21B feeds toner by using a feed member incorporated in the device, and charges the toner by triboelectrification to coat the outer surface of the sleeve 21BS, which rotates clockwise, with the toner by the coating blade 21BB. A developing bias is applied to the sleeve 21BS to perform development on the photosensitive drum 15 in accordance with an electrostatic latent image, thereby forming a visible image on the photosensitive drum 15 using black toner.

In forming images, the three color developing devices 20Y, 20M, and 20C rotate upon rotation of the developing rotary unit 23, and the sleeves 20YS, 20MS, and 20CS oppose the photosensitive drum 15 at a short distance of about 300 μm. The color developing devices 20Y, 20M, and 20C then stop at developing positions opposing the photosensitive drum 15, and visible images are formed on the photosensitive drum 15.

In forming a color image, the developing rotary unit 23 rotates as the intermediate transfer member 9 makes one revolution, and developing is performed in the order of the yellow developing device 20Y, magenta developing device 20M, cyan developing device 20C, and black developing device 21B. As the intermediate transfer member 9 makes four revolutions, visible images using yellow, magenta, cyan, and black toners are sequentially formed. As a consequence, a full-color visible image is formed on the intermediate transfer member 9.

The intermediate transfer member 9 is in contact with the photosensitive drum 15 and rotates as the photosensitive drum 15 rotates. In forming a color image, the intermediate transfer member 9 rotates clockwise and is subjected to multiple (4-time) transfer of visible images from the photosensitive drum 15. In forming an image, the transfer roller 10 comes into contact with the intermediate transfer member 9 to convey the transfer material 2 with the material being clamped therebetween. With this operation, visible color images on the intermediate transfer member 9 are simultaneously multiple-transferred onto the transfer material 2. A TOP sensor 9a and RS sensor 9b for detecting the position of the intermediate transfer member 9 in the rotating direction and a density sensor 9c for detecting the density of a toner image transferred onto the intermediate transfer member are arranged around the outer surface of the intermediate transfer member.

The transfer roller 10 has a transfer charger supported to be able to come into contact with and separate from the photosensitive drum 15, and is formed by winding an intermediate-resistance foamed elastic member around a metal shaft. As indicated by the solid lines in FIG. 4, the transfer roller 10 is located below the intermediate transfer member 9 so as not to disturb visible color images while the visible color images are multiple-transferred onto the intermediate transfer member 9. After the visible color images of the four colors are formed on the intermediate transfer member 9, the transfer roller 10 is set at the upper position indicated by the dotted lines in FIG. 4 by using a cam member (not shown) in accordance with the timing of transfer of the visible color images onto the transfer material 2. With this operation, the transfer roller 10 is pressed against the intermediate transfer member 9 through the transfer material 2 with a predetermined pressing force, and a bias voltage is applied, thus transferring the visible color images formed on the intermediate transfer member 9 onto the transfer material 2.

The fixing unit 25 fixes the transferred visible color images while conveying the transfer material 2, and includes a fixing roller 26 for heating the transfer material 2 and a press roller 27 for pressing the transfer material 2 against the fixing roller 26. The fixing roller 26 and press roller 27 have hollow portions, in which heaters 28 and 29 are respectively incorporated. That is, the transfer material 2 holding the visible color images is conveyed by the fixing roller 26 and press roller 27, and the toner is fixed on the surface of the transfer material 2 upon application of heat and pressure. The transfer material 2 after fixing of the visible images is discharged onto a paper discharge unit 37 by paper discharge rollers 34, 35, and 36. The image forming operation is then completed.

The cleaning means cleans the toner left on the photosensitive drum 15 and intermediate transfer member 9. Waste toner after the transfer of the visible toner images formed on the photosensitive drum 15 onto the intermediate transfer member 9 or waste toner after the transfer of the visible color images of the four colors formed on the intermediate transfer member 9 onto the transfer material 2 is stored in the cleaner container 14.

The transfer material (print paper sheet) 2 on which images are printed is picked up from the paper tray 1 by the feed roller 3 and conveyed while being clamped between the intermediate transfer member 9 and the transfer roller 10, thereby printing a color toner image on the transfer material 2. The transfer material 2 passes through the fixing unit 25, which fixes the toner image on the transfer material 2. In one-sided printing, a convey path is formed such that a guide 38 guides a print paper sheet to the upper paper discharge unit. In two-sided printing, a path is formed to guide a print paper sheet to a two-sided unit located at a lower position.

The print paper sheet guided to the two-sided unit is temporarily conveyed to a portion (the convey path indicated by the chain double-dashed line) below a tray 1 by a convey roller 40, and then conveyed in the opposite direction to be transferred onto a double-sided tray 39. On the double-sided tray 39, the paper sheet is reversed with respect to the state in which it is placed on the paper tray 1, and also reversed in the convey direction. By transferring and fixing toner images on the paper sheet again in this state, two-sided printing can be done.

Figure 5:
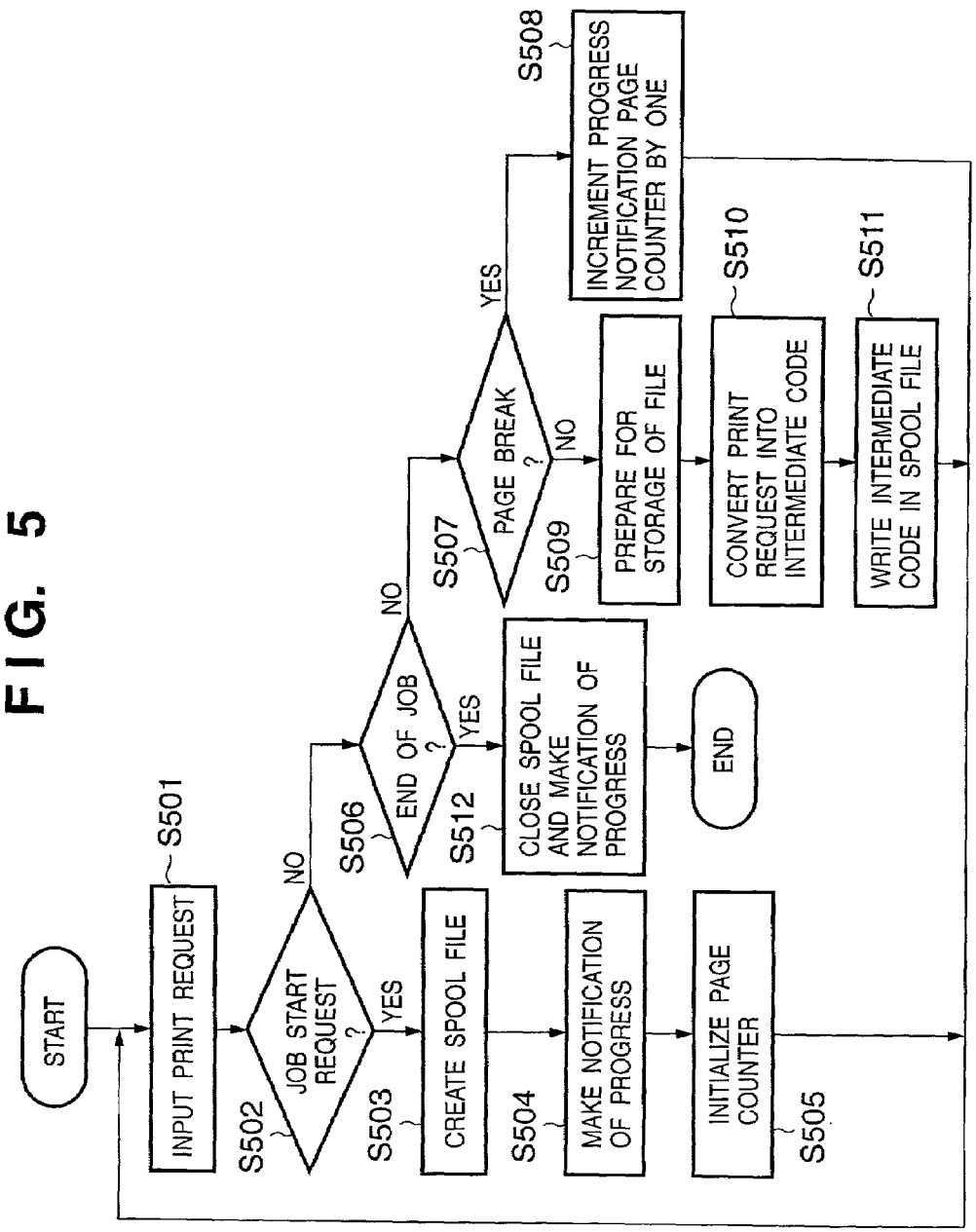
FIG. 5 is a flow chart showing processing in a spooler 302.
Figure 8:
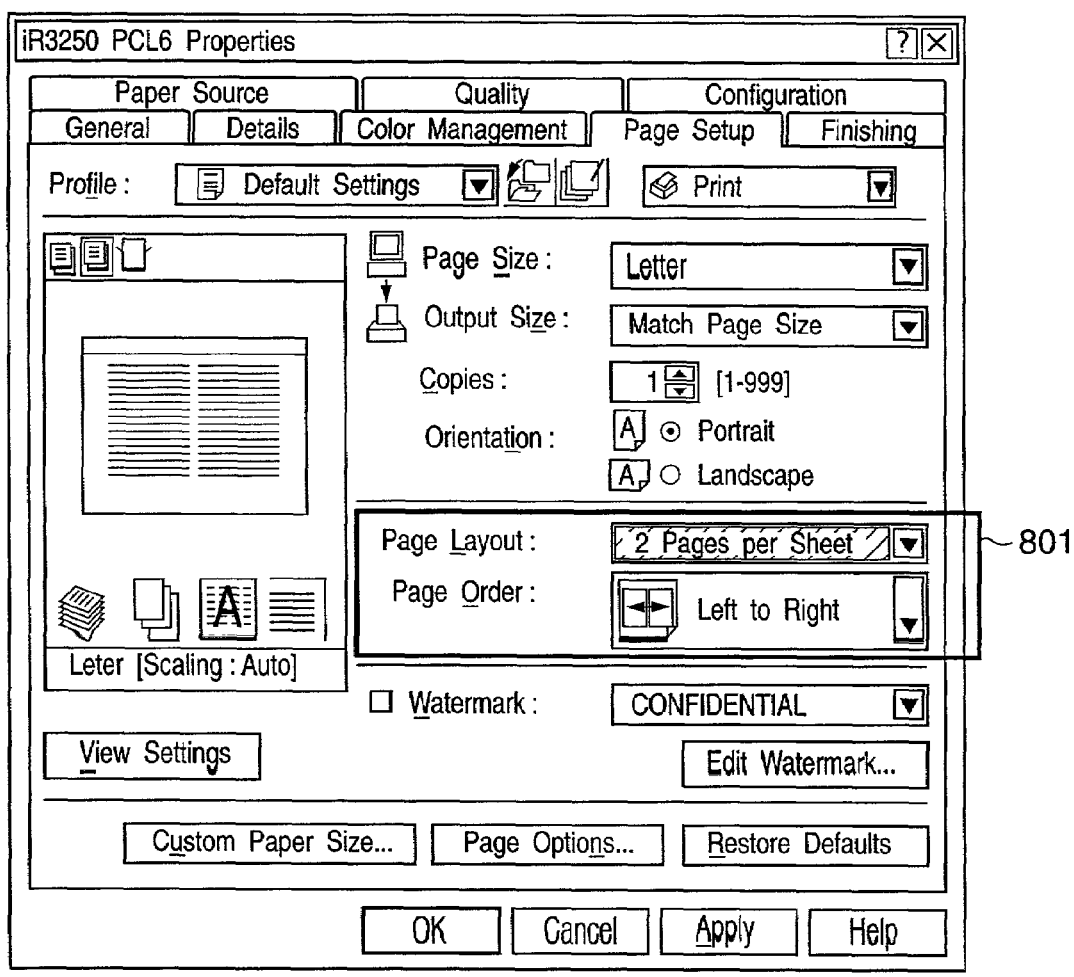
FIG. 8 is a view showing an example of a print setting window.

FIG. 5 is a flow chart showing the processing of a storage step for each page in creating the spool file 303 in the spooler 302. In step S501, the spooler 302 receives a print request from an application through the graphic engine 202. In the application, a dialog for inputting print settings like that shown in FIG. 8 is displayed, and the print settings input from this dialog are transferred from the printer driver to the spooler 302. The setting input dialog shown in FIG. 8 includes a setting item 801 or the like for determining the number of logic pages to be laid out on one physical page.

In step S502, the spooler 302 checks whether the received print request is a job start request. If it is determined in step S502 that the received request is a job start request, the flow advances to step S503, in which the spooler 302 creates the spool file 303 for temporarily storing intermediate data. In step S504, the spooler 302 notifies the spool file manager 304 of the progress of print processing. In step S505, the page counter of the spooler 302 is initialized to 1. In this case, the spool file manager 304 reads the information and process settings of a job for which printing is started from the spool file 303 and stores them.

If it is determined in step S502 that the request is not a job start request, the flow advances to step S506. In step S506, the spooler 302 checks whether the received request is a job end request. If the spooler 302 determines that the received request is not a job end request, the flow advances to step S507 to check whether the request is a page break request. If it is determined in step S507 that the request is a page break request, the flow advances to step S508 to notify the spool file manager 304 of the progress of print processing. The page counter is then incremented, and the page description file storing the intermediate code is closed. A next page description file is then created.

If it is determined in step S507 that the received print request is not a page break request, the flow advances to step S509, in which the spooler 302 makes a preparation to write an intermediate code in the page description file. In step S510, to store the print request in the spool file 303, the spooler 302 converts the DDI function of the print request into an intermediate code. In step S511, the spooler 302 writes the print request (intermediate code), which has been converted in the form that allows the request to be stored in step S510, in the page description file of the spool file 303. The flow then returns to step S501 to receive a print request from the application again. The processing from step S501 to step S511 is repeated until a job end request (End Doc) is received from the application. At the same time, the spooler 302 acquires information such as process settings stored in the DEVMODE structure from the printer driver 203, and stores the information as a job setting file in the spool file 303.

If it is determined in step S506 that the print request from the application is a job end request, since all the print requests from the application are executed, the flow advances to step S512 to notify the spool file manager 304 of the progress of print processing, thereby terminating the processing.

Figure 6:
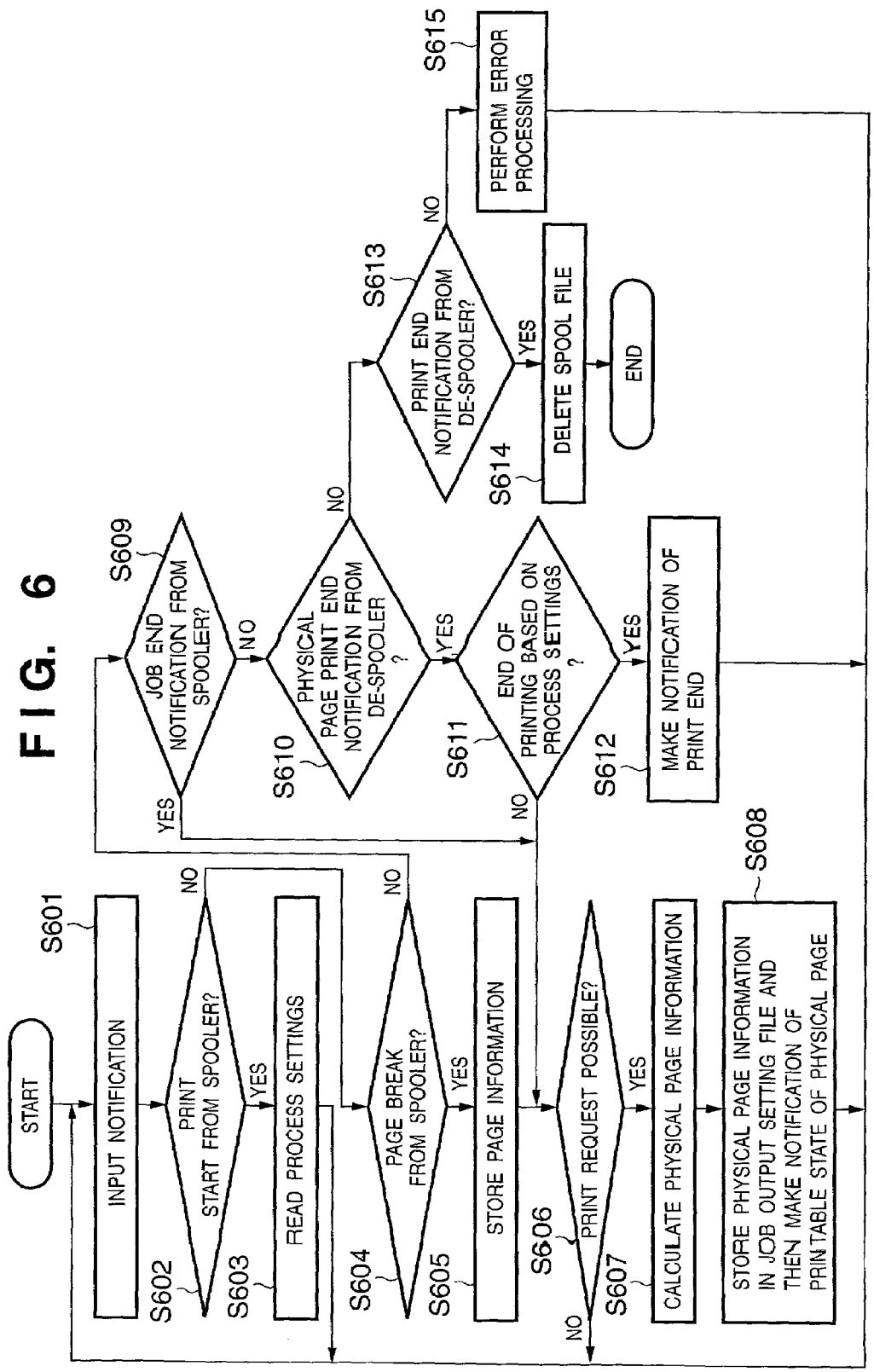
FIG. 6 is a flow chart showing print control in a spool file manager 304.

FIG. 6 is a flow chart showing the details of control between a spool file 303 creation process and a print data creation process (to be described below) in the spool file manager 304. Referring to FIG. 6, in step S601, the spool file manager 304 receives notification of the progress of print processing from the spooler 302 or de-spooler 305. In step S602, the spool file manager 304 checks whether the progress notification is a print start notification from the spooler 302 in step S504. If YES in step S602, the flow advances to step S603 to read print process settings from the spool file 303 and start job management.

If it is determined in step S602 that the notification is not a print start notification from the spooler 302, the flow advances to step S604, in which the spool file manager 304 checks whether the progress notification is a print end notification about one logic page from the spooler 302. If YES in step S604, the flow advances to step S605 to store logic page information corresponding to this logic page. In step S606, it is checked whether printing of one physical page can be started with respect to n logic pages completely spooled at this point of time. If YES in step S606, the flow advances to step S607 to determine a physical page number from the number of logic pages laid out on one physical page to be printed.

Consider calculations of physical pages. If, for example, a process setting is made to lay out four logic pages on one physical page, the first physical page can be printed when the fourth logic page is spooled. As a consequence, the first physical page is set. Subsequently, the second physical page can be printed when the eighth logic page is spooled. Even if the total number of logic pages is not a multiple of the number of logic pages laid out on one physical page, logic pages to be laid out on one physical page can be determined from the spool end notification in step S512.

Figure 10:
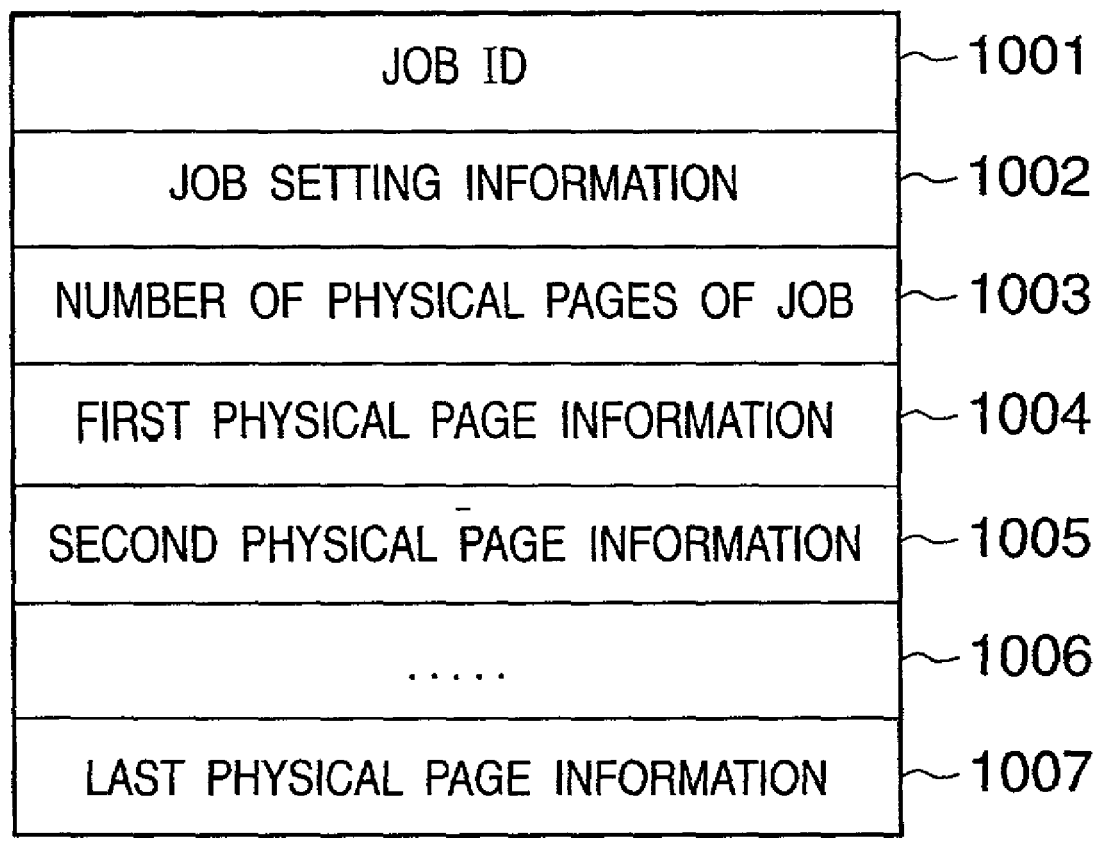
FIG. 10 is a view showing an example of a job output setting file storing information constituting physical pages which are generated by the spool file manager 304 and can be printed in step S608.

In step S608, information such as a logic page number constituting the physical page that can be printed and the physical page number is stored in a job output setting file (a file containing physical page information) in the form shown in FIG. 10, and the de-spooler 305 is notified that physical page information corresponding to one physical page is added. The flow then returns to step S601 to wait for the next notification. In this embodiment, print processing can be done when 1-page print data, i.e., logic pages constituting one physical page, is spooled even if print job spooling is not completed.

If it is determined that the progress notification is not a print end notification of one logic page from the spooler 302, the flow advances to step S609, in which the spool file manager 304 checks whether the notification is a job end notification from the spooler 302 in step S512 described above. If YES in step S609, the flow advances to step S606.

If NO in step S609, the flow advances to step S610, in which the spool file manager 304 checks whether the received notification is a print end notification of one physical page from the de-spooler 305. If YES in step S610, the flow advances to step S611 to check whether the printing based on the process settings is completed. If YES in step S611, the flow advances to step S612 to notify the de-spooler 305 of the end of printing.

If NO in step 611, the flow advances to step S606 described above. In this embodiment, the de-spooler 305 is designed on the basis of one physical page as a unit in print processing. In step S608, information required for print processing of one physical page is sequentially stored in a file in the form that allows reuse of the information. If such information need not be reused, an implementation form may be used, which uses a high-speed medium such as a shared memory and sequentially overwrites information on a physical page basis, thereby increasing the speed and saving the resources. In addition, when de-spooling progresses faster than spooling or de-spooling is started after all pages are spooled, the number of times of notification can be decreased by making a notification indicating that a plurality of physical pages or all physical pages can be printed, in accordance with the process of de-spooling, instead of notifying the permission of page printing for each physical page in step S608.

If it is determined in step S610 that the notification is not a print end notification about one physical page from the de-spooler 305, the flow advances to step S613, in which the spool file manager 304 checks whether the notification is a print end notification from the de-spooler 305. If YES in step S613, the flow advances to step S614, in which the spool file manager 304 deletes the corresponding page description file of the spool file 303 and terminates the processing. If, however, the notification is not a print end notification from the de-spooler 305, the flow advances to step S615 to perform other normal processing and wait for the next notification.

Figure 7:
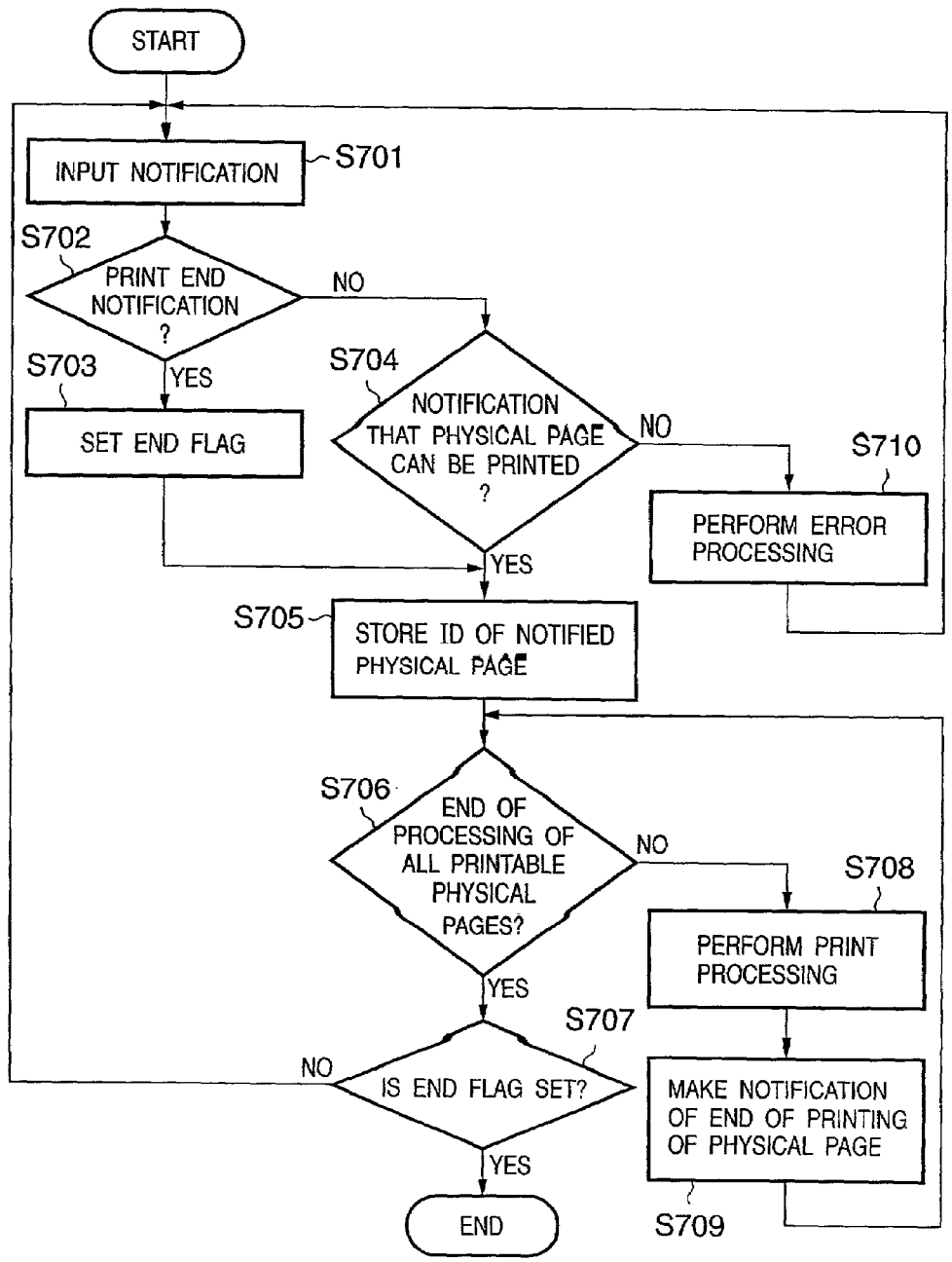
FIG. 7 is a flow chart showing processing in a de-spooler 305.

FIG. 7 is a flow chart showing the details of a print data creation process in the de-spooler 305. Referring to FIG. 7, the de-spooler 305 reads necessary information (a page description file and job setting file) from the spool file 303 in accordance with a print request from the spool file manager 304, and creates print data. The same method as that described with reference to FIG. 3 is used as a method of transferring created print data to the printer.

In creating print data, in step S701, a notification is input from the spool file manager 304. In step S702, the de-spooler 305 checks whether the input notification is a job end notification. If YES in step S702, the flow advances to step S703 to set an end flag. The flow then advances to step S705. If it is determined in step S702 that the notification is not a job end notification, the flow advances to step S704 to check whether a print start request for one physical page in step S608 is notified. If NO in step S704, the flow advances to step S710 to perform other error processing, and the flow returns to step S701 to wait for the next notification.

If it is determined in step S704 that the request is a print start request for one physical page, the flow advances to step S705, in which the de-spooler 305 stores the ID of the physical page that can be printed, for which a notification is received in step S704. In step S706, the de-spooler 305 checks whether print processing is completed for all pages corresponding to the physical page IDs stored in step S705. If YES in step S706, the flow advances to step S707 to check whether an end flag is set in step S703. If YES in step S707, it is regarded that job printing is completed, and the spool file manager 304 is notified that the processing in the de-spooler 305 is completed. The processing is then terminated. If it is determined in step S707 that an end flag is not set, the flow returns to step S701 to wait for the next notification.

If it is determined in step S706 that a physical page that can be printed is left, the flow advances to step S708, in which the de-spooler 305 sequentially reads the IDs of unprocessed physical pages from the stored physical page IDs, and reads information required to create print data of physical pages corresponding to the read physical page IDs, thereby performing print processing. In the print processing, the de-spooler 305 converts a print request instruction stored in the spool file 303 into data in the form (GDI function) that allows the graphic engine 202 to recognize, and transfers the resultant data.

As in this embodiment, process settings (to be referred to as N-page printing hereinafter) for laying out a plurality of logic pages on one physical page are converted in consideration of a reduced layout in step S708. When necessary print processing is completed, the flow advances to step S709 to notify the spool file manager 304 of the end of creation of print data of one physical page. The flow then returns to step S706 again to repeat the above processing until print processing for all the IDs of physical pages that are stored in step S705 and can be printed is completed.

The above description concerns the flow of print processing using the dispatcher 301, spooler 302, spool file manager 304, and de-spooler 305. With the above processing, the application 201 is released from the print processing at the timing when the spooler 302 creates an intermediate code and stores it in the spool file 303. Therefore, the time required for processing is shorter than that required when an intermediate code is directly output to the printer driver 203. In addition, print data is temporarily stored, in the spool file 303, as an intermediate file (page description file and job setting file) based on the print settings in the printer driver. This makes it possible to make the user recognize a print preview image to be actually printed or merge and rearrange print jobs generated by a plurality of applications. This also allows the user to change the print settings without activating the application and printing an image.

In print processing using the spooler 302 in this case, a job output setting file is created when the de-spooler 305 issues a print request to the graphic engine 202. A job output setting file is also created when preview operation, job merging, or the like is performed. A job output setting file is equivalent to a job setting file for a single job. In the case of a merged job, this file is created on the basis of pieces of job setting information. A job output setting file will be described below.

FIG. 10 shows an example of the job output setting file storing information constituting physical pages that are created by the spool file manager 304 and can be printed. A field 1001 corresponds to an ID for identifying a job. This ID can be stored in the form of the name of a file or shared memory storing this information. A field 1002 corresponds to job setting information. The job setting information contains information that can be set by only one piece for one job, e.g., the designation of a structure required for the graphic engine 202 to start printing the job, the designation of N-page printing, the designation of additional rendering of a page frame or the like, and the designation of finishing such as the number of copies or stapling. As the job setting information 1002, necessary information is stored in accordance with functions for the job. A field 1003 corresponds to the number of physical pages in the job, indicating the number of pieces of physical page information stored after this field. Since this embodiment uses the scheme of notifying the number of physical pages that can be printed, this system can operate without this field. After this field, physical page information is stored from a field 1004 to the last field by the number indicated by the field 1003. Physical page information will be described with reference to FIG. 12.

FIG. 11 shows an example of the job setting information in the field 1002 in FIG. 10. A field 1101 corresponds to the total number of physical pages. A field 1102 corresponds to the total number of logic pages. For example, the fields 1101 and 1102 are added to print data to print the number of pages and the like as additional information. During printing, the two fields are set to provisional values. Alternatively, the spool file manager 304 postpones creating information of physical pages that can be printed until the end of printing. A field 1103 corresponds to copy count information for designating the number of copies of this print job. A field 1104 corresponds to the designation of execution of printing on a set basis when the field 1103 is set to print a plurality of copies. The field 1104 is designated when finishing information such as stapling, punching, or Z-folding is set and a finisher is prepared inside or outside the printer main body. A field 1106 corresponds to additional print information, in which information to be added to a job is stored, including ornamental information such as a page frame, additional information such as a date, a user name, the number of pages, watermark printing, and the like. As the number of functions increases, the number of fields contained in this job setting information increases. If, for example, two-sided printing can be performed, a field for holding the designation of two-sided printing is added.

Figure 12:
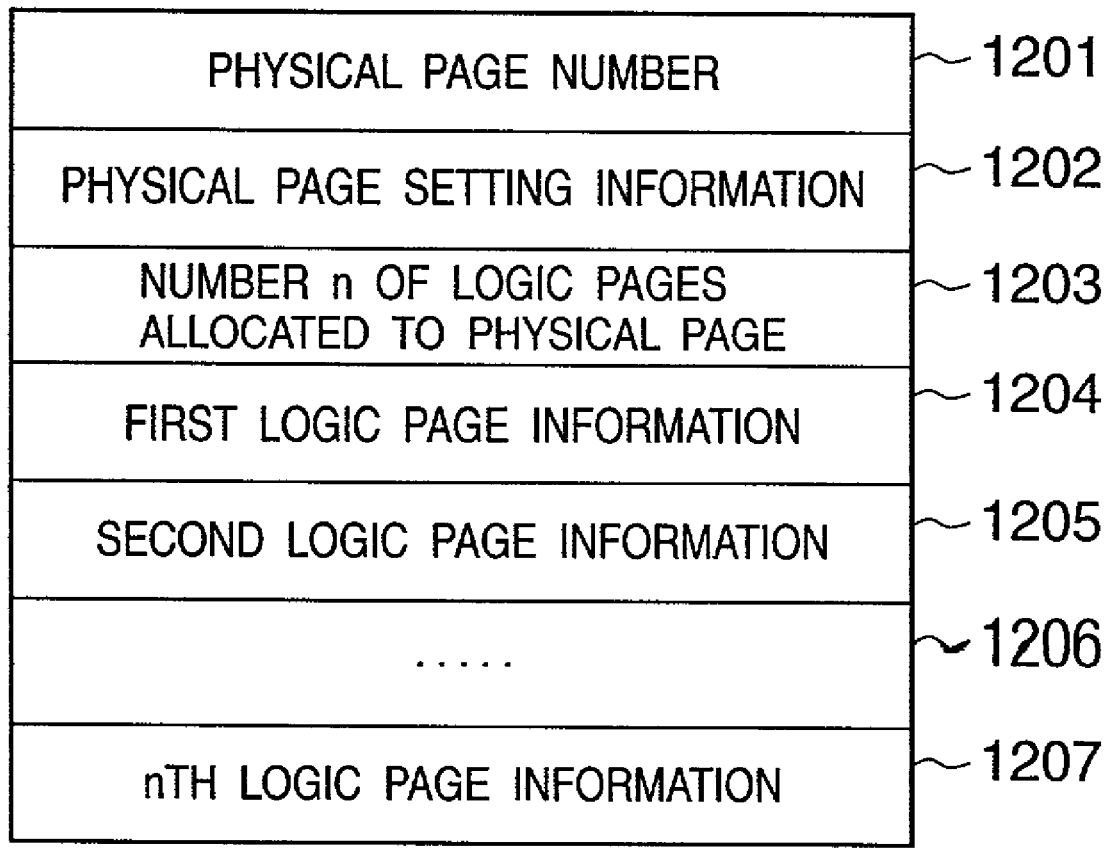
FIG. 12 is a view showing an example of the physical page information in a field 1004 of FIG. 10.

FIG. 12 shows an example of the physical page information in the field 1004 in FIG. 10. A first field 1201 corresponds to a physical page number, which is a value used when a print order is managed or a physical page number is additionally printed. A field 1202 corresponds to physical page setting information. This field is used to store settings about a layout or color/monochrome printing when a layout or color/monochrome printing can be designated for each physical page. A field 1203 corresponds to the number of logic pages allocated to this physical page. If, for example, four pages are allocated to one physical page, "4" or an ID indicating 4-page printing is stored in this field. In a field 1204 and subsequent fields, pieces of information of logic pages are stored by the number designated by the field 1203. The number of actual page data may become smaller than the number of pages designated by the field 1203 depending on the number of pages printed by the application 201. In this case, special data indicating a blank page is stored as logic page information.

FIG. 13 shows an example of the physical page setting information in the field 1202. A field 1301 corresponds to the layout order of logic pages on a physical page. This field is used to store the designation of an order (e.g., sideways from upper left or downward from upper left) of logic pages laid out on a physical page. In some systems, the pieces of logic page information after the field 1204 are arranged in the layout order instead of the order of page numbers so as to substitute for the field 1301. A field 1302 corresponds to information indicating the upper or lower surface of a sheet subjected to two-sided printing. For example, this information is used to uniformly set binding margins on upper or lower surfaces.

A field 1303 corresponds to the designation of a color page or monochrome page. When a printer has the monochrome mode and color mode, this value is used for a document having color and monochrome pages to print a color page in the color mode and a monochrome page in the monochrome mode. With this information, an automatic color mode can be implemented, in which processing can be changed for each page in a color printer. More specifically, transfer control on a color page can be performed by rotating an intermediate transfer member (intermediate transfer drum or intermediate transfer belt) or a transfer member (transfer drum or transfer belt) by the number of times corresponding to the number of device colors, four in the case of Y, M, C, and K, whereas transfer control on a monochrome page can be performed by rotating the member only once for black. A field 1304 corresponds to additional print information, which is used to print additional information such as the number of pages or a date on a physical page. Fields are added to such physical page setting information as well depending on the functions of the system.

Figure 14:
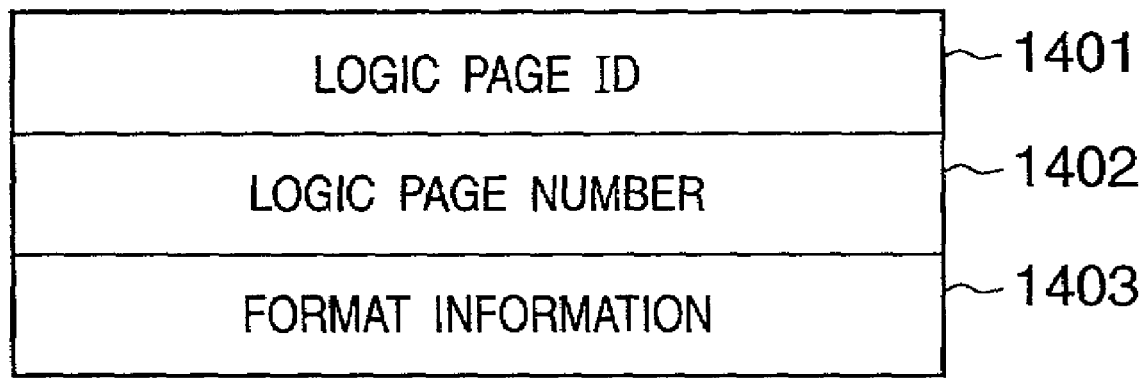
FIG. 14 is a view showing an example of the data format transferred from the spool file manager 304 to the de-spooler 305 in generating a print request for a physical page.

FIG. 14 shows an example of the logic page information in the field 1204. A field 1401 corresponds to the ID of a logic page. This ID is used to look up the intermediate code of a page description file corresponding to the logic page in the spool file 303. It suffices if the intermediate code of a logic page can be accessed by using this ID. In this field, therefore, a file, a memory pointer, or the intermediate code itself which constitutes the logic page may be set. A field 1402 corresponds to a logic page number, which is used when the logic page number is printed as additional information or used as auxiliary information for the logic page ID. As format information in a field 1403, various setting items that can be designated on a logic page basis are stored. If needed, attribute information about a logic page, e.g., color/monochrome information on a logic page basis, can be stored in this field. In a system in which settings need not be changed for each logic page or any attribute information on a logic page basis is not required, the field 1403 is not required.

A job output setting file has the above arrangement. Note that a job setting file has almost the same arrangement. This file has, as a job, print appearance information (one-sided printing, two-sided printing, or booklet printing), print layout information (N-up printing or poster printing), additional information (addition of a watermark, date, and user name), copy count information, and paper size information, and is comprised of information about the layout order of logic pages, information indicting the upper or lower surface of a sheet subjected two-sided printing, information indicating the color mode, and the like for each physical page.

FIG. 3 shows an example of the system obtained by adding the setting change editor 307 having the job setting change function to the extended system described above. In this embodiment, the setting contents of a job are included in a job setting file in the case of a single job, and in the job output setting file in FIG. 10 in the case of a merged job. Since such a file is independent of the spool file 303 storing an intermediate code, the settings of the job can be changed by remaking the job output setting file. The setting change editor 307 remakes the job output setting file or partly rewrites it singly or in association with the spool file manager 304, thereby implementing the job setting change function.

Figure 15:
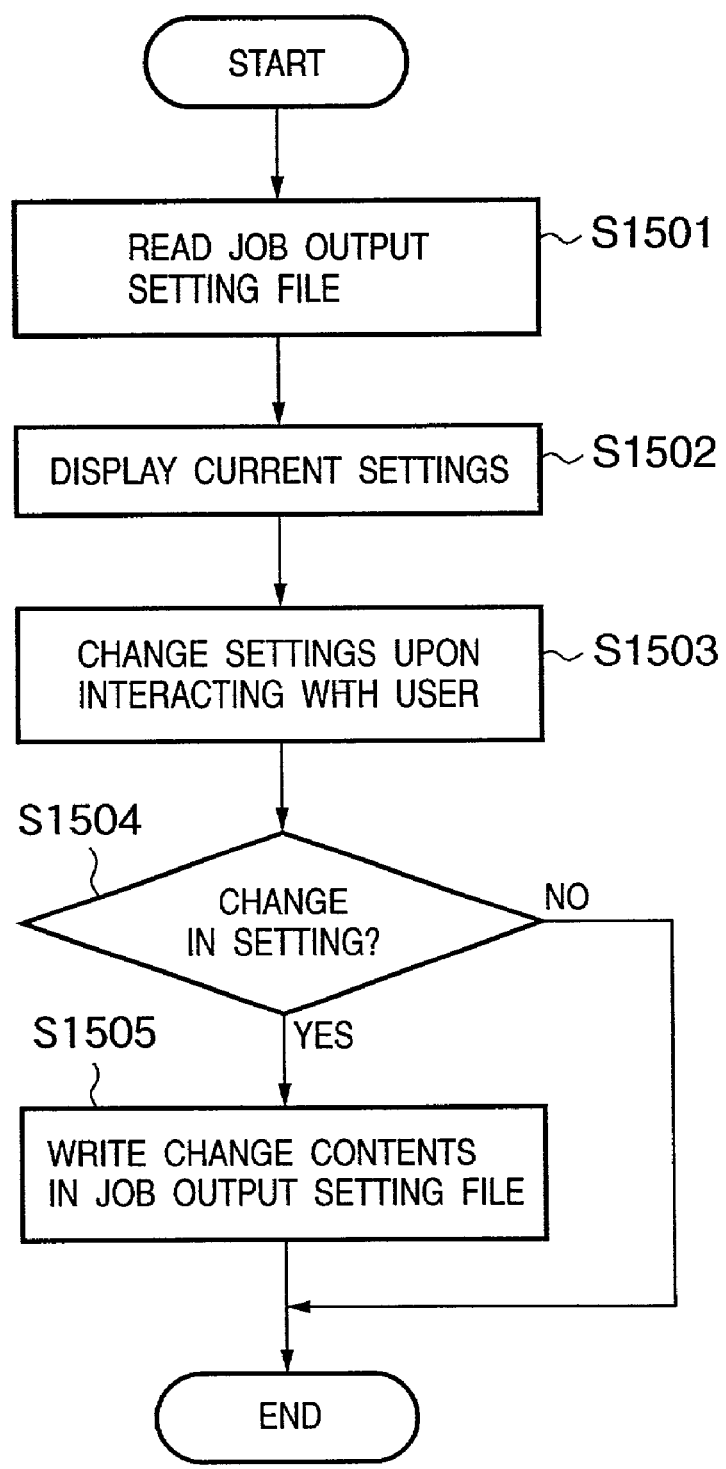
FIG. 15 is a flow chart showing setting change processing in a setting change editor 307.

FIG. 15 is a flow chart showing the details of a job setting change process in the setting change editor 307. In step S1501, the setting change editor 307 reads a job setting file or job output setting file. The job output setting file is identical to a file that the de-spooler 305 and spool file 303 read. The flow then advances to step S1502 to display the read result to the user. In step S1503, the setting change editor 307 interacts with the user on a user interface like the one shown in FIG. 18 to change setting contents upon designation or the like on the menu described above. This step may be performed in the batch form of changing settings in accordance with the contents of setting changes written in a file or the like instead of the interactive form.

Subsequently, the flow advances to step S1504 to check whether the contents read by the setting change editor 307 in step S1501 differ from the currently designated setting contents. If YES in step S1504, the flow advances to step S1505 to create a new job output setting file and notify the spool file manager 304 that the settings are changed, thus terminating the processing. If NO in step S1504, the setting change editor 307 notifies the spool file manager 304 that the settings are not changed and terminates the processing. A new job output setting file is created in this manner. When the "OK" button on the user interface window in FIG. 18 is selected, the new job output setting file becomes effective, and the old job output setting file is deleted. When settings are changed by using a job setting file for a single job instead of a job output setting file, the old file is not deleted but stored.

If the "restore defaults" button is selected on the window in FIG. 18, the new job output setting file is deleted, and the old job output setting file becomes effective, which is reflected in display. In this embodiment, the setting change editor 307 is described as a single module. However, this module may be part of the user interface of the spool file manager 304. Another implementation form may be used, which is designed to notify the spool file manager 304 of only the contents of setting changes instead of actually writing the change contents in a job output setting file by using the setting change editor 307, and the job output setting file is actually changed on the spool file manager 304 side.

FIG. 3 shows the expanded system for merging a plurality of print jobs and printing them as one print job. System extension for de-spooling/previewing a merged job will be described below.

In general, the spool file 303 in the intermediate form is created on a job basis. In the case of a single job, since the intermediate codes of the respective logic pages in a target job file are sequentially read and processed, the logic page ID in the field 1401 can be realized by a relative or absolute offset indicating the specific position of each logic page in the file. In the case of a merged job, a spool file and information of pages belonging to the job must be specified from the job ID in the field 1401. In this embodiment, a spool file is specified by adding an ID for identifying the spool file to a logic page ID. In this case, it suffices if only the annular aperture stop 1401 is changed as a main point to be changed. This is because, if a spool file can be identified, a read of a page portion can be processed by the same logic as that for processing of a single job. According to another implementation form, if a spool file is stored as a single file for each logic page, the file name of each logic page may be set as the logic page ID in the field 1401 without any change.

Figure 19:
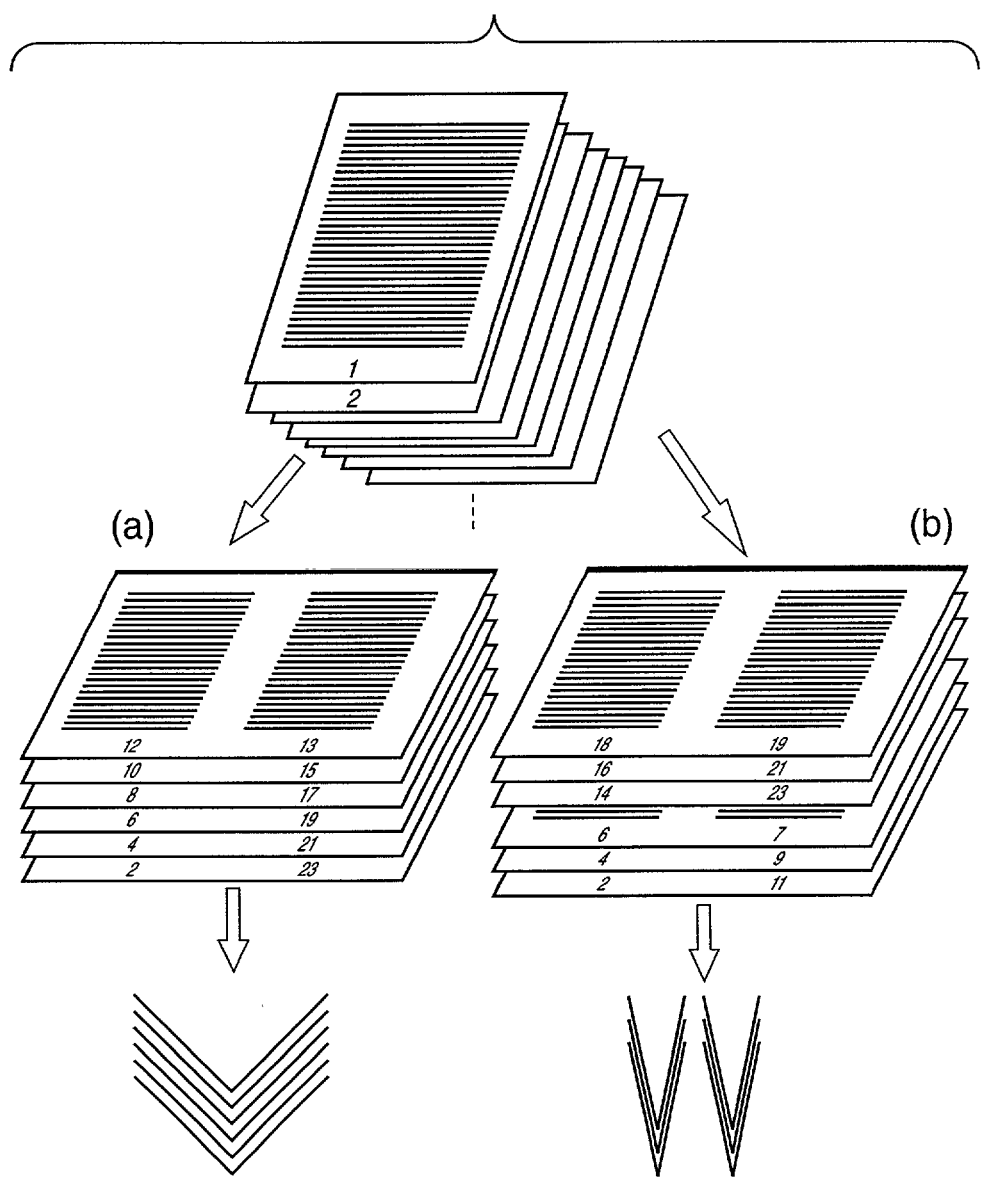
FIG. 19 is a view showing an outline of booklet print processing.

FIG. 19 is a view for explaining booklet printing according to the present invention and its implementation result. Booklet printing is a technique of printing pages such that when paper sheets each having print results on its upper and lower surfaces are folded once, the respective print results match the correct page order. This technique is used in the following cases:

1. All printed pages are set as a page count unit in bookbinding.

2. Arbitrary pages are set as a page count unit in bookbinding.

Figure 20:
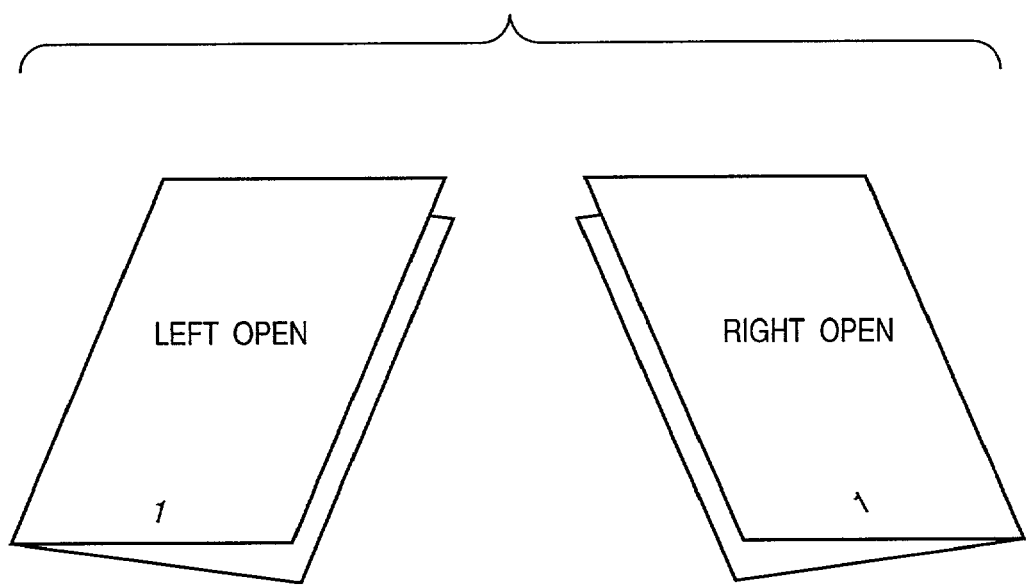
FIG. 20 is a view showing an outline of booklet print processing.

In this case, a page count unit in bookbinding indicates how many output paper sheets should be folded once at a time in booklet printing. As shown in FIG. 20, the appearances of books output upon booklet printing include the following:

1. page layout from left in ascending order (left open); and
2. page layout from right in ascending order (right open).

Even if pages are printed in landscape orientation, the pages are only rotated, but the page order does not change.

Figure 25:
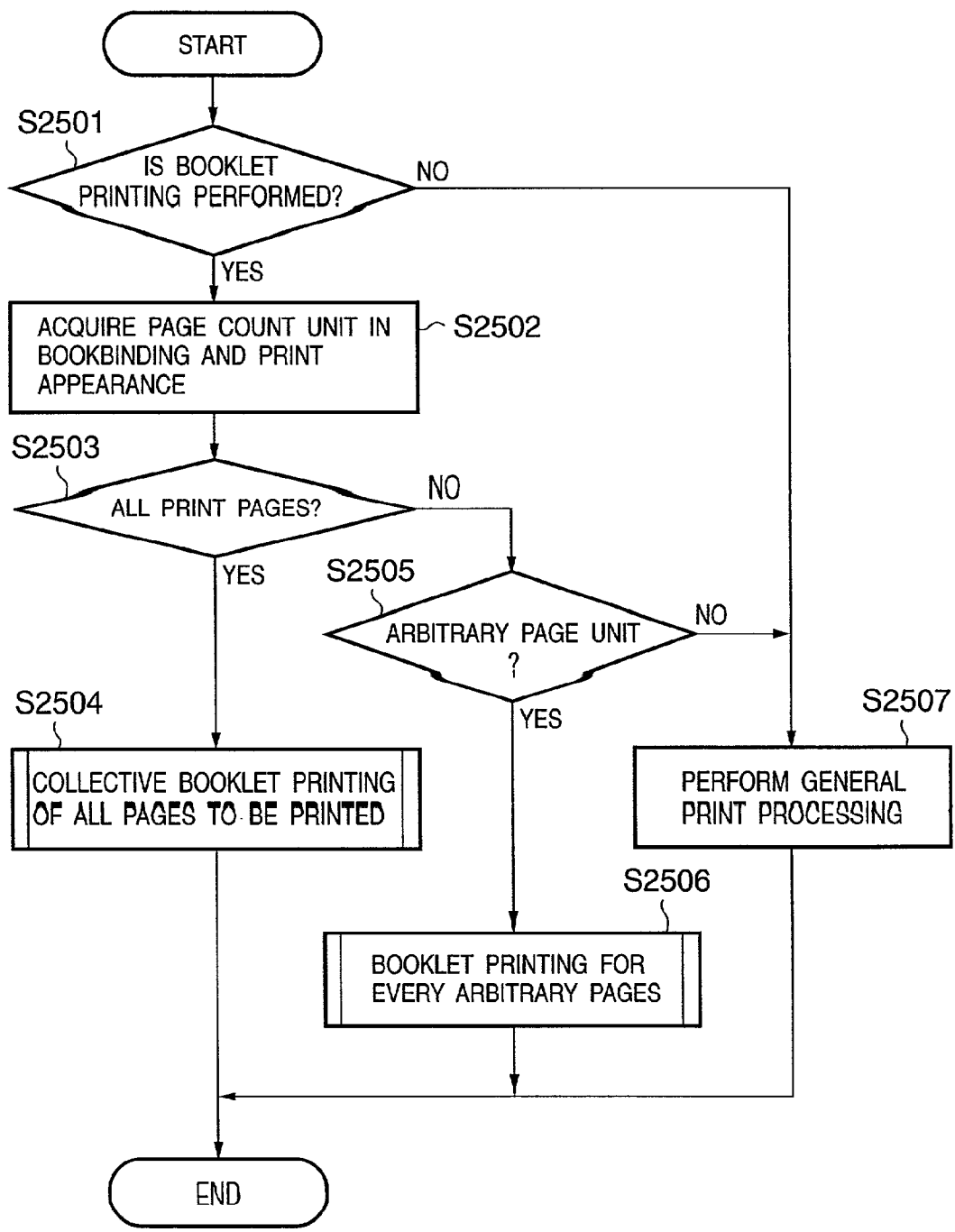
FIG. 25 is a flow chart showing how a plurality of booklet printing schemes are selectively executed.

Booklet print processing will be described in detail below. The flow chart of FIG. 25 will be described first. Referring to FIG. 25, if it is determined in step S2501 that the user has designated booklet printing, the flow advances to step S2502. If NO in step S2501, the flow advances to step S2507 to perform general printing. In step S2502, settings about a page count unit in booklet printing and a print appearance are acquired. The setting of a print page count unit includes the following choices:

1. booklet printing of all pages to be printed altogether; and
2. booklet printing for every designated arbitrary pages.

The setting of a print appearance includes the following choices:

1. left open; and
2. right open.

If it is determined in step S2503 that all pages are selected as a page count unit in booklet printing, the flow advances to step S2504. If NO in step S2503, the flow advance to step S2505. In step S2504, all the print pages are set as a page count unit in bookbinding, and booklet printing is performed. This processing will be described in detail later.

If it is determined in step S2505 that a specific number of pages is selected as a page count unit in booklet printing, the flow advances to step S2506. If NO in step S2505, the flow advances to step S2507. In step S2506, booklet printing is performed in the designated page count unit. This processing will be described in detail later. In step S2507, general print processing is performed.

Figure 23A:
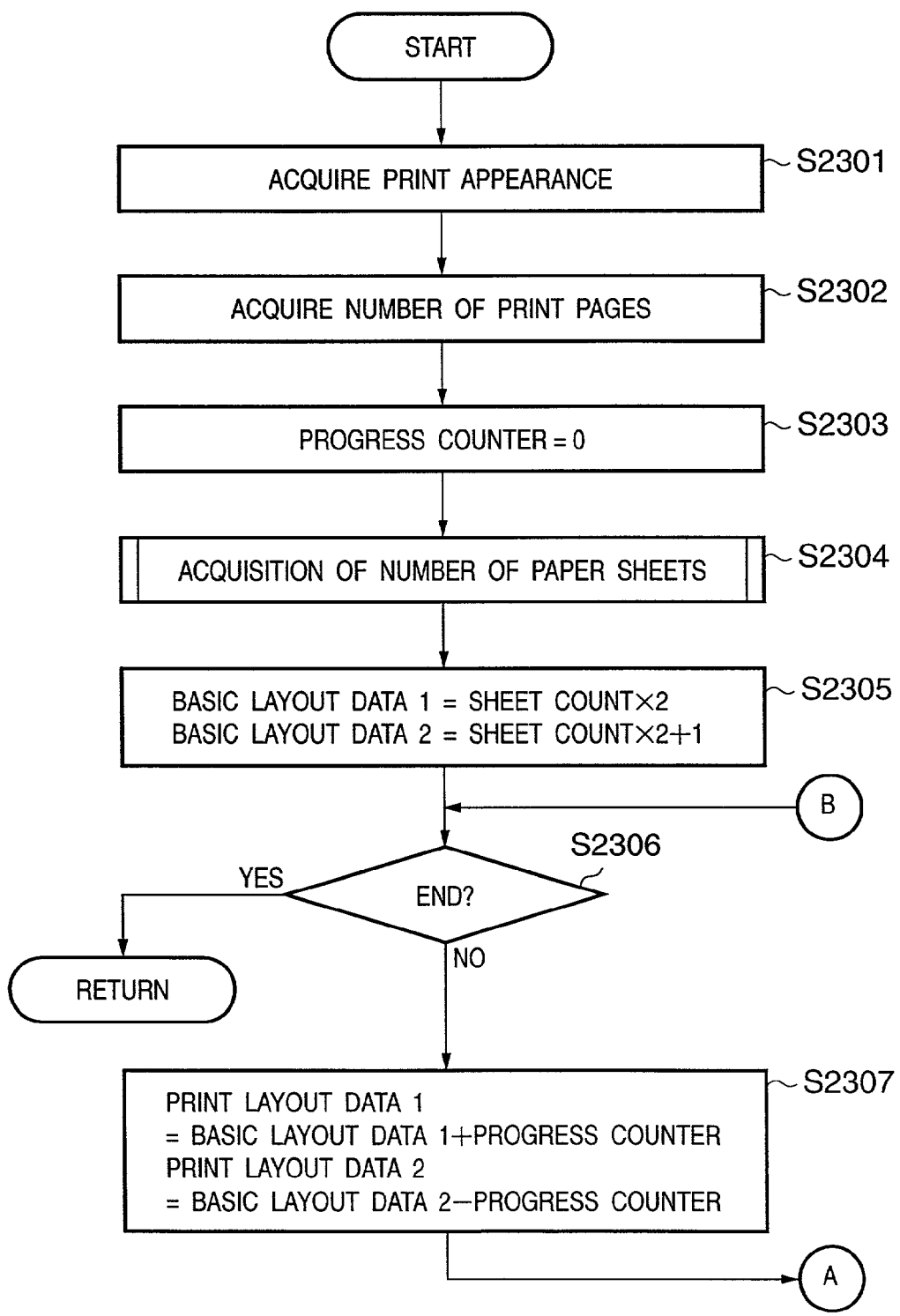
FIGS. 23A and 23B are flow charts for explaining a method of performing booklet printing for all pages collectively.
Figure 23B:
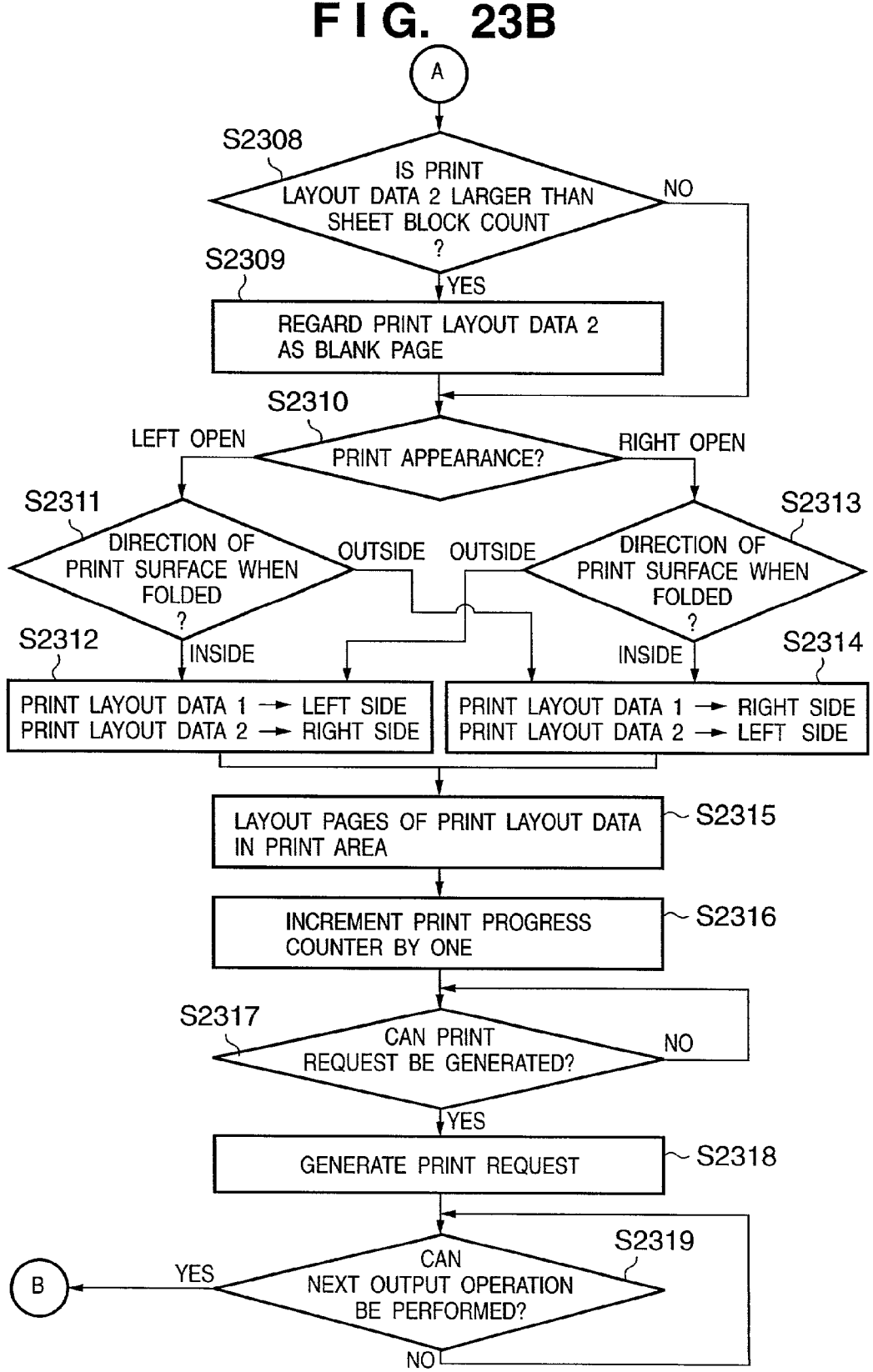

The processing associated with step S2504 in FIG. 25 will be described in detail below with reference to FIG. 23A and 23B. Before a detailed description of the processing, an outline of this processing will be described with reference to FIG. 21.

Original print data are arranged at the uppermost position. As shown in FIG. 21, these data are arranged in the form that allows two-folding bookbinding. FIG. 21 is a view for explaining a case wherein each page is folded once to have four printable surfaces on the upper and lower surfaces, and printing is performed with 2-page data being arranged on each surface. First of all, data of a 2D array (2×N) for a layout are prepared. "2×N" indicates that two page data are arranged on one surface. If, therefore, 4-page data are to be arranged on one surface, data of a 4×N array are prepared. Since the size N of an array changes in accordance with the number of pages of print data, an array having a sufficiently large size must be prepared or processing must be performed while the array size is changed as needed.

The original data arranged in the print order are rearranged into layout data. The lines drawn between the original data at the uppermost position and the layout data indicate how the data are rearranged. In actually printing the data, 2-page data are extracted from the layout data to be arranged and printed on a paper sheet. The arrows between the layout data at the middle position and the schematic spread views of the print results at the lowermost position indicate the relationship between the print results and the layout data. The relationship between the original print data and the positions at which the data are actually output on each paper sheet is set in this manner.

Figure 28:
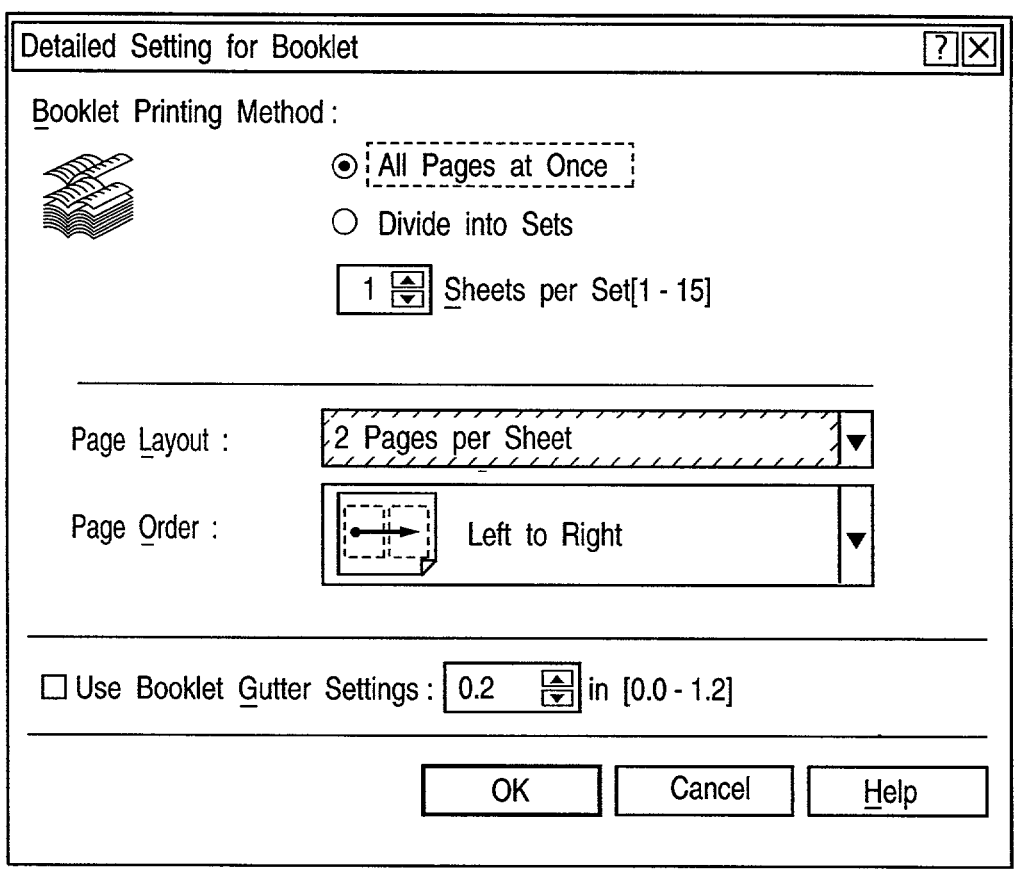
FIG. 28 is a view showing an example of a GUI for setting a layout scheme in the first embodiment.

FIG. 28 shows an example of the GUI for such settings. A control button for setting a layout such as "2 pages per sheet" and a control button for setting the order of pages constituting the layout are added to a dialog for setting details of booklet printing.

The processing in FIGS. 23A and 23B will be described next. Referring to FIG. 23A, in step S2301, the number of pages to be printed is acquired. This data can be acquired when all the print data from the application are spooled. In step S2302, a print appearance is acquired. In step S2303, a booklet printing progress counter is set to 0. A page that is printed when this counter exhibits an even number comes inside upon folding. A page that is printed when this counter exhibits an odd number comes outside upon folding.

In step S2304, page layout data are created, and the number of paper sheets to be used is obtained. This processing will be described in detail later. In step S2305, 2-surface data to be printed on the inside of a paper sheet located at the innermost position upon two-folding are calculated according to the following equations. The subsequent pages to be printed afterward are calculated on the basis of these two pages:

$$\text{basic layout data } 1 = \text{sheet count} \times 2$$

$$\text{basic layout data } 2 = \text{sheet count} \times 2 + 1$$

This layout data corresponds to the data layout used when the page layout shown at the middle position in FIG. 21 is determined. In the case shown in FIG. 21, if the basic layout data is obtained as 3, it indicates the third page in the layout data, i.e., the page on which the fifth and sixth pages of the original data are arranged.

Assume that 50-page print data are sent from the application. In this case, if booklet printing is performed such that two pages are printed on one surface as shown in FIG. 21, the number of paper sheets to be used for booklet printing becomes seven. In this case, the ordinal numbers of the basic layout data to be printed on a paper sheet folded inside upon two-folding are 7×2=14 and 7×2+1=15.

If it is determined in step S2306 that the booklet print processing is completed, the processing is terminated. If NO in step S2306, the flow advances to step S2307. In step S2307, two pages for which a print request is issued are calculated by $$\text{print layout data } 1 = \text{basic layout data } 1 - \text{progress counter}$$

$$\text{print layout data } 2 = \text{basic layout data } 2 + \text{progress counter}$$

In the above 50-page booklet printing, the next outputs are 14−1=13th data and 15+1=16th data in the layout data. As the progress counter increments, the 12th and 17th data, 11th and 18th data, . . . are obtained. At first, since the progress counter exhibits 0, the basic layout data is the first print data.

It is checked in step S2308 whether calculated print layout data 2 is larger than the number of layout data obtained in step S2304. If YES in step S2308, the corresponding page is regarded as a blank page, and the flow advances to step S2309. If NO in step S2308, the flow skips to step S2310. In step S2309, print layout data 2 is regarded as a blank page, and hence page number 0 representing a blank page is substituted.

In steps S2310, S2311, and 2313, a print appearance (left open or right open) and the positions of two pages calculated from the progress counter (whether they come inside or outside upon folding) are determined. More specifically, in determining "inside" or "outside", when the number of times a print request is generated is even, it indicates "inside", whereas when the number of times is odd, it indicates "outside".

In the case of a page located inside upon folding when left open is set, the flow advances to step S2312.

In the case of a page located outside upon folding when left open is set, the flow advances to step S2314.

In the case of a page located outside upon folding when right open is set, the flow advances to step S2312.

In the case of a page located inside upon folding when right open is set, the flow advances to step S2314.

In step S2312, print layout data 1 is placed on the left side, and print layout data 2 is placed on the right side. In step S2314, print layout data 1 is placed on the right side, and print layout data 2 is placed on the left side. In step S2315, the page of the original data indicated by the print layout data is placed on a print area. In step S2316, the print progress counter is incremented by one. In step S2317, it is checked whether the next print request can be generated. If YES in step S2317, the flow advances to step S2318. If NO in step S2317, the flow waits until the next print request can be generated. In step S2318, a print request for one surface of the sheet is generated with respect to the print page which has been laid out. In step S2319, it is checked whether an output request for the next page can be generated. If YES in step S2319, the flow advances to step S2306. If NO in step S2319, the flow waits until an output request can be generated.

Figure 24:
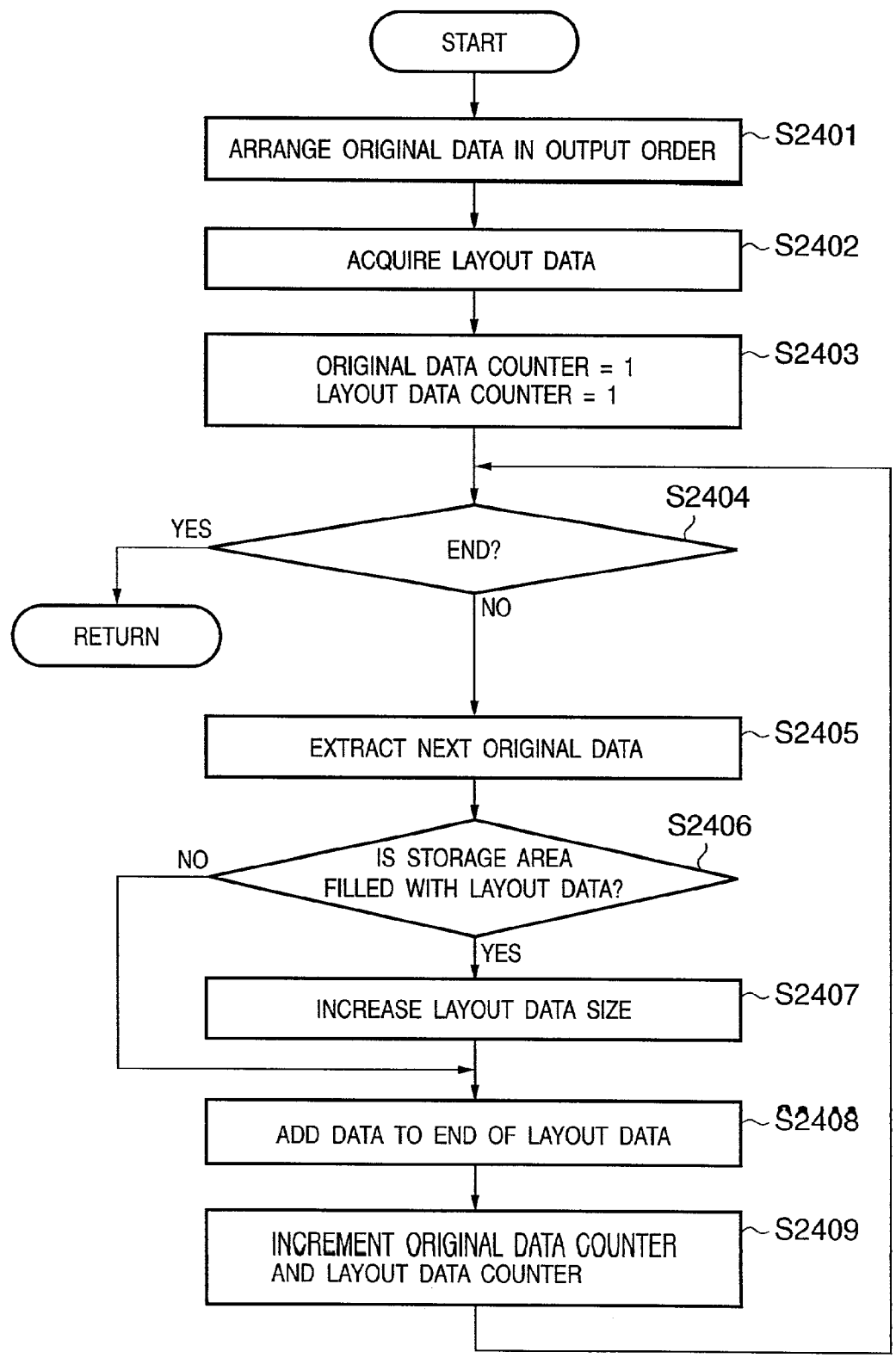
FIG. 24 is a flow chart for explaining a method of determining a page layout.

Processing associated with step S2304 in FIG. 23A will be described in detail below with reference to FIG. 24. Referring to FIG. 24, in step S2401, original data are arranged in an output order. In general, data are printed in the order in which they are output from an application. In a system designed to interchange pages, data must be arranged in this interchanging order. In step S2402, layout data are acquired. In the case shown in FIG. 21, data designated such that 2-page data are arranged in one printable area are acquired.

In step S2403, a counter indicating the original data arranged in step S2401 and a counter indicating layout data are initialized to indicate first data. In step S2404, it is checked whether the counter indicating original data exceeds the number of original data. If YES in step S2404, since all data are stored as layout data, the processing is terminated, and the flow returns to the main routine. If NO in step S2404, the flow advances to step S2405. In step S2405, the data indicated by the original data counter is extracted. Since the counter indicates the first data at first, the start page is extracted. In step S2406, it is checked whether the layout data storage area in which the extracted data is to be stored is full. If the ensured layout data fills the storage area, the flow advances to step S2407. If the layout data storage area is not full, the flow advances to step S2408.

In step S2407, the size of the layout data is increased as needed. Steps S2406 to S2407 can be omitted if layout data having a sufficiently large size is ensured first or it is known that the original data size is small. In step S2408, the original data extracted in step S2405 is stored in the area indicated by the layout data counter. In step S2409, the original data counter and layout data counter are incremented.

Figure 27A:
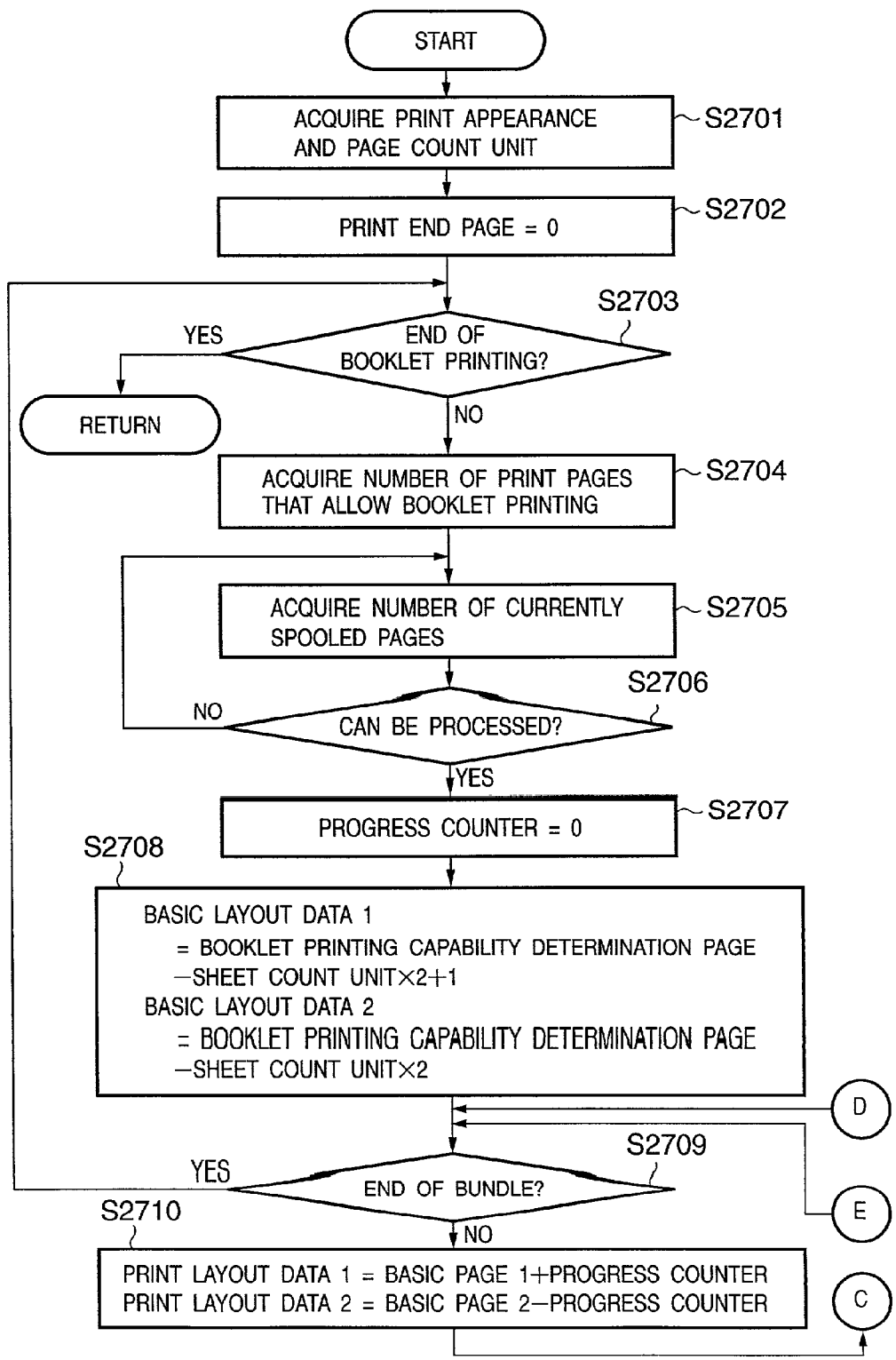
FIG. 27A and 27B are flow charts for explaining a method of performing booklet printing on a block basis, with each block consisting of an arbitrary number of paper sheets.
Figure 27B:
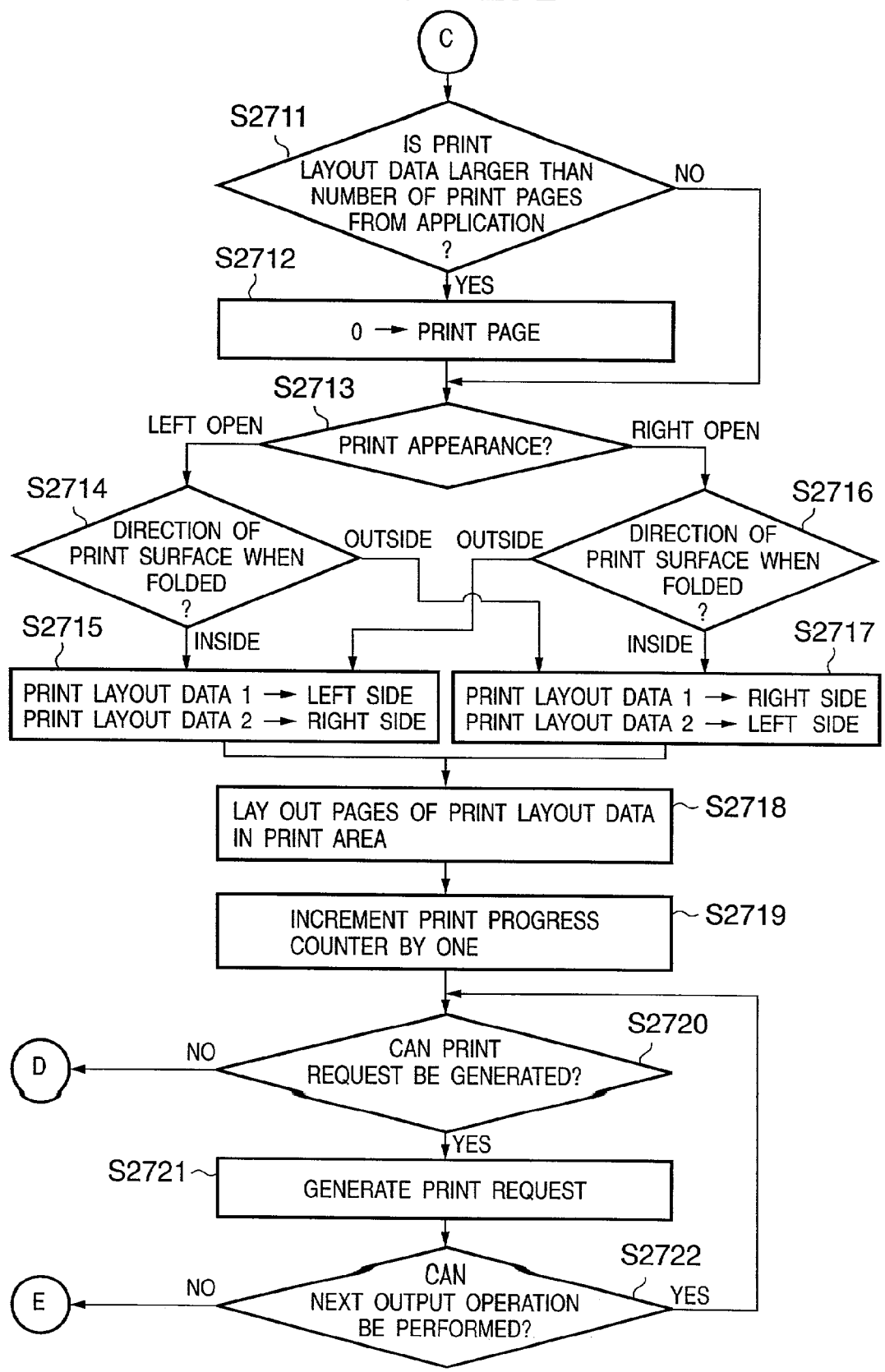

Processing associated with step S2506 in FIG. 25 will be described in detail below with reference to FIGS. 27A and 27B. In this case, a sheet count unit indicates how many paper sheets are folded at a time in booklet printing. Assume that 40-page print data are received from the application, and booklet printing is performed two sheets at a time such that one page is printed in one print area. In this case, 8-page data are laid out on one block that is folded once. That is, booklet printing is performed with the entire print data being divided into five blocks.

In step S2701, a print appearance and sheet count unit are acquired. In step S2702, the print end page is set to 0. In step S2703, it is checked whether the booklet print processing is completed. If YES in step S2703, the processing is terminated. If NO in step S2703, the flow advances to step S2704. In step S2704, print layout data (booklet printing capability determination layout data) allowing booklet printing is acquired. The number of booklet printing capability determination layout data obtained in step S2704 becomes the maximum number of layout data in the block. The number of booklet printing capability determination layout data in the first block is obtained by booklet printing capability determination layout data=sheet count unit×4

For the second and subsequent blocks, the numbers of booklet printing capability determination layout data are obtained by booklet printing capability determination page count=booklet printing capability determination page count of preceding block+sheet count unit×4

In the above case of booklet printing of 40 pages for two sheets at a time, the number of booklet printing capability determination pages in the first block is 2×4=8, and the number of pages in the next block is 8+2×4=16. Subsequently, the numbers of pages are 24, 32, and 40.

In step S2705, the number of pages that have been spooled is acquired. In step S2706, it is checked whether spooling is completed up to print layout data (booklet printing capability determination layout data) that allows booklet print processing or all pages have been spooled. If YES in step S2706, the flow advances to step S2707. If NO in step S2706, the flow returns to step S2705.

In step S2707, the progress counter is set to 0. In step S2708, two layout data to be printed on the inside of a paper sheet located at the innermost position upon two-folding are calculated according to the following equations. The subsequent layout data to be printed afterward are calculated on the basis of these two layout data:

basic layout data 1=booklet printing capability determination layout data−sheet count unit×2+1 basic layout data 2=booklet printing capability determination layout data−sheet count unit×2

It is checked in step S2709 whether a print request for the current block is completed. If YES in step S2709, the flow advances to step S2703. If NO in step S2709, the flow advances to step S2710. More specifically, when the value of the progress counter becomes equal to a sheet count unit, it is determined that the print request is completed. In step S2710, two layout data for which a print request is generated are calculated by print layout data 1=basic layout data 1+progress counter print layout data 2=basic layout data 2−progress counter Since the progress count is 0 at first, the basic layout data becomes the first print page. It is checked in step S2711 whether the calculated print layout data is larger in size than the layout data. If YES in step S2711, the corresponding data is handed as a blank page, and the flow advances to step S2712. If NO in step S2711, the flow skips to step S2713. In step S2712, since a blank print page is laid out, for example, page number 0 representing a blank page is substituted. In steps S2713, S2714, and S2716, a print appearance (left open or right open) and the positions of two layout data calculated from the progress counter (whether they come inside or outside upon folding) are determined. More specifically, in determining "inside" or "outside", when the number of times a print request is generated is even, it indicates "inside", whereas when the number of times is odd, it indicates "outside".

In the case of a page located inside upon folding when left open is set, the flow advances to step S2715.

In the case of a page located outside upon folding when left open is set, the flow advances to step S2717.

In the case of a page located outside upon folding when right open is set, the flow advances to step S2715.

In the case of a page located inside upon folding when right open is set, the flow advances to step S2717.

In step S2715, print layout data 1 is placed on the left side, and print layout data 2 is placed on the right side. In step S2717, print layout data 1 is placed on the right side, and print layout data 2 is placed on the left side. In step S2718, the original data of the print layout data is placed on a printable area on a predetermined one of the two folded sides. In step S2719, the print progress counter is incremented by one. In step S2720, it is checked whether the next print request can be generated. If YES in step S2720, the flow advances to step S2721. If NO in step S2720, the flow waits until the next print request can be generated. In step S2721, a print request for one surface of the sheet is generated with respect to the print page which have been laid out. More specifically, the generation of this print request corresponds to the processing in which the de-spooler 305 reads page data which has been laid out from the spool file 303, re-creates rendering data as a GDI function, and outputs it to the graphic engine 202.

As described above, print data in which arbitrarily designated logic pages are laid out can be created with respect to one print area corresponding to one page in terms of the appearance of bookbinding. As a consequence, in booklet printing using the printing apparatus, printed matter having a plurality of pages laid out on one page can be obtained.

<Second Embodiment>

Assume that booklet printing is to be performed an arbitrary number of sheets at a time after all pages are spooled. In this case, if the number of pages printed in the final block is small, the number of paper sheets used can be decreased by performing booklet printing in a sheet count unit smaller than the designated sheet count unit in only the final block. If, for example, a sheet count unit is two when the number of layout data is three, five layout areas become blank. If this unit is changed to one, only one layout area becomes blank, thus reducing paper sheets by one.

Adjustment of the number of sheets in a final block will be described in detail below with reference to FIG. 26. This operation applies to a case wherein a sheet count unit larger than necessary is designated with respect to print pages. Assume that divisional booklet printing on a 10-sheet basis is designated with respect to 60-page print data from an application with two pages being laid out in one layout area (printable area). In this case, since 30 layout data are arranged on two pages, and four layout data are laid out per sheet, 30 layout data are divided by four, and eight paper sheets are actually required. According to the second embodiment, the sheet count unit is adjusted from 10 to 8 to save paper sheets. Note that this processing is not limited to divisional booklet printing or a plural page layout. When the processing is applied to a case wherein group booklet printing is performed or booklet printing of logic pages is performed in an entire printable area, the same output result can be obtained.

Figure 26:
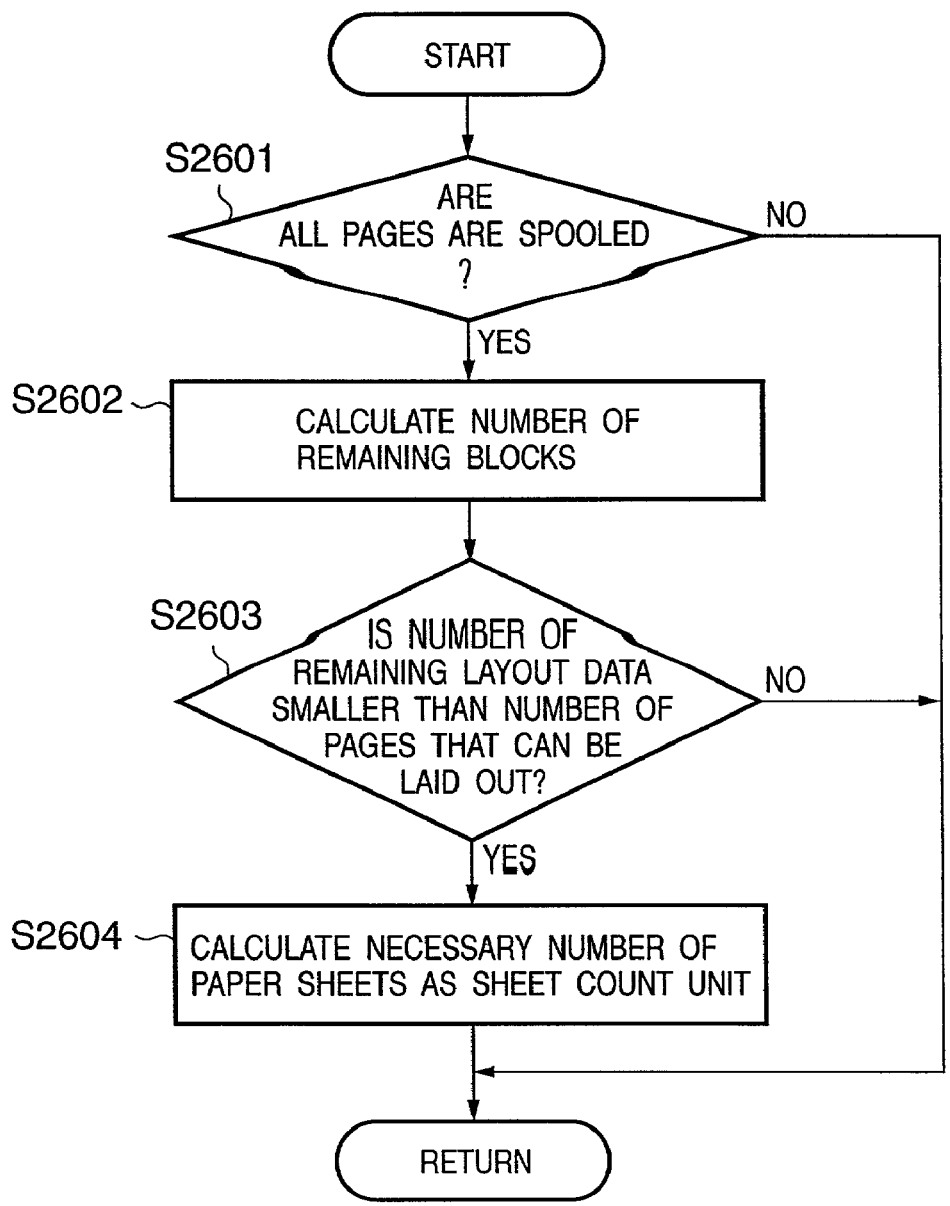
FIG. 26 is a flow chart for explaining a method of saving paper sheets.

The purpose of the processing in FIG. 26 is automatically achieved by performing the processing in steps S2706 and S2707 in FIG. 27. Referring to FIG. 26, it is checked in step S2601 whether all pages are completely spooled. If YES in step S2601, the flow advances to step S2602. If NO in step S2601, the flow leaves the processing. In step S2602, a remaining layout data count is calculated by remaining layout data count=layout data count−current booklet printing capability determination layout data count In step S2603, the number of layout data that can be laid out within a block in the currently set sheet count unit is compared with the remaining number of layout data. If the remaining number of layout data is smaller, the flow advances to step S2604. Otherwise, it is determined that no adjustment processing is required, and the flow leaves the routine. In step S2604, a smaller sheet count unit in bookbinding with which the remaining pages can be properly processed is obtained by new sheet count unit in bookbinding=remaining layout data count÷4 (the fractional portion of the quotient is rounded up)

In this case, a spool file manager 304 sets an appropriate sheet count as a sheet count in booklet printing, and hence print data arranged on paper sheets smaller than the sheet count designated first by the user using the UI of the printer driver are created.

In the second embodiment, the number of paper sheets used can be decreased.

<Third Embodiment>

Figure 29:
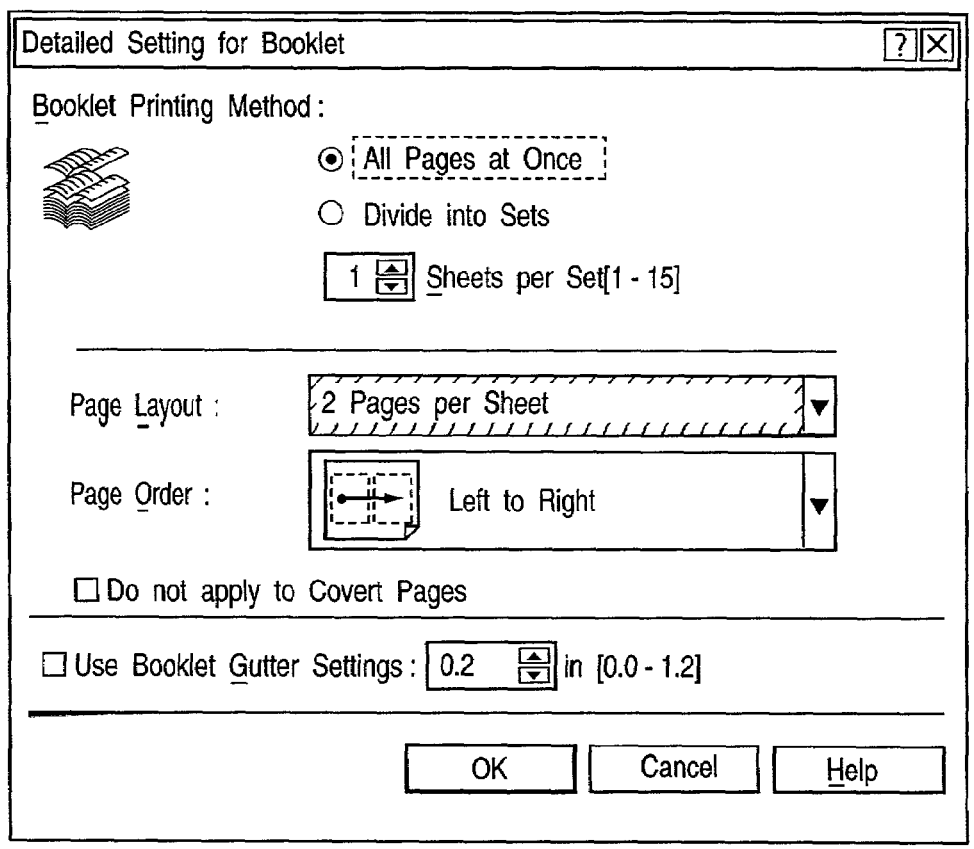
FIG. 29 is a view showing an example of a GUI for setting a layout scheme in the third embodiment.

In designating a layout method, the user may designate different schemes for different layout areas (four areas if one paper sheet is folded once) instead of designating a single scheme for all the areas. Determination of a layout in this case can be realized by changing the processing in step S2304 in FIG. 23A. For example, start page may be handled as a cover with one page being output per area, while the remaining pages may be output such that two pages are laid out in each layout area. FIG. 29 shows an example of a GUI capable of making settings to handle the first page as a special page with one page being always laid out in one area.

In addition to the arrangement of the GUI in FIG. 28, the example of the GUI in FIG. 29 has a check box control allowing the user to choose to handle cover pages differently. When this check box is checked, a first page is handled differently, with one page being printed in one area, and a plurality of pages can be laid out in one area on other pages. FIG. 22 shows how layout data are generated in this case. First of all, original data are arranged in the output order. Since layout data are basically handled two pages at a time, the data are ensured as 2×N layout data. One page as the first page of the original data is laid out in the first area of the first layout data. The flow of processing skips the next portion and shifts to the second layout data. The second page of the original data is laid out in the first area of the layout data, and the third page of the original data is laid out in the second area of the second layout data. The flow of processing then shifts to the next layout data to lay out the fourth page of the original data in the first area of the third layout data. In this manner, processing is continued. The relationship between the layout data generated in this manner and the actual output is indicated by the arrows between the layout data at the middle position in FIG. 22 and the output schematic view at the lowermost position.

According to the third embodiment, in designating a layout method, different layout schemes can be designed for printable areas instead of a uniform layout scheme for all the areas.

<Fourth Embodiment>

Figure 30:
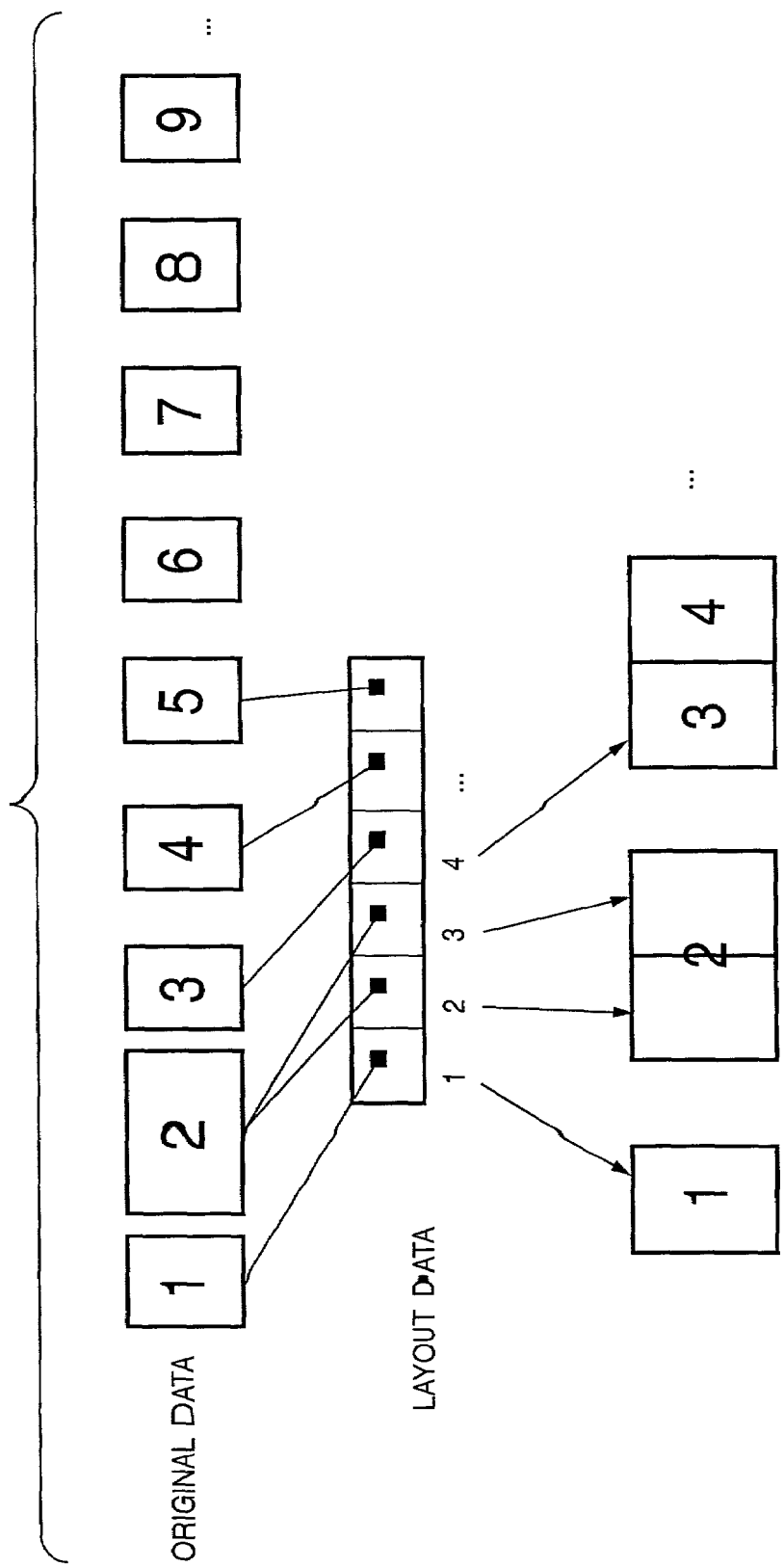
FIG. 30 is a view for explaining a scheme of obtaining a page layout according to the third embodiment.

A layout method may be employed, in which a plurality of print areas constituting a spread are merged into one large print area, which is contrary to the method of laying out a plurality of pages in one print area. FIG. 30 shows a method of determining a page layout in this case. Referring to FIG. 30, designation is made to set the second page of original data in the second and third areas of layout data to form a large spread and output the data of the same page. The lowermost portion of FIG. 30 indicates how pages are printed by using this layout data. Referring to FIG. 30, the solid lines indicate the relationship between the original data and the layout data, and the arrows indicate the relationship between the layout data and the output result.

According to the fourth embodiment, the layout method of merging a plurality of print areas constituting a spread into one large print area can be used, which is contrary to the method of laying out a plurality of pages in one print area.

<Fifth Embodiment>

The fifth embodiment is intended to form spread pages in booklet printing. In this embodiment described below, even if the left and right pages of the spread are different media (paper), predetermined information can be laid out (pasted) on the respective pages while the continuity of a series of print information and image information is maintained. Alternatively, bookbinding can be performed such that a continuous image is printed over a cover and a back cover.

Note that the fifth embodiment will be described below with reference to the accompanying drawings including the same drawings as those common to the first to fourth embodiments.

In addition to the arrangement of the print system comprised of the printer and host computer and shown in FIG. 2, a print system according to this embodiment has an arrangement for temporarily spooling print data from an application 201 in the form of intermediate code data.

Figure 31:
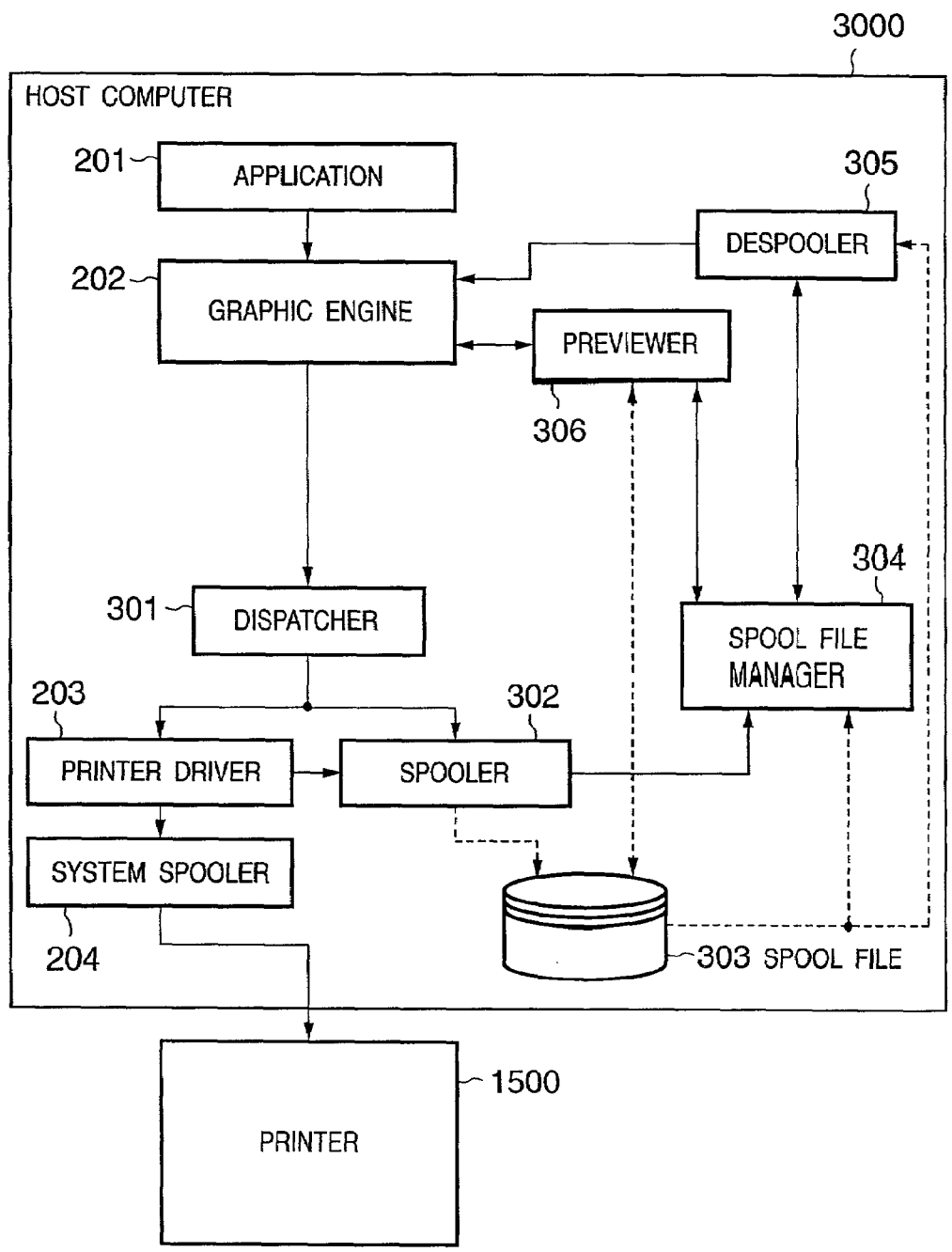
FIG. 31 is a block diagram showing the arrangement of a print system designed to temporarily spool an intermediate code before converting a print instruction from an application into a printer control command.

FIG. 31 shows a system obtained by extending the system in FIG. 2. As shown in FIG. 31, according to this extended processing scheme, a dispatcher 301 receives a DDI function which is a print instruction from a graphic engine 202. If the print instruction (DDI function) which the dispatcher 301 has received from the graphic engine 202 is based on a print instruction (GDI function) issued from the application 201 to the graphic engine 202, the dispatcher 301 loads a spooler 302 stored in an external memory 111 into a RAM 102 and sends the print instruction (DDI function) to the spooler 302 instead of a printer driver 203.

The spooler 302 analyzes the received print instruction, converts it into an intermediate code on a page basis, and outputs it to a spool file 303.

The spooler 302 acquires process settings (spread booklet printing and the like) associated with the print data set in the printer driver 203 from the printer driver 203, and stores them in the spool file 303.

Although the spool file 303 is created as a file in the external memory 111, it may be created in the RAM 102. The spooler 302 also loads a spool file manager 304 stored in the external memory 111 into the RAM 102, and notifies the spool file manager 304 of the created state of the spool file 303. Thereafter, the spool file manager 304 checks whether printing can be done in accordance with the contents of the process settings associated with print data and stored in the spool file 303.

If the spool file manager 304 determines that printing can be done by using the graphic engine 202, the spool file manager 304 loads a de-spooler 305 stored in the external memory 111 into the RAM 102 and instructs the de-spooler 305 to perform print processing of a page description file of an intermediate code described in the spool file 303. The de-spooler 305 processes the page description file of the intermediate code contained in the spool file 303 in accordance with a job setting file including process setting information contained in the spool file 303, re-creates a GDI function, and outputs the GDI function through the graphic engine 202.

If the print instruction (DDI function) which the dispatcher 301 has received from the graphic engine 202 is based on the print instruction (GDI function) issued from the de-spooler 305 to the graphic engine 202, the dispatcher 301 sends the print instruction to the printer driver 203 instead of the spooler 302. The printer driver 203 generates a printer control command constituted by a page description language or the like on the basis of the DDI function acquired from the graphic engine 202, and outputs it to a printer 1500 through a system spooler 204.

Since the system to which this embodiment is applied is based on the premise that it reads an intermediate file in the application 201, the system may be simplified by sending data to the spooler 302 directly without setting the dispatcher 301, and creating an intermediate file. In this system, the amount of processing becomes smaller, and hence the resource consumption also becomes smaller. This system has many other merits. These schemes can be selectively used in accordance with the purpose of the system.

Figure 32:
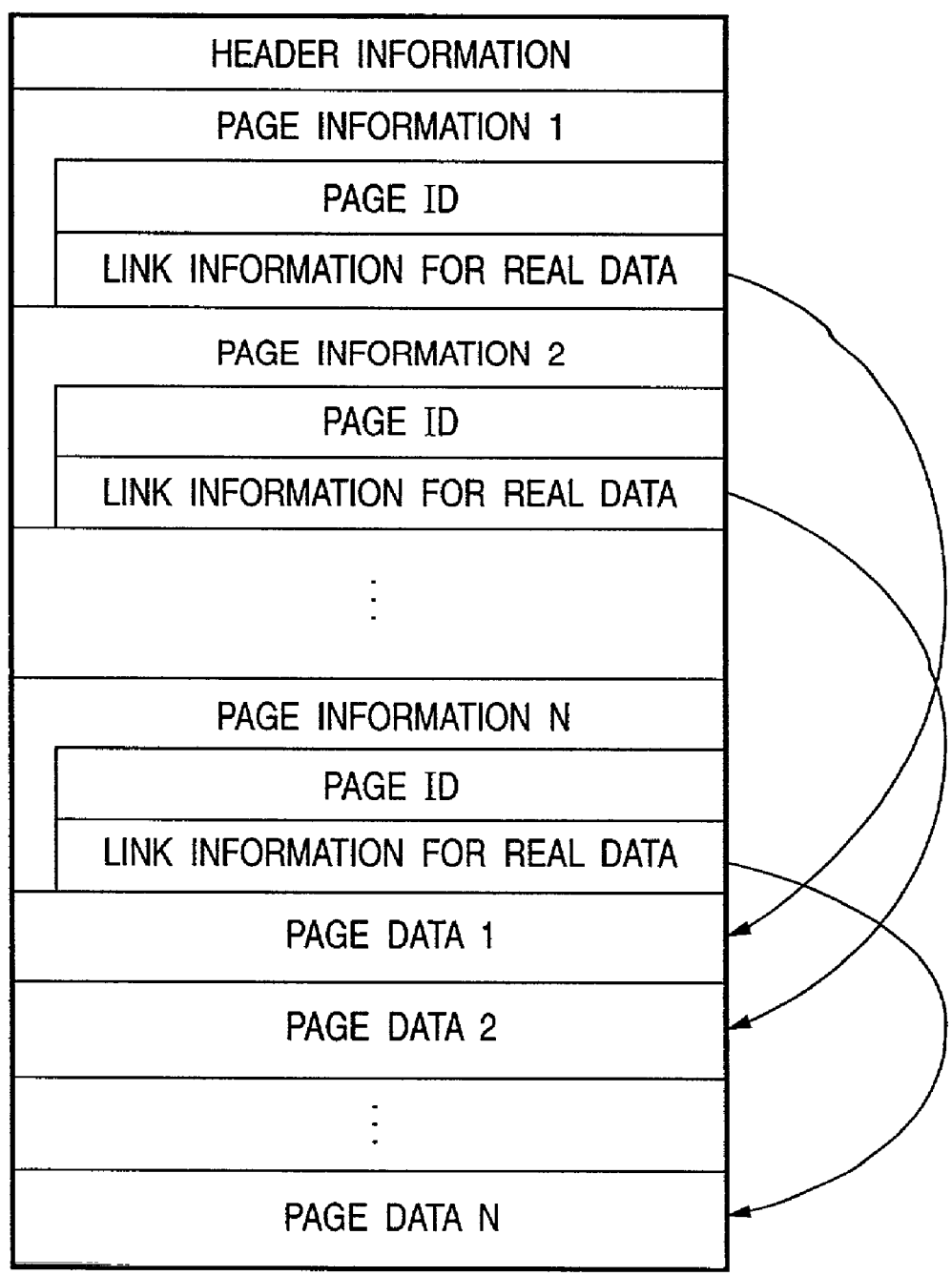
FIG. 32 is a view for briefly explaining the data format of an intermediate code data file.

FIG. 32 is a view for explaining an outline of the data format of an intermediate code data file (intermediate file). To facilitate layout processing, the format data are grouped on a page basis.

As the header information of an intermediate file, information required for the overall document, such as the number of pages and user information, is held. Page information follows the page information. As the page information, a page ID and link information are held. The link information links the file to actual data to increase the degree of freedom in implementing the file access method and file format. The page information is not limited to these contents. Other initial position necessary for booklet printing can be held as page information.

After each page information is separately stored, actual page data (1 to N) are stored. As this page data, data for each page, e.g., data of each graphic pattern or character string, is held.

In addition, intermediate files are not limited to print information created from various applications. For example, image files received from external devices such as a scanner can be used. In this case, received image data can be directly loaded after header information is added to the data to conform to an intermediate file form. Alternatively, the image data may be printed, and the data may be converted into the intermediate file form through the spooler 302 to be loaded.

The concept of a page division technique of dividing one original page on a spread into spread pages will be described with reference to FIGS. 33A and 33B. Consider a case wherein one large page is displayed by using the two surfaces of a spread like a catalogue. The page shown in FIG. 33A on which the letters "LR" are written is an original page. FIG. 33B shows a case wherein the original page is equally divided into left and right parts to lay out these letters on spread pages. If, for example, the original page has an A3 Landscape size and is divided, two original pages each having an A4 portrait size are obtained.

FIG. 34 shows an example of page information (data to which a page division attribute is added) that expresses divided page for the processing of an original page upon division. A page ID for specifying the original page is common to these data. Since this embodiment is based on the premise that a page is divided into two parts, data indicating the right or left page of the divided pages is added to page information. Since the actual page data is common, redundancy of data can be prevented by using link information indicating the same page data.

Data stored as an intermediate file can be identified as general data or divided data in accordance with the commonality of a page ID and the presence/absence of division information.

This page division is executed when a print form is designated as booklet printing. In intermediate file data, division information (indicating right-side data or left-side data) associated with division, the designation of real data, the designation of common data, and the like are managed for each divided page.

If a host computer 3000 identifies data as divided data in processing print data, real data is specified on the basis of link information for the real data, and layout processing is executed according to a predetermined form.

Figure 35:
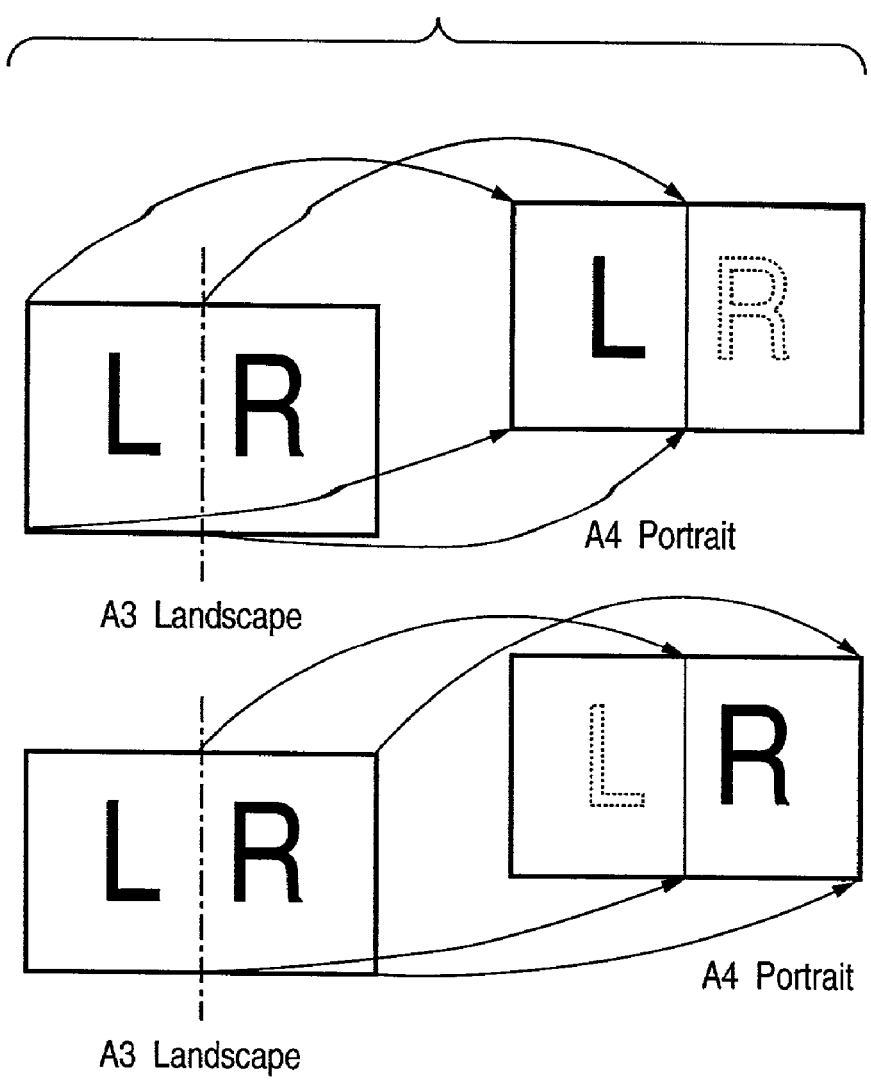
FIG. 35 is a view showing the concept of the layout of page data to which attributes for page division are attached.

Position coordinate matching to lay out (paste) page-divided data in a predetermined storage medium will be described with reference to FIG. 35. FIG. 35 shows the concept of laying out of page data to which attributes for page division are attached. FIG. 35 shows a method of laying out an A3 landscape original page on an A4 portrait paper sheet. When the left half of the original page is expressed, the coordinates of the original page are matched with the sheet coordinates as follows.

Coordinate matching and laying out are performed such that the upper left corner of the original page is set on the upper left corner of the paper sheet, the lower left corner of the original page is set on the lower left corner of the paper sheet, the midpoint of the upper side of the original page is set on the upper right corner of the paper sheet, and the midpoint of the lower side of the original page is set on the lower right corner of the paper sheet.

In the case of the right half of the original page, the coordinates of the original page are matched with the coordinates of a paper sheet such that the midpoint of the upper side of the original page is set on the upper left corner of the paper sheet, the midpoint of the lower side of the original page is set on the lower left corner of the paper sheet, the upper right corner of the original page is set on the upper right corner of the paper sheet, and the lower right corner of the original page is set on the lower right corner of the paper sheet.

In practice, since the aspect ratio of an original differs from the aspect ratio of a paper sheet, fine adjustment may be performed. Most of the currently available printers have an unprintable area on a paper sheet. In consideration of this, the above processing is further complicated.

Figure 36A:
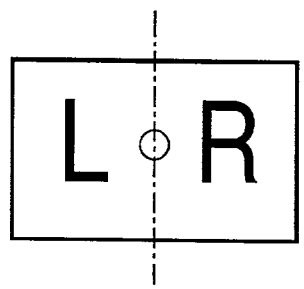
FIG. 36A is a view for explaining a data omission that occurs when data after page division are laid out, showing an A3 landscape original page.
Figure 36B:
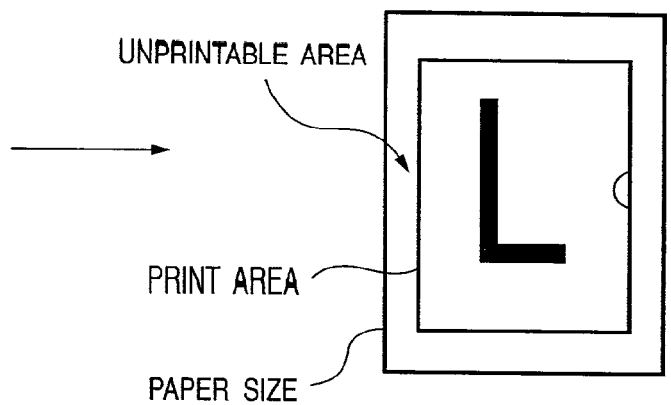
FIG. 36B is a view showing an example of how the data obtained by dividing the original page in FIG. 36A into two equal parts are laid out in consideration of the print area on an A4 portrait sheet in the printer.

FIG. 36A shows an example of how the left half of a divided A3 landscape original page is laid out as shown in FIG. 36B in consideration of the print area of the printer on an A4 portrait paper sheet. Referring to FIG. 36B, the outer solid line indicates the outer paper sheet size, and the inner solid line indicates a printable area. The omission of the right half of the graphic pattern "○ (circle)" printed in a central portion of the original page in FIG. 36A is large due to the printable area in FIG. 36B. As described above, a graphic pattern drawn near the cut line for division (the chain line in the middle of FIG. 36A), i.e., the data drawn as original data, cannot be perfectly printed in a divided area by simply dividing the page and pasting the data on the page because of the print area. As a result, a data omission occurs. In this embodiment, in order to prevent such an omission, layout control is performed by the following adjustment.

FIG. 37 shows three types of adjustments to be made to prevent an omission of data laid out near an unprintable area due to the relationship between the paper sheet size and the print area in dividing a page for layout control.

Adjustment (1) is a scheme of making an adjustment by translating a print position. "Translation" is a layout technique of preventing a data omission by shifting the layout position of page data to a position free from the influence of a print form such as a binding margin so as to ensure a binding margin portion in booklet printing. In movement adjustment, a solid rectangle 37a represents a paper sheet size, and an inner rectangle 37b indicates the print area of the paper sheet. A dotted rectangle 37c indicates the print position of the original after adjustment. The print position is translated by a width corresponding to a width size 37e (corresponding to a binding margin in booklet printing) within which printing cannot be performed due to the relationship between the paper sheet size and the print area, thereby ensuring a portion serving as a print range of the original page before division. Since the print data is simply shifted, the display position of the data is shifted to the left as a whole when it is printed.

Adjustment (2) is a scheme of containing data to be laid out within a print area by reducing it. By reducing the data to contain it within the print area, the portion indicating the print area overlaps the print position of the original after adjustment (37d). In the case of this adjustment, although the paper sheet does not shift laterally, the size (dimensions) of data printed changes upon reduction.

Adjustment (3) is a hybrid adjustment scheme as a combination of translation (1) and reduction (2).

In any case, whether to perfectly prevent an omission or retain an original image as much as possible with a sight omission being permitted or which method is used depends on the application and purpose of the system. The system can be designed to allow the user to select a method instead automating all functions.

Figure 38:
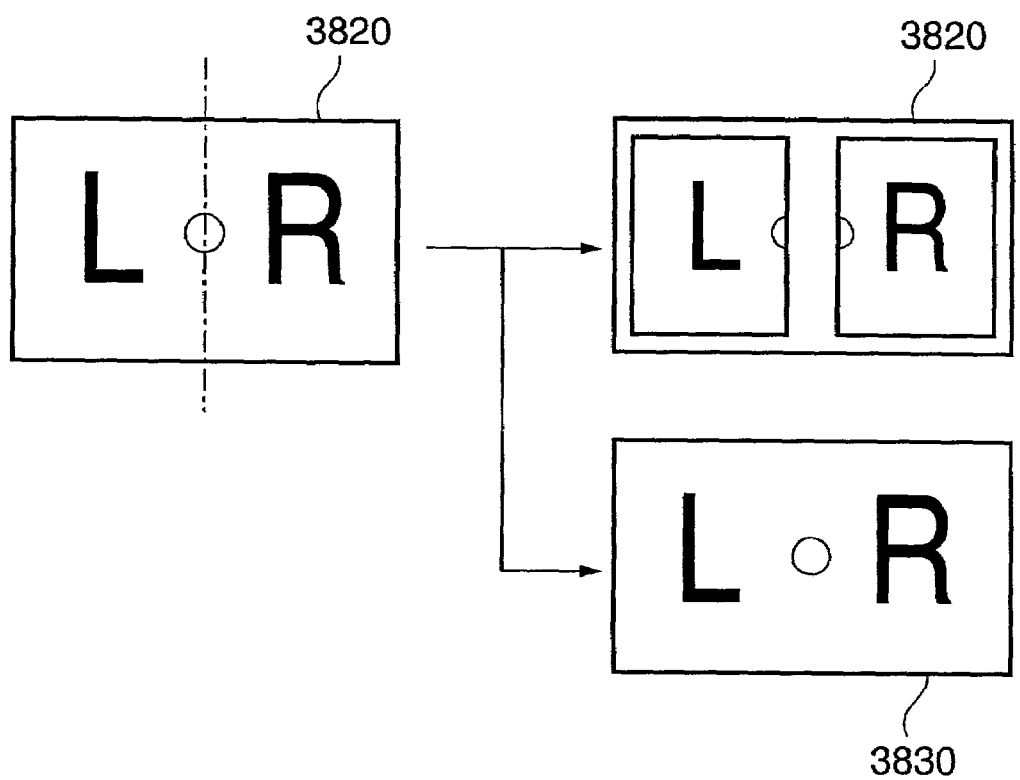
FIG. 38 is a view showing an example of how data obtained by page division are laid out by a conventional layout method and an example of an application of a layout scheme according to the present invention.

FIG. 38 is a view showing splitting of an original page 3820 (undesirable page splitting). In this case, split pages are laid out on a continuous area. In printing called 2-up printing or the like, a plurality of original pages can be laid out on one surface of a page. If, however, split original pages are laid out side by side in a continuous form, the two split page data are separately laid out as unrelated data as indicated by a layout 3820 in the prior art. In this case, when the left-side data is to be printed, clipping must be performed within a range corresponding to the page size of the left half to prevent any print data located on the right page from being printed.

According to layout control in this embodiment, when created data or data created by reading is to be divided on a page basis, division information for managing each data as divided page is attached to intermediate data, and data pasting control is performed on the basis of this information. In laying out information of a plurality of pages in one page, each data is identified as divided data on the basis of division information. If divided data are laid out within one page, data are linked to each other on the basis of the division information. This makes it possible to display the respective data as indicated by a layout 3830 owing to the links of the real data. That is, the original 3820 can be restored (restoration processing for undesirable page splitting).

Figure 39A:
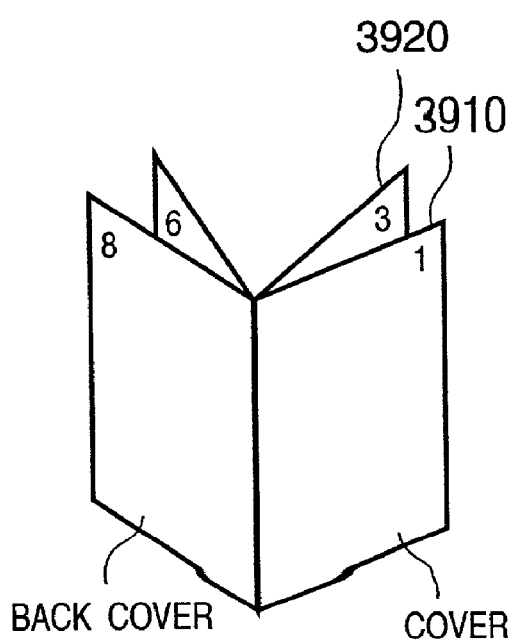
FIG. 39A is a view showing a layout in the booklet print processing of forming a book by folding paper sheets when viewed from the backbone side of bound paper sheets.
Figure 39B:
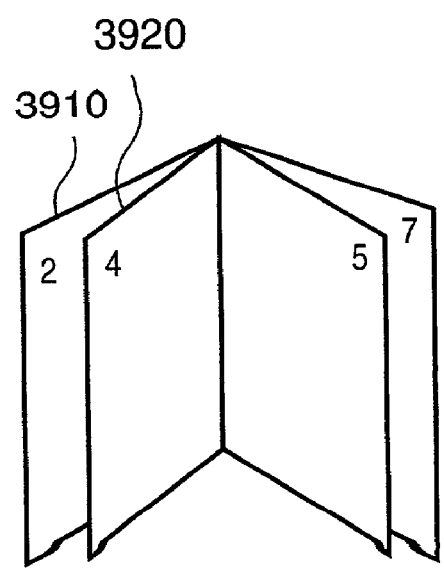
FIG. 39B is a view showing the layout in the booklet print processing of forming a book by folding paper sheets when viewed from the inside of the book formed by bookbinding in FIG. 39A.

FIGS. 39A and 39B show a case wherein this embodiment is applied to booklet printing. Booklet printing is a printing form of folding a paper sheet in half to form four upper and lower surfaces and printing data on the four surfaces, thereby forming printed matter that can be handled like a book. If paper sheets are folded once two at a time, originals corresponding to 4 (surfaces)×2 (sheets)=8 (pages) are printed on each booklet.

FIGS. 39A and 39B show a case wherein two paper sheets are folded in the middle to perform bookbinding. FIG. 39A is a view showing the bounded paper sheets from the backbone side. FIG. 39B is a view showing the bound paper sheets from the inside. On the print surfaces of a first paper sheet 3910, pieces of information (corresponding to the eighth and first pages) are printed on the backbone side, and pieces of information (corresponding to the second and seventh pages) are printed on the reverse side. Likewise, on the print surfaces of a second paper sheet 3920, pieces of information (corresponding to the sixth and third pages) are printed on the backbone side, and pieces of information (corresponding to the fourth and fifth pages) are printed on the reverse side.

Assume that the second and third pages of the originals are split pages. If the present invention is applied to this case, these pages can be laid out to look similar to the original image before division when they are displayed in the form of a spread upon detecting that the pages constitute a spread as a result of bookbinding, i.e., they are laid out in continuous areas.

As described above, the layout method according to this embodiment can be applied to a case wherein divided pages are laid out on the upper and lower surfaces of a paper sheet or on difference paper sheets as well as a case wherein the pages are laid out on the same surface of a single paper sheet as in N-up printing.

Figure 41:
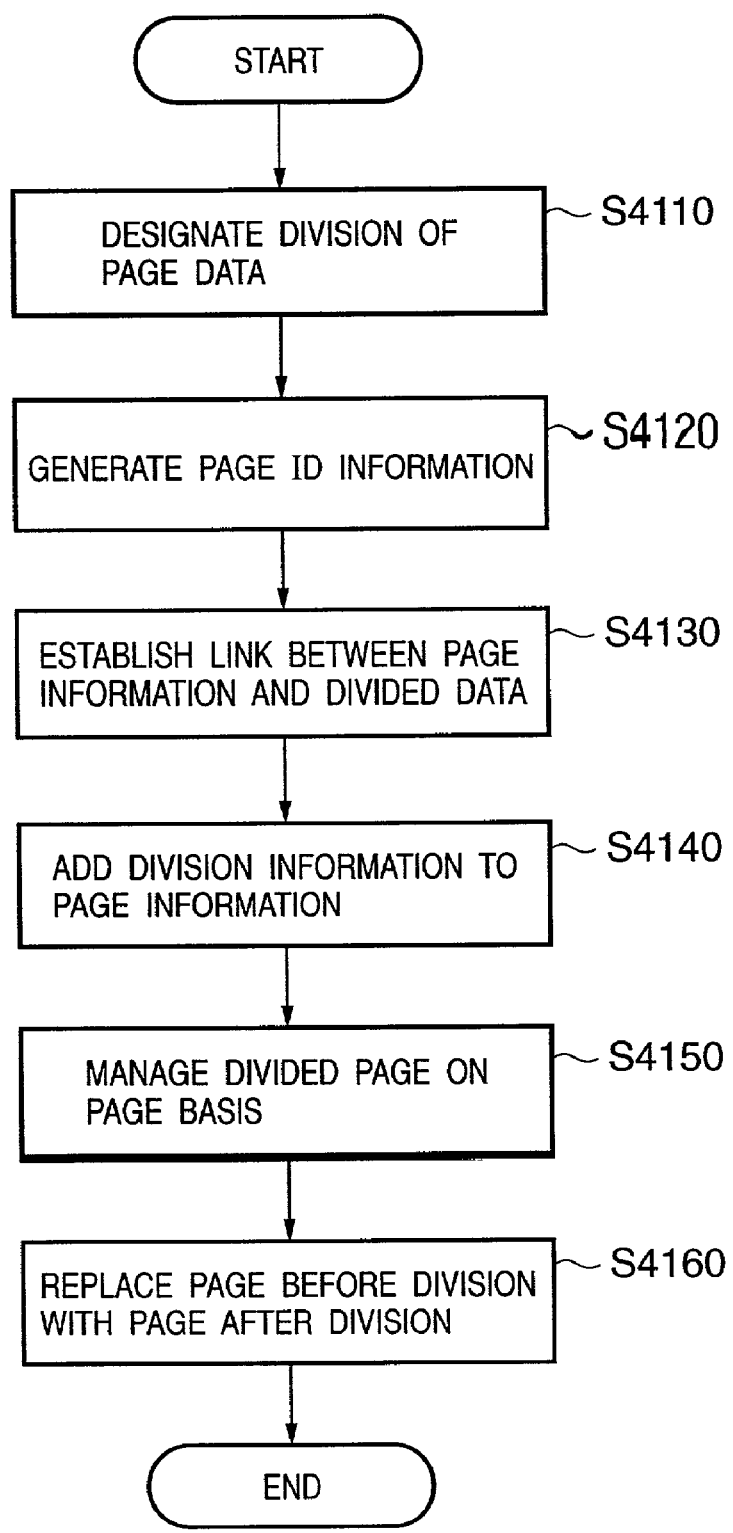
FIG. 41 is a flow chart for explaining a procedure for page division.

FIG. 41 is a flow chart showing the flow of processing in dividing a page.

In step S4110, a target page to be divided is specified to designate page division. In this case, "designation" may indicate a method of dividing a specific page designated by the user or a method of automatically setting page division. For example, automatic page division is the processing of dividing all A3 originals into A4 pages when A4 and A3 originals mix with each other.

The flow then advances to step S4120 to generate page information for layout control after division with respect to the division target page designated in step S4110. In generating this page information, a data structure indicating division attributes like those shown in FIG. 34 is generated, and a page ID is written to discriminate the page information for division from other page information. Data having a common page ID indicate the commonality of the source (original) data.

The flow advances to step S4130 to link (establish links) the page information generated in step S4120 to the real page data. In this case, resources can be saved by using the method of establishing links to the same page data. If, however, only one page is deleted in page deletion processing, determination on the possibility of deletion of real data and the like must be performed, and the processing is complicated. If the real data is also copied, the processing can be simplified although the amount of resources used increases. Alternatively, left-page data may be obtained by extracting data that appears only on the left half and data that appears on the division line. In this case, area determination is required, the cost for division processing increases over time. The layout method can be applied to either method.

The flow then advances to step S4140 to set division information in page in the page information. When the division method shown in FIGS. 33A and 33B is used, a flag indicating the right half or left half is set, as shown in FIG. 34. If an original is to be divided into upper and lower halves, a flag representing the upper half/lower half is set. If an original is to be divided into three parts, flags corresponding to a division method, e.g., flags indicating "right/intermediate/left) or "upper/intermediate/lower" is set. The contents of division can be specified on the basis of this division information and the page ID processed in step S4120.

The flow then advances to step S4150 to manage each new page generated upon division as an independent page.

The flow advances to step S4160 to replace the page before division with the page after division. That is, by completing the processing in step S4600, the original data as source data can be managed for each page data. If layout is executed on the basis of the independent management data, the original data can be restored.

Figure 40:
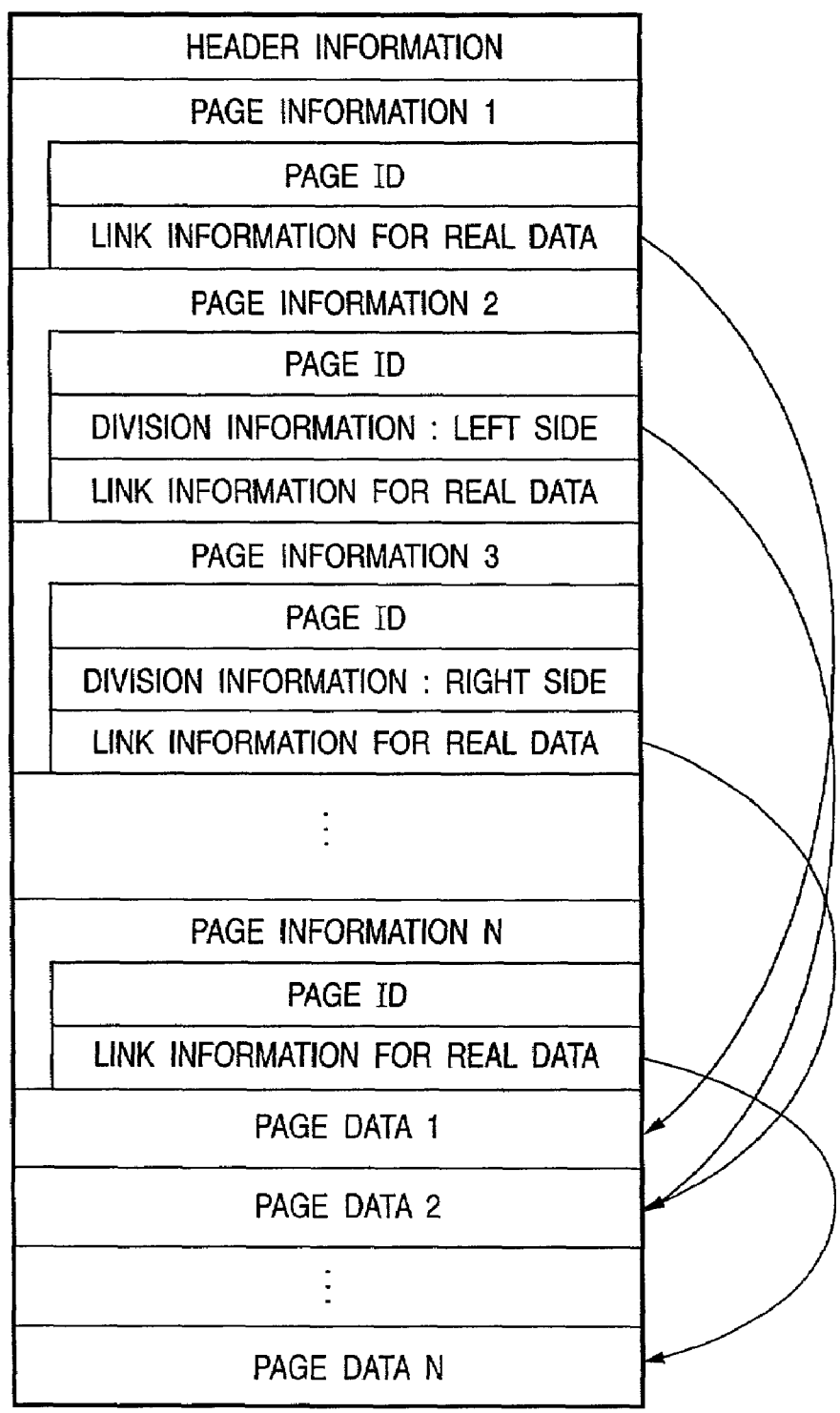
FIG. 40 is a view showing an example of a data structure after page division.

FIG. 40 shows an example of data having the second page divided into left and right halves when management information like that shown in FIGS. 33A and 33B is held. As shown in FIG. 40, according to the structure of an intermediate file, the pages obtained by dividing the second page of the original pages are managed on a page basis. That is, as for information about division, pieces of division information indicating the right and left sides are held and stored as pieces of page information of the second and third pages.

Page information after division is managed in the same form as that of general page information except for data indicating division attributes. Even a page associated with division can be handled without discrimination depending on the layout form. Referring to FIG. 40, page information 1 indicates general page data, and pieces of page information 2 and 3 are pieces of page information associated with the division, each of which has flag information indicating a division attribute (e.g., information for specifying the left- or right-side data of the original data). In actually laying out data, the correspondence between divided pages must be maintained. The presence/absence of the correspondence is determined by division information and page IDs.

Figure 42:
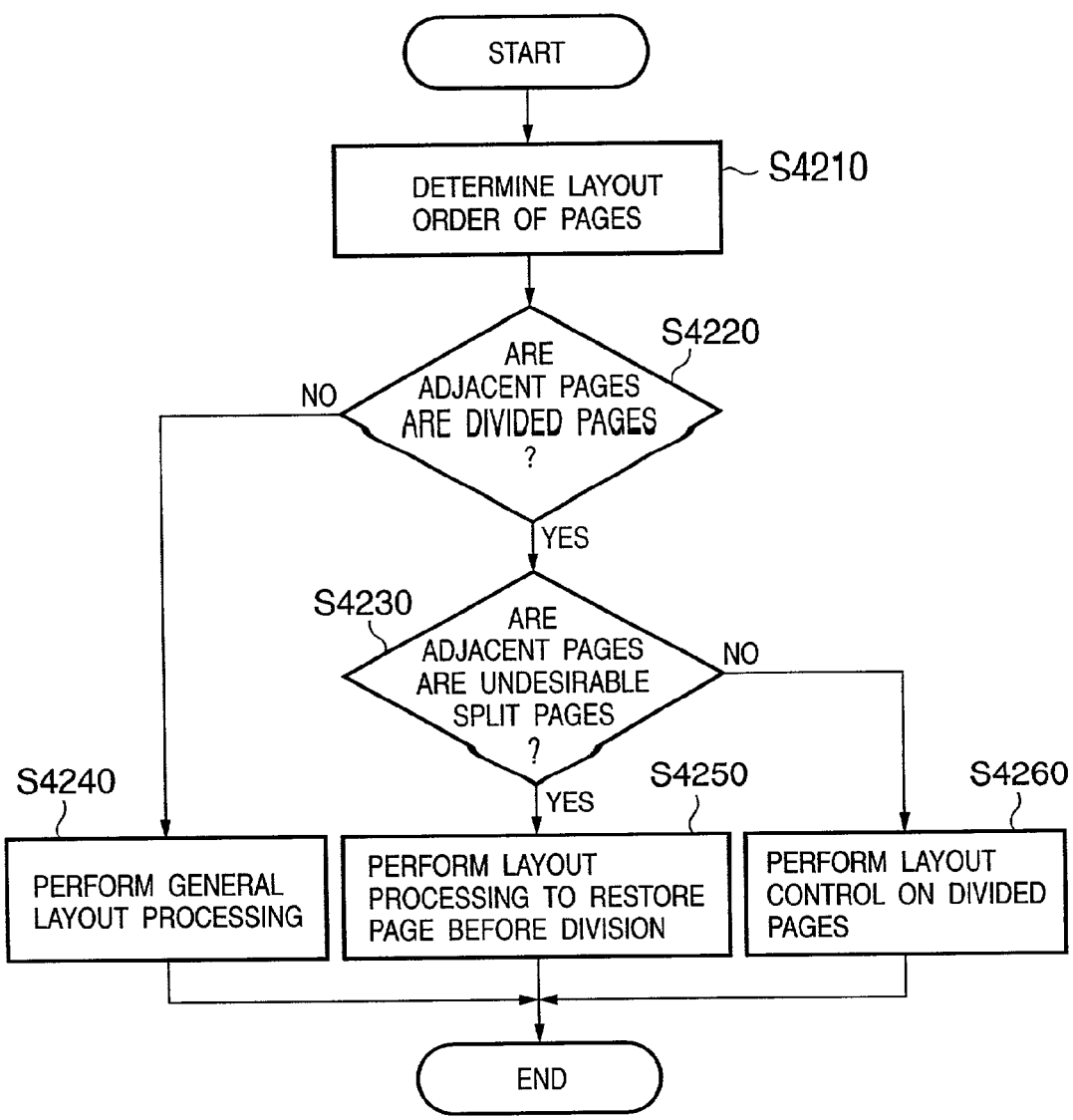
FIG. 42 is a flow chart for explaining a procedure for an application of page layout processing.

FIG. 42 shows the flow of processing to be performed when pages are laid out on the basis of data managed on a page basis. In step S4210, a page layout order is determined. In the case of N-up printing, this step is to designate a layout order to determine specific pages to be laid out on the right and left sides of the upper surface of the first paper sheet. That is, this step is a preparatory stage for fine coordinate designation. In this stage, specific pages to be laid out adjacent to each other are determined.

The flow advances to step S4220 to check on the basis of the division information of pages whether adjacent pages are divided pages. In simple 2-up printing, this determination can be made on the basis of the data of two adjacent pages. In 4-up printing, however, all four layout positions must be checked like two upper positions, two lower positions, two right positions, and the like. In 9-up and 16-up printing, all layout positions must be checked. However, since only pages having division attributes must be checked, check patterns can be limited to some degree.

If it is determined in step S4220 that the divided pages are not adjacent to each other (NO in step S4240), since there is no need to perform any special layout processing, the flow advances to step S4240 to perform general layout processing and determine print positions and sizes.

If it is determined in step S4220 that the divided pages are adjacent to each other (YES in step S4220), the flow advances to step S4230 to check whether it is required to perform restoration processing for adjacent pages which are undesirable split pages.

If the right page of two pages obtained by dividing a given page into left and right pages is relatively located on the right side, and the left page is located on the left side, restoration processing can be performed. In some systems, it is not checked whether a signal page is divided. In this case, the data of a different page may be determined as one page. According to a simpler system, restoration processing is always performed if adjacent pages are divided pages.

If it is determined in step S4230 that the pages are undesirable split pages, and restoration processing can be performed (YES in step S4230), the positions and sizes of the undesirable split pages are adjusted to form an image identical to the image before division, as shown in FIG. 38. If it is determined in step S4230 that the pages are not undesirable split pages or not required to be restored to the original data (NO in step S4230), the flow advances to step S4260 to perform layout control on the divided pages in the manner described with reference to FIG. 37.

If the image of the original page can be restored as in the case of the layout 3830 in FIG. 38, these data can be printed as the original 1-page data instead of printing the left and right pages upon clipping each data. Such processing is based on the premise that data mount reduction processing, e.g., dividing page data itself into left and right parts, has not be performed.

Figure 43:
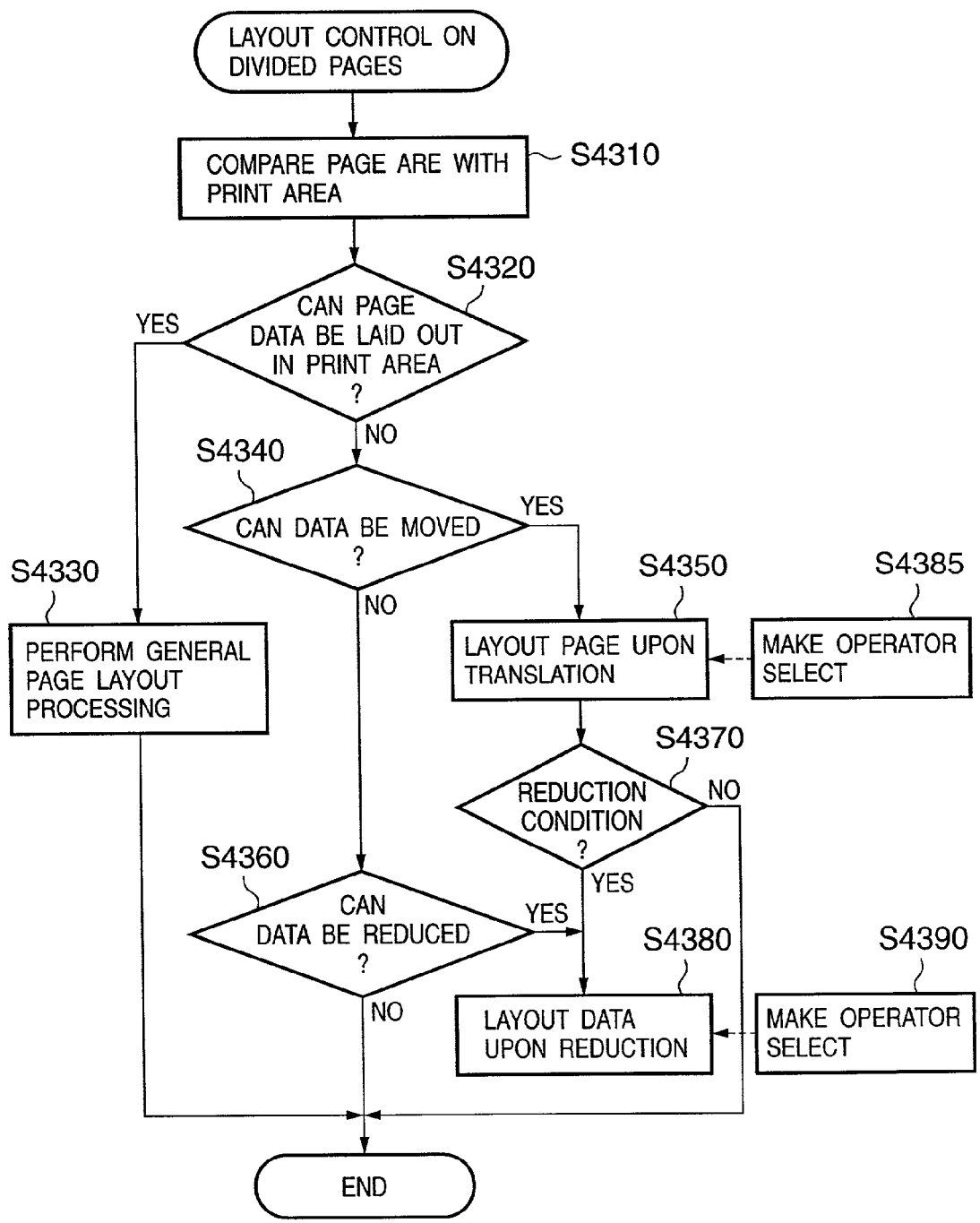
FIG. 43 is a flow chart for explaining layout control on divided pages.

FIG. 43 is a flow chart showing the processing in step S4260 in FIG. 42 in detail. Referring to FIG. 37, layout processing on a page basis can be performed in three forms, (1) movement, (2) reduction, and (3) a combination of reduction and movement. The detailed processing in each layout processing is based on the processing in each step in FIG. 43.

In step S4310, page data managed as an intermediate file on a page basis is compared with a printable area for the page to be laid out. In step S4320, it is checked on the basis of the comparison result whether page data can be laid out in the printable area. Determination on whether the page data can be laid out or not is not simply limited to determination on whether the page data can be pasted, but is done, including determination on whether a data omission occurs or not.

If it is determined on the basis of the determination made in step S4310 that the page data can be laid out (YES in step S4320), the flow advances to step S4330 to execute general page layout processing.

If it is determined on the basis of the determination made in step S4320 that the page data cannot be fitted in the printable range. The flow advances to step S4340 and subsequent steps to control page layout processing. It is checked in step S4340 whether a page layout can be controlled by data translation. "Translation" is a layout technique of preventing a data omission by shifting the layout position of page data to the left to ensure a binding margin portion (e.g., a width 37e) in booklet printing, as shown in FIG. 37, which is used to explain "(1) movement".

If it is determined that the page data cannot be fitted in the printable area even by translating the data. Referring to FIG. 37 that explains "(1) movement", when the page data is shifted to the left side, although the mark "○" in the central portion of the page can be fitted in the printable area, page data on the left side may be omitted. If the page data cannot be laid out satisfactorily by translation as described above (NO in step S4340), the flow advances to step S4360.

If translation can be performed (YES in step S4340), the flow advances to step S4350 to execute layout control upon translation of the page data (step S4350).

It is checked in step S4370 whether a layout condition (reduction condition) is imposed. If a layout condition for reduction is imposed, the flow advances to step S3480. If no condition is imposed, the processing is terminated.

If it is determined in step S4360 that reduction can be done (YES in step S4360), layout page control based on reduction of the page data is executed (step S3480).

The operator may directly designate a layout scheme for the divided pages regardless of the processing in each step in FIG. 43 (steps S4385 and S4390).

Layout conditions set in the respective steps or selected by the operator, e.g., the shift amount of translation and a reduction magnification, are stored in a memory (102, 103) on the host computer side, and can be uniformly reflected in the entire print information.

According to this embodiment, layout control can be performed to restore data in booklet printing and prevent data omissions by dividing an original page into a plurality of pages and managing each page as a single page while holding the correspondence between the divided pages.

<Other Embodiment>

The present invention may be applied to a system constituted by a plurality of devices (e.g., a host computer, an interface device, a reader, a printer, and the like) or an apparatus comprising a single device (e.g., a copying machine, a facsimile apparatus, or the like).

The object of the present invention is realized even by supplying a storage medium storing software program codes for realizing the functions of the above-described embodiments to a system or apparatus, and causing the computer (or a CPU or an MPU) of the system or apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

According to the print control method and apparatus of the present invention, when paper sheets are folded to form printed matter with an appearance of a book, printed matter having a plurality of page data printed in the respective print areas can be formed.

By applying the present invention to a host computer, print data for obtaining printed matter having a plurality of print page data laid out can be generated with respect to the respective print areas of printed matter with an appearance of a book.

According to the present invention, layout data can be input, which can designate a combination of a plurality of print data pages on each page of bound paper sheets on which data are printed. This allows the user to select a desired layout scheme.

In addition, according to the present invention, since the input means can input a layout order of a plurality of pages on one page, the user can select a desired layout scheme.

According to the present invention, since different layout data can be input for the layout of a cover and the layout of surfaces other than the cover, the user can select a desired layout scheme in a more advanced manner.

According to the present invention, designation can be made to output data while regarding spread surfaces as one print area. This allows the user to select a desired layout scheme in a more advanced manner.

In addition, according to this embodiment, layout control can be performed to restore data in booklet printing and prevent data omissions by dividing an original page into a plurality of pages and managing each page as a single page while holding the correspondence between the divided pages.

Furthermore, according to the present invention, page layout control can be easily executed for a cover and back cover or spread size.

Moreover, according to the present invention, a print result with a uniform magnification can be obtained by preventing variations in magnification in reducing/laying out original pages.

As many apparently widely different embodiments of the present invention can be made without departing from the spirit and scope thereof, it is to be understood that the invention is not limited to the specific embodiments thereof except as defined in the appended claims.

What is claimed is:

1. A print control apparatus for managing document information on a page basis and performing control to lay out the document information on a page basis in a designated layout area, comprising:

data management means for managing the document data as a set of data on a page basis;

division information giving means for, in a case where a page of a predetermined size of the document data is divided into two pages of half the size of the predetermined size, giving management information on a page basis division information for identifying the divided data as divided pages and specifying a relationship between the divided pages; and control means for determining a layout area in which data managed on a page basis is laid out on the basis of the management information given by said division information giving means, and laying out the data in the determined layout area, wherein said control means, in a case where the document data divided into the two pages is not being laid out as a two-page spread of pages to be printed, lays out the respective divided document data on the determined layout area, wherein said control means, in a case where the document data divided into the two pages is being laid out as the two-page spread of the pages to be printed, lays out the respective divided document data on a two-page spread area, and wherein the two-page spread is larger than two layout areas.

2. The apparatus according to claim 1, wherein said control means restores the data divisionally managed by said division information giving means to data before division or lays out the data on a page basis in a print area on a print sheet as a layout area.

3. The apparatus according to claim 1, wherein said layout control means identifies data divisionally managed by said division information giving means as data of adjacent pages on the basis of the division information, and executes layout control to restore the respective divided data of the adjacent pages to data before division if the divisionally managed data are data of adjacent pages and can be laid out in a print area on a print sheet.

4. The apparatus according to claim 1, wherein
the division information includes first identification information for specifying a page of print data before division, and second identification information for specifying a region constituting the print page before division, and said layout control means specifies a page of print data before division on the basis of the first identification information, and specifies a region constituting the page of the print data on the basis of the second identification information, thereby executing a layout to restore data before division.

5. The apparatus according to claim 1, wherein said layout control means determines, in restoring the data before division, whether the data to be restored is fitted in a print area, stops restoration if the data is not fitted in the area, and lays out data managed on a page basis in a continuous spread print area.

6. The apparatus according to claim 1, wherein said layout control means controls a layout of the data to prevent an omission of the data on a page basis in laying out the data managed on a page basis in the continuous spread print area.

7. The apparatus according to claim 1, wherein said layout control means performs layout control to fit the data managed on a page basis in the print area to prevent an omission of the data by performing translation of a layout position of the data, reduction of the data, or performing a combination of translation and reduction of the data.

8. The apparatus according to claim 1, wherein when the data divisionally managed by said divisional management means is to be laid out in a print area, said layout control means compares the divisionally managed data with the print area and controls printing of the data so as to prevent an omission of the data when the data is printed in the print area.

9. The apparatus according to claim 1, wherein
said divisional management means divides the data generated by said data generating means according to a unit page size, and
said layout control means prevents an omission of data by performing layout control to fit the data in the print area by performing translation of a print position of the data divided according to the unit page size, reduction of the data, or a combination of translation and reduction.

10. The apparatus according to claim 1, wherein
the apparatus further comprises storage means for storing an amount of translation and/or a data reduction ratio for prevention of an omission of data in layout control executed by said layout control means, and
said layout control means lays out data by uniformly controlling layout positions and/or data reduction ratios on the basis of the data stored in said storage means.

11. A print control method of managing document information on a page basis and performing control to lay out the document information on a page basis in a designated layout area, comprising:
a data management step of managing the document data as a set of data on a page basis;
a division information giving step of, in a case where a page of a predetermined size of the document data is divided into two pages of half the size of the predetermined size, giving management information on a page basis division information for identifying the divided data as divided pages and specifying a relationship between the the divided pages; and
a control step of determining a layout area in which data managed on a page basis is laid out on the basis of the management information given in the division information giving step, and laying out the data in the determined layout area,
wherein the control step, in case where the document data divided into the two pages is not being laid out as a two-page spread of pages to be printed, lays out the respective divided document data on the determined layout area,
wherein the control step, in a case where the document data divided into the two pages is being 1 laid out as the two-page spread of the pages to be printed, lays out the respective divided document data on a two-page spread area, and
wherein the two-page spread area is larger than two layout areas.

12. The method according to claim 11, wherein in the control step, the data divisionally managed in the division information giving step is restored to data before division or lays out the data on a page basis in a print area on a print sheet as a layout area.

13. The method according to claim 11, wherein in the layout control step, data divisionally managed in the division information giving step is identified as data of adjacent pages on the basis of the division information, and layout control is performed to restore the respective divided data of the adjacent pages to data before division if the divisionally managed data are data of adjacent pages and can be laid out in a print area on a print sheet.

14. The method according to claim 11, wherein
the division information includes first identification information for specifying a page of print data before division, and second identification information for specifying a region constituting the print page before division, and
in the layout control step, a page of print data before division is specified on the basis of the first identification information, and a region constituting the page of the print data is specified on the basis of the second identification information, thereby executing a layout to restore data before division.

15. The method according to claim 11, wherein in the layout control step, it is determines, in restoring the data before division, whether the data to be restored is fitted in a print area, restoration is stopped if the data is not fitted in the area, and data managed on a page basis are laid out in a continuous spread print area.

16. The method according to claim 11, wherein in the layout control step, a layout of the data is controlled to prevent an omission of the data on a page basis in laying out the data managed on a page basis in the continuous spread print area.

17. The method according to claim 11, wherein in the layout control step, layout control is performed to fit the data managed on a page basis in the print area to prevent an omission of the data by performing translation of a layout position of the data, reduction of the data, or performing a combination of translation and reduction of the data.

18. The method according to claim 11, wherein when the data divisionally managed in the divisional management step is to be laid out in a print area, in the layout control step, the divisionally managed data is compared with the print area and printing of the data is controlled so as to prevent an omission of the data when the data is printed in the print area.

19. The method according to claim 11, wherein
in the divisional management step, the data generated in the data generating step is divided according to a unit page size, and
in the layout control step, an omission of data is prevented by performing layout control to fit the data in the print area by performing translation of a print position of the data divided according to the unit page size, reduction of the data, or a combination of translation and reduction.

20. The method according to claim 11, wherein
the method further comprises the storage step of storing an amount of translation and/or a data reduction ratio for prevention of an omission of data in layout control executed in the layout control step, and
in the layout control step, data is laid out by uniformly controlling layout positions and/or data reduction ratios on the basis of the data stored in the storage step.

21. A computer-readable storage medium storing a program for executing print control to manage document information on a page basis and perform control to lay out the document information on a page basis in a designated layout area, the program comprising:
a data management step of managing the document data as a set of data on a page basis;
a division information giving step of, in a case where a page of a predetermined size of the document data is divided into two pages as the half size of the predetermined size, giving management information on a page basis division information for identifying the divided data as divided pages and specifying a relationship between the divided pages; and
a control step of determining a layout area in which data managed on a page basis is laid out on the basis of the management information given in the division information giving management module step, and laying out the data in the determined layout area, wherein the control step, in a case where the document data divided into the two pages is not being laid out as a two-page spread of pages to be printed, lays out the respective divided document data on the determined layout area, wherein the control step, in a case where the document data is divided into the two pages being laid out as the two-page spread of the pages to be printed, lays out the respective divided document data on a two-page spread area, and wherein the two-page spread area is larger than two layout areas.

22. The computer-readable storage medium according to claim 21, wherein the control step restores the data divisionally managed in the division information giving step to data before division or lays out the data on a page basis in a print area on a print sheet as a layout area.

23. The computer-readable storage medium according to claim 21, wherein the layout control step identifies data divisionally managed in the division information giving step as data of adjacent pages on the basis of the division information, and executes layout control to restore the respective divided data of the adjacent pages to data before division if the divisionally managed data are data of adjacent pages and can be laid out in a print area on a print sheet.

24. The computer-readable storage medium according to claim 21, wherein the division information includes first identification information for specifying a page of print data before division, and second identification information for specifying region constituting the print page before division, and the layout control step specifies a page of print data before division on the basis of the first identification information, and specifies a region constituting the page of the print data on the basis of the second identification information, thereby executing a layout to restore data before division.

25. The computer-readable storage medium according to claim 21, wherein the layout control step determines, in restoring the data before division, whether the data to be restored is fitted in a print area, stops restoration if the data is not fitted in the area, and lays out data managed on a page basis in a continuous spread print area.

26. The computer-readable storage medium according to claim 21, wherein the layout control step controls a layout of the data to prevent an omission of the data on a page basis in laying out the data managed on a page basis in the continuous spread print area.

27. The computer-readable storage medium according to claim 21, wherein the layout control step performs layout control to fit the data managed on a page basis in the print area to prevent an omission of the data by performing translation of a layout position of the data, reduction of the data, or performing a combination of translation and reduction of the data.

28. The computer-readable storage medium according to claim 21, wherein when the data divisionally managed in the divisional management step is to be laid out in a print area, the layout control step compares the divisionally managed data with the print area and controls printing of the data so as to prevent an omission of the data when the data is printed in the print area.

29. The computer-readable storage medium according to claim 21, wherein the divisional management step divides the data generated in the data generating step according to a unit page size, and the layout control step prevents an omission of data by performing layout control to fit the data in the print area by performing translation of a print position of the data divided according to the unit page size, reduction of the data, or a combination of translation and reduction.

30. The computer-readable storage medium according to claim 21, wherein the storage medium further comprises a storage step of storing an amount of translation and/or a data reduction ratio for prevention of an omission of data in layout control executed in the layout control step, and the layout control step lays out data by uniformly controlling layout positions and/or data reduction ratios on the basis of the data stored in the storage step.

* * * * *

UNITED STATES PATENT AND TRADEMARK OFFICE
CERTIFICATE OF CORRECTION

PATENT NO. : 7,046,385 B2
APPLICATION NO. : 09/983880
DATED : May 16, 2006
INVENTOR(S) : Yasuo Mori et al.

It is certified that error appears in the above-identified patent and that said Letters Patent is hereby corrected as shown below:

COVER PAGE AT ITEM [30]:
Foreign Application Priority Document, "2000/333337" should read --2000-333337--; and "2001/280042" should read --2001-280042--.

COVER PAGE AT ITEM [56] RC:
U.S. Patent Documents, "6,417,931 B1 * 7/2002 Mori et al. ...... 358/1.15" should read --6,417,931 B2 * 7/2002 Mori et al. ...... 358/1.15--.

COVER PAGE AT ITEM [57] Abstract:
Line 15, "data" ($1^{st}$ occurrence) should be deleted.

SHEET NO. 26 of 57:
Figure 25, "PAGES" should read --PAGE--.

SHEET NO. 27 of 57:
Figure 26, "ARE" ($1^{st}$ occurrence) should be deleted.

SHEET NO. 44 of 57:
Figure 42, "ARE" ($1^{st}$ and $3^{rd}$ occurrences) should be deleted.

SHEET NO. 45 of 57:
Figure 43, "ARE" should read --AREA--.

COLUMN 1:
Line 21, "corresponding the" should read --corresponding to the--.
Line 23, "depending the" should read --depending on the--.

COLUMN 2:
Line 26, "respect discon-" should read --respect to discon- --.

COLUMN 7:
Line 36, "standalone" should read --stand-alone--.

COLUMN 10:
Line 35, "specific one" should read --specific one--.

UNITED STATES PATENT AND TRADEMARK OFFICE
CERTIFICATE OF CORRECTION

| | |
|---|---|
| PATENT NO. | : 7,046,385 B2 |
| APPLICATION NO. | : 09/983880 |
| DATED | : May 16, 2006 |
| INVENTOR(S) | : Yasuo Mori et al. |

It is certified that error appears in the above-identified patent and that said Letters Patent is hereby corrected as shown below:

COLUMN 14:
Line 12, "corresponding" should read --corresponds--.
Line 25, "standalone" should read --stand-alone--.
Line 35, "standalone" should read --stand-alone--.
Line 43, "serves" should read --servers--.
Line 50, "standalone" should read --stand-alone--.
Line 54, "stand-along" should read --stand-alone--.

COLUMN 15:
Line 18, "standalone" should read --stand-alone--.
Line 24, "indicting" should read --indicating--.

COLUMN 16:
Line 16, "performing" should read --performs--.

COLUMN 18:
Line 8, "ciated print" should read --ciated with print--.
Line 13, "Although the" should read --The--.
Line 59, "includes" should read --include--.

COLUMN 25:
Line 33, "is" should read --are--.

COLUMN 29:
Line 46, "indicting" should read --indicating--.
Line 47, "subjected two-sided" should read --subjected to two-sided--.

COLUMN 30:
Line 64, "results-" should read --results--.

COLUMN 31:
Line 23, "pages." should read --page.--.
Line 30, "advance" should read --advances--.

COLUMN 35:
Line 5, "handed" should read --handled--.
Line 37, "page" should read --pages--.

UNITED STATES PATENT AND TRADEMARK OFFICE
CERTIFICATE OF CORRECTION

PATENT NO. : 7,046,385 B2
APPLICATION NO. : 09/983880
DATED : May 16, 2006
INVENTOR(S) : Yasuo Mori et al.

It is certified that error appears in the above-identified patent and that said Letters Patent is hereby corrected as shown below:

COLUMN 38:
Line 52, "page" (1st occurrence) should read --header--.

COLUMN 40:
Line 58, "automating" should read --of automating--.

COLUMN 41:
Line 27, "bounded" should read --bound--.
Line 49, "difference" should read --different--.

COLUMN 42:
Line 26, "is" should read --are--.

COLUMN 43:
Line 45, "mount" should read --amount--.

COLUMN 45:
Line 67, "basis." should read --basis,--.

COLUMN 46:
Line 31, "are" should read --is--.

COLUMN 47:
Line 28, "basis" should read --basis,--.
Line 42, "1" should be deleted.
Line 51, "lays out the data" should read --is laid out--.
Line 59, "are" should read --is--.

COLUMN 48:
Line 8, "determines," should read --determined,--.
Line 11, "are" should read --is--.
Line 60, "basis" should read --basis,--.
Line 66, "module" should be deleted.

UNITED STATES PATENT AND TRADEMARK OFFICE
CERTIFICATE OF CORRECTION

PATENT NO. : 7,046,385 B2
APPLICATION NO. : 09/983880
DATED : May 16, 2006
INVENTOR(S) : Yasuo Mori et al.

It is certified that error appears in the above-identified patent and that said Letters Patent is hereby corrected as shown below:

<u>COLUMN 49</u>:
Line 7, "is" should be deleted.
Line 7, "pages being" should read --pages is being--.
Line 24, "are" should read --is--.
Line 31, "specifying region" should read --specifying a region--.

Signed and Sealed this

Eleventh Day of March, 2008

JON W. DUDAS
*Director of the United States Patent and Trademark Office*